US011946530B2

(12) United States Patent
Foxhall et al.

(10) Patent No.: US 11,946,530 B2
(45) Date of Patent: Apr. 2, 2024

(54) POWER PACK FOR A VEHICLE SELECTED FROM A GROUP OF DIFFERENT VEHICLES AND METHOD FOR ASSEMBLY THEREOF

(71) Applicant: BRP-ROTAX GMBH & CO. KG, Gunskirchen (AT)

(72) Inventors: Nigel Foxhall, Semriach (AT); Thomas Zorn, Stadl-Paura (AT); Franz Russegger, Nussdorf (AT); Bruno Girouard, Shefford (CA)

(73) Assignee: BRP-ROTAX GMBH & CO. KG, Gunskirchen (AT)

( * ) Notice: Subject to any disclaimer, the term of this patent is extended or adjusted under 35 U.S.C. 154(b) by 101 days.

(21) Appl. No.: 17/639,231

(22) PCT Filed: Aug. 28, 2020

(86) PCT No.: PCT/EP2020/074166
§ 371 (c)(1),
(2) Date: Feb. 28, 2022

(87) PCT Pub. No.: WO2021/038094
PCT Pub. Date: Mar. 4, 2021

(65) Prior Publication Data
US 2022/0349458 A1 Nov. 3, 2022

Related U.S. Application Data

(60) Provisional application No. 62/893,901, filed on Aug. 30, 2019.

(51) Int. Cl.
*F16H 57/033* (2012.01)
*B60K 5/00* (2006.01)
(Continued)

(52) U.S. Cl.
CPC ......... *F16H 37/021* (2013.01); *F16H 57/033* (2013.01); *F16H 57/0416* (2013.01);
(Continued)

(58) Field of Classification Search
CPC .. F16H 37/021; F16H 57/033; F16H 57/0416; F16H 2057/0335; B60K 5/00; B60K 17/04
(Continued)

(56) References Cited

U.S. PATENT DOCUMENTS 5,036,802 A * 8/1991 D'Amours ............ F02P 5/1502
123/41 E
9,114,852 B2 * 8/2015 Fecteau .................. B62M 27/02
(Continued)

FOREIGN PATENT DOCUMENTS

EP 0445873 A1 9/1991
JP H04173492 A 6/1992
(Continued)

OTHER PUBLICATIONS

International Search Report of PCT/EP2020/074166; Martinez Hurtado, L.; dated Jan. 12, 2021.
(Continued)

*Primary Examiner* — Gene O Crawford
*Assistant Examiner* — Emily R Kincaid
(74) *Attorney, Agent, or Firm* — BCF LLP

(57) ABSTRACT

A power pack for a vehicle selected from a group of different vehicles is disclosed. The power pack includes an internal combustion engine and a continuously variable transmission (CVT) operatively connected to the engine. The CVT includes: a drive pulley operatively connected to a crankshaft of the engine, the drive pulley being rotatable about a drive pulley axis; a driven pulley rotatable about a driven pulley axis; a belt connecting the drive pulley to the driven
(Continued)

pulley; and a housing at least partly enclosing the drive pulley, the driven pulley and the belt. The power pack also includes a sub-transmission selected from a group of different sub-transmissions depending on the selected vehicle. The selected sub-transmission is mounted to the housing of the CVT. The housing of the CVT is configured to mount any sub-transmission of the group of different sub-transmissions. A method for assembling a power pack is also provided.

20 Claims, 41 Drawing Sheets

(51) Int. Cl.
*B60K 17/04* (2006.01)
*F16H 37/02* (2006.01)
*F16H 57/04* (2010.01)
(52) U.S. Cl.
CPC ............. *B60K 5/00* (2013.01); *B60K 17/04* (2013.01); *F16H 2057/0335* (2013.01)
(58) Field of Classification Search
USPC ........................................................ 474/72
See application file for complete search history.

(56) References Cited

U.S. PATENT DOCUMENTS

| | | | |
|---|---|---|---|
| 9,283,823 | B2* | 3/2016 | LeClerc ............... B60G 17/056 |
| 10,336,387 | B2* | 7/2019 | Lacasse-Jobin ........... B62J 1/28 |
| 2012/0055729 | A1* | 3/2012 | Bessho .................... B60K 5/04 |
| | | | 180/309 |
| 2019/0190348 | A1 | 6/2019 | Verbridge |

FOREIGN PATENT DOCUMENTS

| | | |
|---|---|---|
| JP | 2009120160 A | 6/2009 |
| KR | 20130013283 A | 2/2013 |
| WO | 2018107583 A1 | 6/2018 |

OTHER PUBLICATIONS

European Search Report issued from the EPO dated Apr. 24, 2023 in connection with the European related application No. 22214775.3.

* cited by examiner

POWER PACK FOR A VEHICLE SELECTED FROM A GROUP OF DIFFERENT VEHICLES AND METHOD FOR ASSEMBLY THEREOF

CROSS-REFERENCE

The present application claims priority from U.S. Provisional Patent Application No. 62/893,901, filed on Aug. 30, 2019, the entirety of which is incorporated herein by reference.

TECHNICAL FIELD

The present technology relates to power packs for vehicles and methods for their assembly.

BACKGROUND

A vehicle's powertrain is designed to satisfy the drive requirements of the vehicle, including for example torque and speed requirements thereof. Consequently, vehicles which are used for different applications typically have distinct powertrains as their specific drive requirements may differ significantly. This can be particularly burdensome for a vehicle manufacturer that makes different types of vehicles and thus has to design and provide different powertrains for each type of vehicle. For instance, the manufacturer may have to store a large variety of components so as to be able to assemble any of the different powertrains depending on the vehicle being manufactured. Sourcing and storing such a large variety of components required to assemble the different powertrains can be costly and complex to the manufacturer.

Therefore, there is a desire for a solution addressing at least some of these drawbacks.

SUMMARY

It is an object of the present technology to ameliorate at least some of the inconveniences present in the prior art.

In accordance with an aspect of the present technology, there is provided a power pack for a vehicle selected from a group of different vehicles. The power pack includes: an internal combustion engine; a continuously variable transmission (CVT) operatively connected to the engine; and a sub-transmission selected from a group of different sub-transmissions depending on the selected vehicle of the group of different vehicles. The engine includes: a crankcase; a crankshaft disposed in the crankcase; and a cylinder body connected to the crankcase. The CVT includes: a drive pulley operatively connected to the crankshaft of the engine, the drive pulley being rotatable about a drive pulley axis; a driven pulley rotatable about a driven pulley axis; a belt connecting the drive pulley to the driven pulley; and a housing at least partly enclosing the drive pulley, the driven pulley and the belt. The selected sub-transmission is mounted to the housing of the CVT. The housing of the CVT is configured to mount any sub-transmission of the group of different sub-transmissions.

In some embodiments, the housing of the CVT defines a plurality of mounting points for mounting the selected sub-transmission to the housing. At least some of the mounting points defined by the housing are used to mount any one of the different sub-transmissions.

In some embodiments, all mounting points defined by the housing of the CVT are used to mount any one of the different sub-transmissions.

In some embodiments, when the power pack is installed on the selected vehicle, the drive pulley axis is vertically higher than the driven pulley axis.

In some embodiments, when the power pack is installed on the selected vehicle, the driven pulley axis extends generally laterally.

In some embodiments, at least part of the crankcase of the engine and the selected sub-transmission are disposed on a same side of the CVT.

In some embodiments, at least part of the selected sub-transmission extends laterally away from the CVT past the engine.

In some embodiments, the selected sub-transmission includes an output shaft configured to be operatively connected to at least one ground-engaging member of the vehicle. The output shaft is rotatable about an output shaft axis. The output shaft axis extends along a direction generally transverse to the driven pulley axis.

In some embodiments, when the power pack is installed on the selected vehicle, the output shaft axis extends generally longitudinally.

In some embodiments, the selected sub-transmission includes an output shaft configured to be operatively connected to at least one ground-engaging member of the vehicle. The output shaft axis extends along a direction generally parallel to the driven pulley axis.

In some embodiments, when the power pack is installed on the selected vehicle, the output shaft axis extends generally laterally.

In some embodiments, the output shaft axis is vertically lower than the driven pulley axis.

In some embodiments, at least one sub-transmission of the group of different sub-transmissions includes: a sub-transmission housing; a plurality of gears enclosed within the sub-transmission housing; an input shaft operatively connected to the driven pulley of the CVT; a shifter for selectively engaging the input shaft with one of the plurality of gears; and an output shaft configured to be operatively connected to at least one ground-engaging member of the vehicle. The output shaft is operatively connected to the input shaft via the one of the plurality of gears.

In some embodiments, at least one sub-transmission of the group of different sub-transmissions includes: a sub-transmission housing; a plurality of gears enclosed within the sub-transmission housing; an input shaft operatively connected to the driven pulley of the CVT, the input shaft being in driving engagement with the plurality of gears; and an output shaft extending laterally outwardly from a first lateral side and a second lateral side of the sub-transmission housing.

In some embodiments, the group of different sub-transmissions includes a first sub-transmission, a second sub-transmission and a third sub-transmission. The first sub-transmission includes: an input shaft operatively connected to the driven pulley of the CVT; a plurality of gears; and an output shaft operatively connected to the input shaft via the plurality of gears, the output shaft being rotatable about an output shaft axis extending laterally, each of a first end portion and a second end portion of the output shaft being configured to be operatively connected to a respective ground-engaging member of the selected vehicle. The second sub-transmission includes: an input shaft operatively connected to the driven pulley of the CVT; a plurality of gears; and an output sprocket operatively connected to the input shaft via the plurality of gears, the output sprocket being configured to be operatively connected to a ground-engaging member of the selected vehicle for driving thereof.

The third sub-transmission includes: an input shaft operatively connected to the driven pulley of the CVT; a plurality of gears; and first and second output members operatively connected to one another and driven by the input shaft via the plurality of gears, the first and second output members being disposed on opposite sides of the third sub-transmission, the first and second output members being rotatable about respective axes extending generally longitudinally.

In some embodiments, the second sub-transmission also includes a sub-transmission housing enclosing the plurality of gears therein. The output sprocket is positioned outside of the sub-transmission housing.

In some embodiments, the engine defines a plurality of engine mounts for mounting the engine to a frame of the selected vehicle. For at least some vehicles of the group of different vehicles, only some of the engine mounts are used to mount the engine to the frame.

In some embodiments, the selected sub-transmission defines an additional vehicle mount to mount the power pack to the frame of the selected vehicle.

In some embodiments, at least one sub-transmission of the group of different sub-transmissions includes a sub-transmission housing. The sub-transmission housing defines an interior space of the at least one sub-transmission. The sub-transmission housing is sealed such that the interior space of the at least one sub-transmission is inaccessible without disassembly thereof.

In some embodiments, at least one sub-transmission of the group of different sub-transmissions includes a sub-transmission housing. The sub-transmission housing defines an interior space of the at least one sub-transmission. When the selected sub-transmission is one of the at least one sub-transmission, the sub-transmission housing of the at least one sub-transmission is sealed from the housing of the CVT.

In some embodiments, at least one sub-transmission of the group of different sub-transmissions includes a reverse gear. When the selected sub-transmission is the at least one sub-transmission including the reverse gear, the power pack is operable to drive the vehicle in reverse via engagement of the reverse gear.

In some embodiments, the housing of the CVT defines an air inlet and an air outlet; and the air inlet and the air outlet are always in a same position irrespective of the selected sub-transmission.

In some embodiments, the engine is a single-cylinder engine.

According to another aspect of the present technology, there is provided a method for assembling a power pack for a vehicle selected from a group of different vehicles. The method includes: providing an engine and a continuously variable transmission (CVT), the CVT being operatively connected to the engine; determining the selected vehicle for which the power pack is to be provided; selecting a sub-transmission from a group of different sub-transmissions based on the selected vehicle for which the power pack is to be provided; and mounting the selected sub-transmission to a housing of the CVT, the housing of the CVT being configured to mount any sub-transmission of the group of different sub-transmissions.

In some embodiments, for any one of the different sub-transmissions being the selected sub-transmission, mounting the selected sub-transmission includes: fastening the selected sub-transmission to all mounting points of a plurality of mounting points defined by a housing of the CVT for mounting the selected sub-transmission.

In some embodiments, for at least one of the different sub-transmissions being the selected sub-transmission, mounting the selected sub-transmission includes: positioning the selected sub-transmission such that an output shaft axis thereof extends along a direction generally transverse to a driven pulley axis of the CVT.

In some embodiments, for at least one of the different sub-transmissions being the selected sub-transmission, mounting the selected sub-transmission includes: positioning the selected sub-transmission such that an output shaft axis thereof extends along a direction generally parallel to a driven pulley axis of the CVT.

According to another aspect of the present technology, there is provided a gearing assembly for a drivetrain of a vehicle. The gearing assembly includes: a first shaft rotating about a first shaft axis; a second shaft operatively connected to the first shaft, the second shaft rotating about a second shaft axis extending parallel to the first shaft axis; a first gear mounted to the first shaft, the first gear being a freewheel clutch gear; a second gear fixedly mounted to the first shaft for rotation therewith; a third gear mounted to the second shaft, the third gear being a freewheel clutch gear, the third gear being drivingly engaged with the second gear; and a fourth gear fixedly mounted to the second shaft for rotation therewith, the fourth gear being drivingly engaged with the first gear. When a rotational speed of the first shaft is greater than a rotational speed of the second shaft, the first shaft drives the second shaft via driving engagement between the second gear and the third gear, the first gear being overrun. When the rotational speed of the second shaft is greater than the rotational speed of the first shaft, the second shaft drives the first shaft via driving engagement between the fourth gear and the first gear, the third gear being overrun.

In some embodiments, each of the first gear and the third gear comprises: an inner race mounted to a corresponding one of the first shaft and the second shaft; an outer race disposed radially outwardly of the inner race, the outer race comprising a plurality of gear teeth; and a clutch engager disposed between the inner race and the outer race, the gear being overrun when the clutch engager disengages the outer race from the inner race so that the inner race rotates relative to the outer race.

In some embodiments, the clutch engager comprises a plurality of rollers selectively coupling rotation of the outer race with the inner race.

In some embodiments, the first gear and the fourth gear counter-rotate relative to one another; and the second gear and the fourth gear counter-rotate relative to one another.

In some embodiments, the first gear is meshed with the fourth gear; and the second gear is meshed with the third gear.

In some embodiments, the first gear and the second gear are adjacent to one another; and the third gear and the fourth gear are adjacent to one another.

In some embodiments, the first shaft is configured to be connected to an electric motor; and the second shaft is configured to be connected to a transmission of the drivetrain of the vehicle.

In some embodiments, the gearing assembly also includes a sprocket mounted to the second shaft for rotation therewith, the sprocket being configured to be connected to the transmission of the drivetrain of the vehicle.

In some embodiments, a diameter of the first gear is greater than a diameter of the fourth gear; and a diameter of the third gear is greater than a diameter of the second gear.

In some embodiments, the second gear and the fourth gear are spur gears.

According to another aspect of the present technology, there is provided a power pack for a vehicle. The power pack includes: an internal combustion engine comprising: a crankcase; a crankshaft disposed in the crankcase; and a cylinder body connected to the crankcase; a continuous variable transmission (CVT) operatively connected to the engine, the CVT comprising: a drive pulley operatively connected to the crankshaft of the engine, the drive pulley being rotatable about a drive pulley axis; a driven pulley rotatable about a driven pulley axis; a belt connecting the drive pulley to the driven pulley; and a housing at least partly enclosing the drive pulley, the driven pulley and the belt; an electric motor module operatively connected to the CVT, the electric motor module comprising: an electric motor having a motor shaft rotatable about a motor shaft axis; a gearing assembly operatively connected to the motor shaft; and a drive connection shaft operatively connected between the driven pulley of the CVT and the gearing assembly, the motor shaft being selectively operable to drive the drive connection shaft via the gearing assembly and to be driven by the drive connection shaft via the gearing assembly; and a sub-transmission operatively connected to the drive connection shaft of the electric motor module, the sub-transmission comprising an output shaft configured to be operatively connected to at least one ground-engaging member of the vehicle.

In some embodiments, the power pack also includes a controller operable to control operation of the electric motor module in a plurality of modes including: an engine driving mode whereby torque produced by the electric motor is null, the output shaft of the sub-transmission being driven by torque transmitted thereto by the engine via the CVT and the drive connection shaft; an electric motor driving mode whereby the output shaft of the sub-transmission is driven by torque transmitted thereto by the electric motor via the gearing assembly and the drive connection shaft, the driven pulley of the CVT being drivingly disengaged from the output shaft of the sub-transmission and from the drive connection shaft of the electric motor module; and a hybrid driving mode whereby the output shaft of the sub-transmission is driven by torque transmitted thereto by both the motor shaft of the electric motor and the driven pulley of the CVT.

In some embodiments, in the engine driving mode, the drive connection shaft of the electric motor module transmits torque to the motor shaft via the gearing assembly, the electric motor operating as a generator.

In some embodiments, the power pack also includes a centrifugal clutch operatively connected between the driven pulley of the CVT and the drive connection shaft of the electric motor module.

In some embodiments, the centrifugal clutch operates in one of an open position and a closed position based on a rotational speed of the driven pulley of the CVT; and when the electric motor module is operating in the electric motor driving mode, the centrifugal clutch is in the open position.

In some embodiments, the electric motor module further comprises a housing at least partially enclosing the gearing assembly and the motor shaft; and the housing of the electric motor module is mounted to the housing of the CVT.

In some embodiments, the housing of the electric motor module defines a plurality of mounting points; and the sub-transmission is mounted to the housing of the motor module via at least some of the mounting points defined thereby.

In some embodiments, the housing of the CVT defines a plurality of mounting points for mounting the electric motor module thereto; and the mounting points of the housing of the CVT are aligned with the mounting points of the housing of the electric motor module.

In some embodiments, the power pack also includes a centrifugal clutch operatively connected between the driven pulley of the CVT and the drive connection shaft of the electric motor module, the housing of the CVT at least partly enclosing the centrifugal clutch therein.

In some embodiments, when the power pack is installed on the vehicle, the motor shaft axis extends generally laterally.

In some embodiments, the driven pulley axis extends generally parallel to the motor shaft axis.

In some embodiments, the drive connection shaft of the electric motor module is disposed laterally between the CVT and the sub-transmission.

In some embodiments, the sub-transmission comprises: a sub-transmission housing; a plurality of gears enclosed within the sub-transmission housing; a transmission input shaft operatively connected between the drive connection shaft of the electric motor module and the output shaft; and a shifter for selectively engaging the transmission input shaft with one of the plurality of gears, the output shaft being operatively connected to the transmission input shaft via the one of the plurality of gears.

In some embodiments, the gearing assembly comprises: a first shaft rotating about a first shaft axis; a second shaft operatively connected to the first shaft, the second shaft rotating about a second shaft axis extending parallel to the first shaft axis; a first gear mounted to the first shaft, the first gear being a freewheel clutch gear; a second gear fixedly mounted to the first shaft for rotation therewith; a third gear mounted to the second shaft, the third gear being a freewheel clutch gear, the third gear being drivingly engaged with the second gear; and a fourth gear fixedly mounted to the second shaft for rotation therewith, the fourth gear being drivingly engaged with the first gear. When a rotational speed of the first shaft is greater than a rotational speed of the second shaft, the first shaft drives the second shaft via driving engagement between the second gear and the third gear, the first gear being overrun. When the rotational speed of the second shaft is greater than the rotational speed of the first shaft, the second shaft drives the first shaft via driving engagement between the fourth gear and the first gear, the third gear being overrun.

In some embodiments, the first shaft is operatively connected to the motor shaft, the first shaft axis being coaxial to the motor shaft axis.

In some embodiments, each of the first gear and the third gear comprises: an inner race mounted to a corresponding one of the first shaft and the second shaft; an outer race disposed radially outwardly of the inner race, the outer race comprising a plurality of gear teeth; and a clutch engager disposed between the inner race and the outer race, the gear being overrun when the clutch engager disengages the outer race from the inner race so that the inner race rotates relative to the outer race.

In some embodiments, the clutch engager comprises a plurality of rollers selectively coupling rotation of the outer race with the inner race.

In some embodiments, the first gear and the fourth gear counter-rotate relative to one another; and the second gear and the fourth gear counter-rotate relative to one another.

In some embodiments, the first gear is meshed with the fourth gear; and the second gear is meshed with the third gear.

In some embodiments, the first gear and the second gear are adjacent to one another; and the third gear and the fourth gear are adjacent to one another.

In some embodiments, a diameter of the first gear is greater than a diameter of the fourth gear; and a diameter of the third gear is greater than a diameter of the second gear.

In some embodiments, the second gear and the fourth gear are spur gears.

In some embodiments, the electric motor module further comprises a belted transmission operatively connected between the gearing assembly and the drive connection shaft.

In some embodiments, the first shaft is operatively connected to the motor shaft; the second shaft is operatively connected to the belted transmission; an the belted transmission operatively connects the gearing assembly to the drive connection shaft.

In some embodiments, the belted transmission assembly comprises a sprocket mounted to the second shaft for rotation therewith.

For purposes of this application, terms related to spatial orientation when referring to the vehicle orientation and positioning of its components such as forwardly, rearwardly, left, and right are as they would normally be understood by a driver of the vehicle sitting thereon in a normal riding position.

Embodiments of the present technology each have at least one of the above-mentioned aspects, but do not necessarily have all of them.

Additional and/or alternative features, aspects, and advantages of embodiments of the present technology will become apparent from the following description, the accompanying drawings, and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION

In accordance with the present technology, a power pack 100 is provided which, by switching a modular component thereof, can be used for any vehicle selected from a pre-defined group of different vehicles having different drive requirements. For instance, the predefined group of vehicles can include an all-terrain vehicle (ATV), a snowmobile, and an on-road vehicle, all of which are driven differently.

Figure 1:
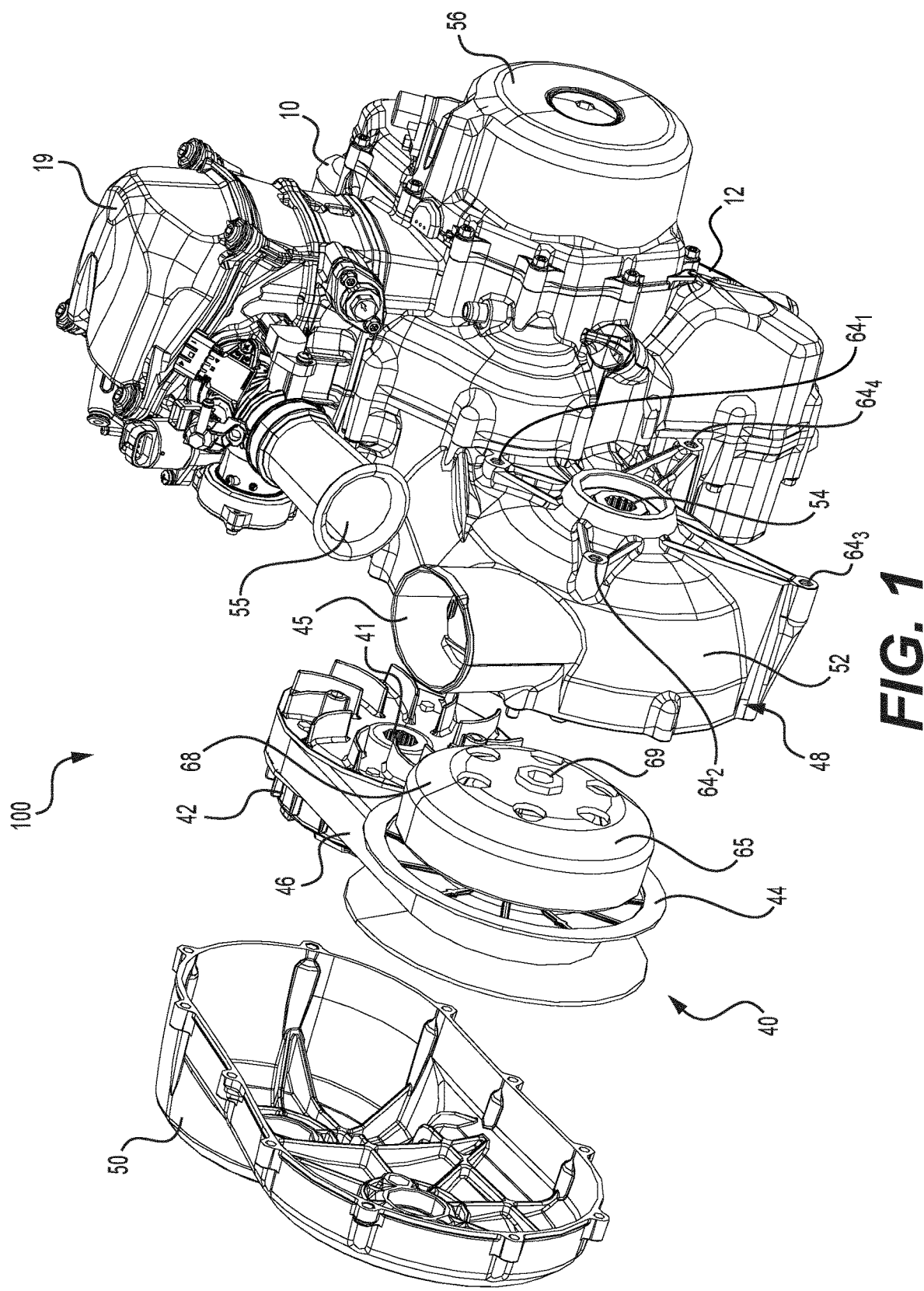
FIG. 1 is a perspective view, taken from a rear, right side, of part of a power pack for a vehicle, including an engine and a continuous variable transmission (CVT) in an exploded configuration.
Figure 3:
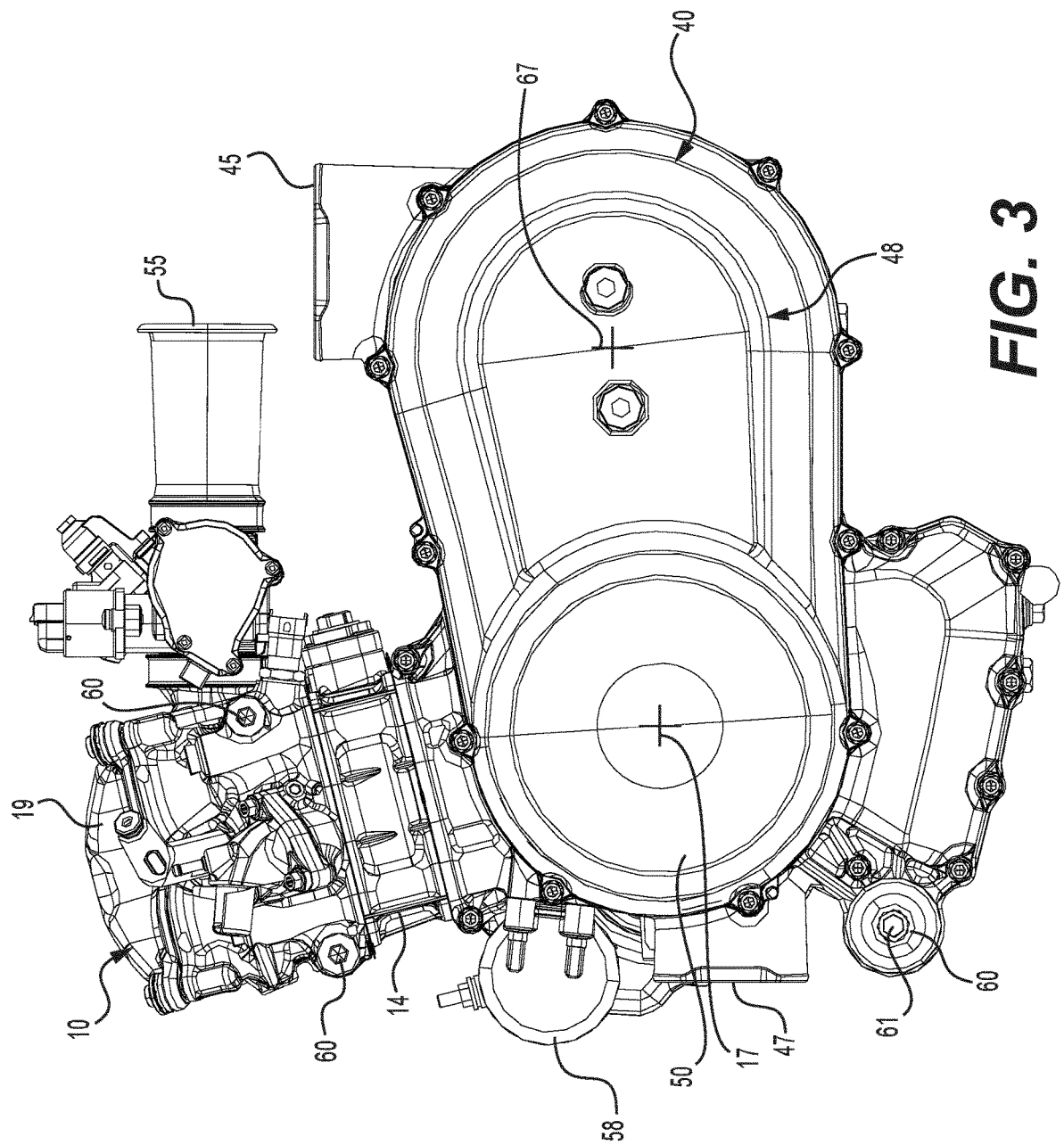
FIG. 3 is a left side elevation view of the engine and the CVT of FIG. 1, in an assembled configuration.

With reference to FIG. 1, the power pack 100 includes an internal combustion engine 10 which is configured to be supported by a frame of the vehicle to which the power pack 100 is to be installed. In this embodiment, the engine 10 operates on a two-stroke engine cycle such that the engine 10 completes a power cycle with two strokes (an upstroke and a downstroke) of the engine's piston (not shown). The engine 10 can thus be referred to as a two-stroke engine. It is contemplated that the engine 10 could be a four-stroke engine in other embodiments. With reference to FIG. 3, the engine 10 has a crankcase 12, a cylinder block 14 defining a single cylinder (not shown) connected on top of the crankcase 12 and a cylinder head 19 connected on top of the cylinder block 14. The engine 10 also has a crankshaft (not shown) disposed in the crankcase 12 and driven by the motion of the piston. An engine exhaust conduit 55 through which exhaust gas is discharged extends rearwardly from the engine 10.

Figure 4:
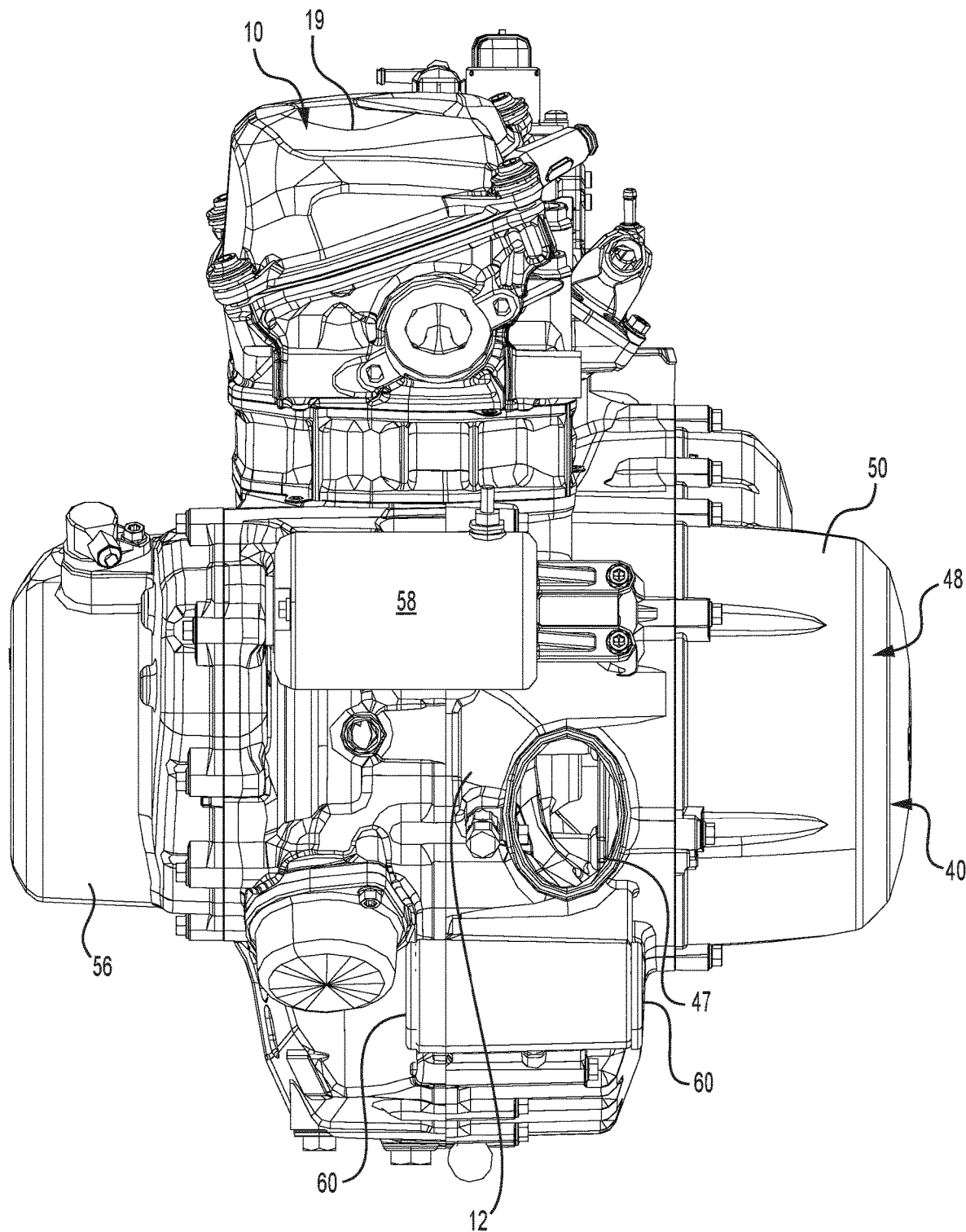
FIG. 4 is a front elevation view of the engine and the CVT of FIG. 3.

In order to mount the engine 10 to the selected vehicle to which the power pack 100 is to be installed, as shown in FIGS. 3 and 4, the engine 10 defines a plurality of engine mounts 60 for mounting the engine 10 to a frame of the vehicle. In this embodiment, each of the engine mounts 60 comprises an opening 61 for insertion therein of a corresponding protruding mounting member of the frame of the vehicle. Depending on the vehicle for which the power pack 100 is to be provided, only one of the engine mounts 60 may be used for mounting the engine 10 to the frame of the selected vehicle.

Although in this embodiment the engine 10 is a single-cylinder engine, having a single cylinder and a single piston movable therein, it is contemplated that the engine 10 could be a two-cylinder engine in other embodiments.

It is contemplated that, in some embodiments, the engine 10 could have an electronic reverse function for operating the engine 10 in reverse so that the crankshaft can be selectively rotated in a forward rotation direction and a reverse rotation direction. This can be achieved by control-ling the fuel injection and ignition within the cylinders of the engine 10. For instance, U.S. Pat. No. 5,036,802, issued Aug. 6, 1991, the entirety of which is incorporated herein by reference, describes in detail a manner in which this elec-tronic reverse function can be achieved. The electronic reverse function could be selectively activated via an elec-tronic reverse function control element (e.g., a push button) disposed on the vehicle to which the power pack 100 is to be installed.

Figure 2:
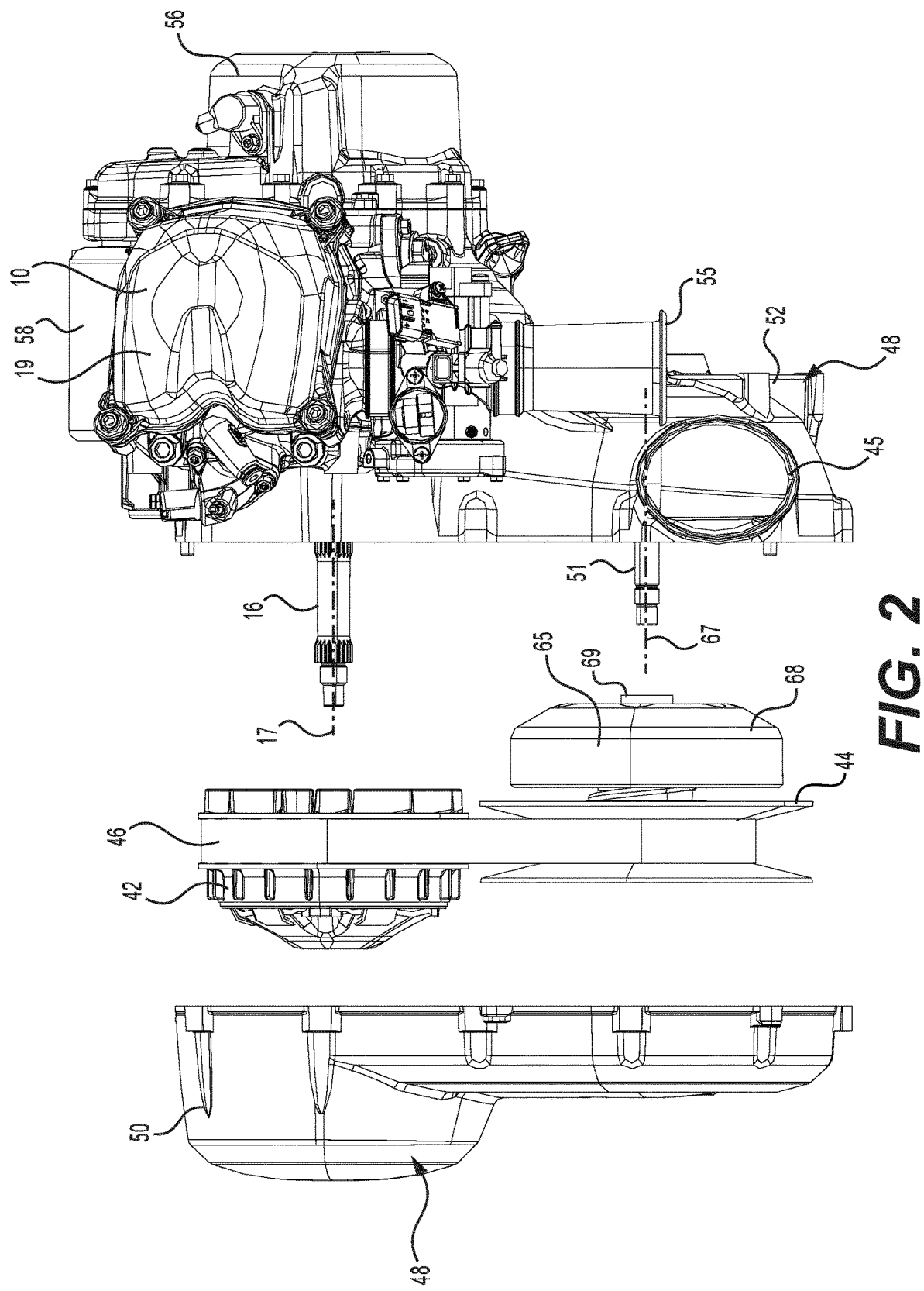
FIG. 2 is a top plan view of the exploded configuration of the engine and the CVT of FIG. 1.

As shown in FIGS. 1, 2 and 4, a generator 56 is connected to the side of the crankcase 12 opposite the power take-off side. The generator 56 uses power produced by the engine 10 to generate electrical energy for storage in a battery (not shown). An electric starter motor 58 is also connected to the front of the crankcase 12. The starter motor 58 selectively engages the crankshaft via gears (not shown) to cause the crankshaft to turn before the engine 10 can run on its own as a result of the internal combustion process in order to start the engine 10.

The power pack 100 also includes a continuously variable transmission (CVT) 40 to which the engine 10 is operatively connected. The CVT 40 includes a drive pulley 42 opera-tively connected to the crankshaft of the engine 10, a driven pulley 44, and a transmission belt 46 disposed around both pulleys 42, 44 to transmit torque from the drive pulley 42 to the driven pulley 44. In particular, as shown in FIG. 2, the drive pulley 42 is operatively connected to the crankshaft of the engine 10 via an output shaft 16 thereof which rotates about an axis 17 which extends laterally when the power pack 100 is installed on the vehicle 10. Notably, the drive pulley 42 is mounted to the output shaft 16 such that the drive pulley 42 is rotatable about the axis 17. The axis 17 may thus be referred to as a "drive pulley axis". The driven pulley 44 rotates about an axis 67 defined by a countershaft 51, which extends parallel to the axis 17 (i.e., generally laterally when the power pack 100 is installed on the selected vehicle). The axis 67 may thus be referred to as a "driven pulley axis". As will be explained below, the driven pulley 44 is operatively connected to the countershaft 51 by a centrifugal clutch 65. The driven pulley 44 is rearward and upward of the drive pulley 42 such that the driven pulley axis 67 is located rearward and upward of the drive pulley axis 17 as shown in FIG. 3.

Each of the pulleys 42, 44 includes a movable sheave that can move axially relative to a fixed sheave to modify an effective diameter of the corresponding pulley 42, 44. The drive pulley 42 is a centrifugal pulley in that the sheaves thereof move in response to a centrifugal force applied thereon. The effective diameters of the pulleys 42, 44 are in inverse relationship. In the illustrated embodiment, the CVT 40 is a purely mechanical CVT 40, in which the diameter of the driven pulley 44 increases with increasing rotational speed of the drive pulley 42 (i.e., with increasing engine speed). The diameter of the driven pulley 44 therefore decreases when the torque required at the countershaft 51 increases. The CVT 40 may thus be referred to as an "unassisted" CVT in that a gear ratio of the CVT 40 (i.e., an effective diameter of the driven pulley 44 over the effective diameter of the drive pulley 42) is automatically mechani-cally adjusted in accordance with the speed of the engine 10 and the torque requirement at the countershaft 51.

It is contemplated that, in other embodiments, the CVT 40 could be an assisted CVT such as a hydraulic CVT.

With continued reference to FIGS. 1 and 2, the driven pulley 44 is operatively connected to an input of the cen-trifugal clutch 65 which is disposed adjacent to the driven pulley 44. As shown, the centrifugal clutch 65 is coaxial with the driven pulley 44. The centrifugal clutch 65 has a clutch housing 68 and an outer coupling 69 that rotates together with the clutch housing 68. In this embodiment, the outer coupling 69 has inner splines (not shown) to receive and drivingly engage the countershaft 51. The centrifugal clutch 65 also has clutch shoes (not shown) enclosed within the clutch housing 68. The centrifugal clutch 65 operates in one of an open position and a closed position based on a rotational speed of the driven pulley 44 of the CVT 40. The centrifugal clutch 65 operates in the closed position begin-ning at a given rotational speed at which the clutch shoes drive the clutch housing 68 when the centrifugal force exerted on the clutch shoes overcomes the resistance posed by a set of springs (not shown) retaining the clutch shoes so that the clutch shoes frictionally engage the inner side of the clutch housing 68. The manner in which centrifugal clutches operate is known in the art and thus will not be described in detail herein. In this embodiment, the centrifugal clutch 65 starts operating in the closed position (i.e., the clutch housing 68 and outer coupling 69 rotate) when the rotational speed of the countershaft 51 reaches a speed approximately between 2000 rpm and 3000 rpm inclusively. Thus, in this embodiment, when the engine 10 is running at idle speed, the centrifugal clutch 65 is the open position such that the outer coupling 69 is not driven by the driven pulley 44. The centrifugal clutch 65 may transition from the open position to the closed position at different rotational speeds in other embodiments.

A CVT housing 48 encloses the drive and driven pulleys 42, 44, the transmission belt 46 and the centrifugal clutch 65 therein. Notably, the CVT housing 48 has a left portion 50 and a right portion 52 which are affixed to one another via a plurality of fasteners. The outer coupling 69 of the centrifugal clutch 65 is operatively connected to an output coupling 54 (FIG. 1) via the countershaft 51. Notably, in this embodiment, the output coupling 54 is defined by a right end of the countershaft 51. As can be seen, the output coupling 54 is rotatably connected to the right portion 52 of the CVT housing 48. As such, when the centrifugal clutch 65 is closed, the outer coupling 69 drives the output coupling 54. The output coupling 54 is accessible on the right side of the power pack 100 for allowing driving engagement with the driven pulley 44, as will be described in greater detail below.

As shown in FIGS. 1 and 4, the right portion 52 of the CVT housing 48 defines an air inlet 45 and an air outlet 47 for respectively receiving and discharging air from the CVT housing 48. Air circulation through the air inlet and outlets 45, 47 allows cooling of the CVT components, namely of the belt 46 which may degrade if subjected to excessive heat. In this embodiment, the air inlet 45 faces upwardly while the air outlet 47 faces forwardly.

The CVT housing 48 also has a plurality of mounts $64_1$-$64_4$ for mounting a sub-transmission thereto. The mounts $64_1$-$64_4$ may thus be referred to as "sub-transmission mounts". Each one of the sub-transmission mounts $64_1$-$64_4$ thus defines a respective mounting point to which the sub-transmission is mounted. In particular, in this embodiment, each sub-transmission mount $64_1$-$64_4$ is an internally threaded opening defined by the CVT housing 48. In this embodiment, the right portion 52 of the CVT housing 48 defines the sub-transmission mounts $64_1$-$64_4$ such that the sub-transmission is mounted to the right side of the CVT housing 48. As will be described in greater detail below, the configuration of the sub-transmission mounts $64_1$-$64_4$ allows the CVT housing 48 to mount any selected sub-transmission of a group of different sub-transmissions.

In order for the power pack 100 to be able to be used for any vehicle of the predefined group of different vehicles, the power pack 100 is provided with a sub-transmission that is selected from a predefined group of different sub-transmissions 110, 210, 310 depending on the selected vehicle for which the power pack 100 is to be provided. In other words, each sub-transmission 110, 210, 310 is associated with a corresponding vehicle of a group of different vehicles, and therefore by providing the power pack 100 with a selected one of the sub-transmissions 110, 210, 310, the power pack 100 can be used for the vehicle to which the sub-transmission 110, 210, 310 corresponds. In this embodiment, the sub-transmissions 110, 210, 310 correspond to a snowmobile, an on-road vehicle, and an all-terrain vehicle (ATV) respectively. The sub-transmissions 110, 210, 310 will thus be referred to as a "snowmobile sub-transmission" 110, an "on-road sub-transmission" 210 and an "ATV sub-transmission" 310. Their configurations and respective implementation on the power pack 100 will be described in greater detail below.

Figure 5:
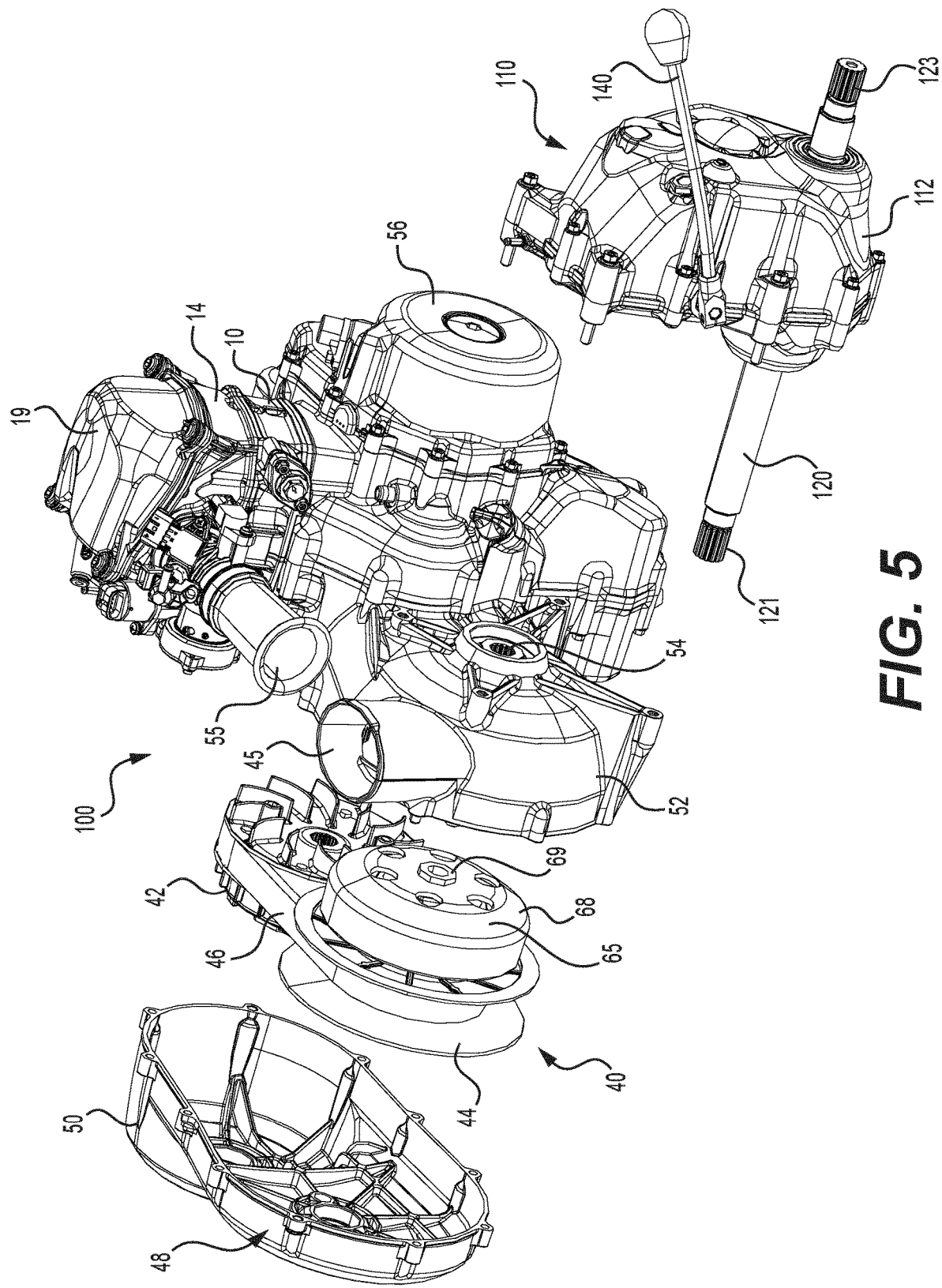
FIG. 5 is a perspective view of the power pack of FIG. 1, including the engine, the CVT and a first sub-transmission selected from a group of different sub-transmissions, in an exploded configuration.

It is to be understood that the predefine group of vehicles is not limited to a snowmobile, an on-road vehicle and an ATV, and the power pack 100 could be provided for other vehicles requiring corresponding drive output(s). Thus, the terms "snowmobile sub-transmission", "on-road sub-transmission" and "ATV sub-transmission" are used herein to differentiate the sub-transmissions from one another and to identify one possible intended use, but are not intended to limit the use of these sub-transmissions to a single type of vehicle Power Pack for a Snowmobile With reference to FIG. 5, in one potential configuration, the power pack 100 is to be provided for a snowmobile and therefore the snowmobile sub-transmission 110 is selected from the sub-transmissions 110, 210, 310 to be a part of the power pack 100. An example of a snowmobile for which this configuration of the power pack 100 could be provided can be found for example in U.S. Pat. No. 9,114,852, issued on Aug. 25, 2015, which is incorporated in its entirety by reference herein. The snowmobile sub-transmission 110 is configured to be operatively connected between the CVT 40 and a ground-engaging member (i.e., a drive track) of the snowmobile for driving thereof.

The snowmobile sub-transmission 110 will now be described with reference to FIGS. 6 to 9. The snowmobile sub-transmission 110 has a sub-transmission housing 112 which defines an interior space of the snowmobile sub-transmission 110 and encloses a plurality of gears 150 therein (schematically illustrated in FIG. 7). Notably, the sub-transmission housing 112 has a right portion 111 and a left portion 113 which are fastened to one another to enclose the gears 150 and other components therein. The attachment of the portions 111, 113 of the sub-transmission housing 112 results in the snowmobile sub-transmission being sealed such that the interior space thereof is inaccessible without disassembly of the sub-transmission housing 112.

A lubrication inlet 148 extends upwardly from a top portion of the sub-transmission housing 112 for lubricating the gearing system of the snowmobile sub-transmission 110.

Figure 7:
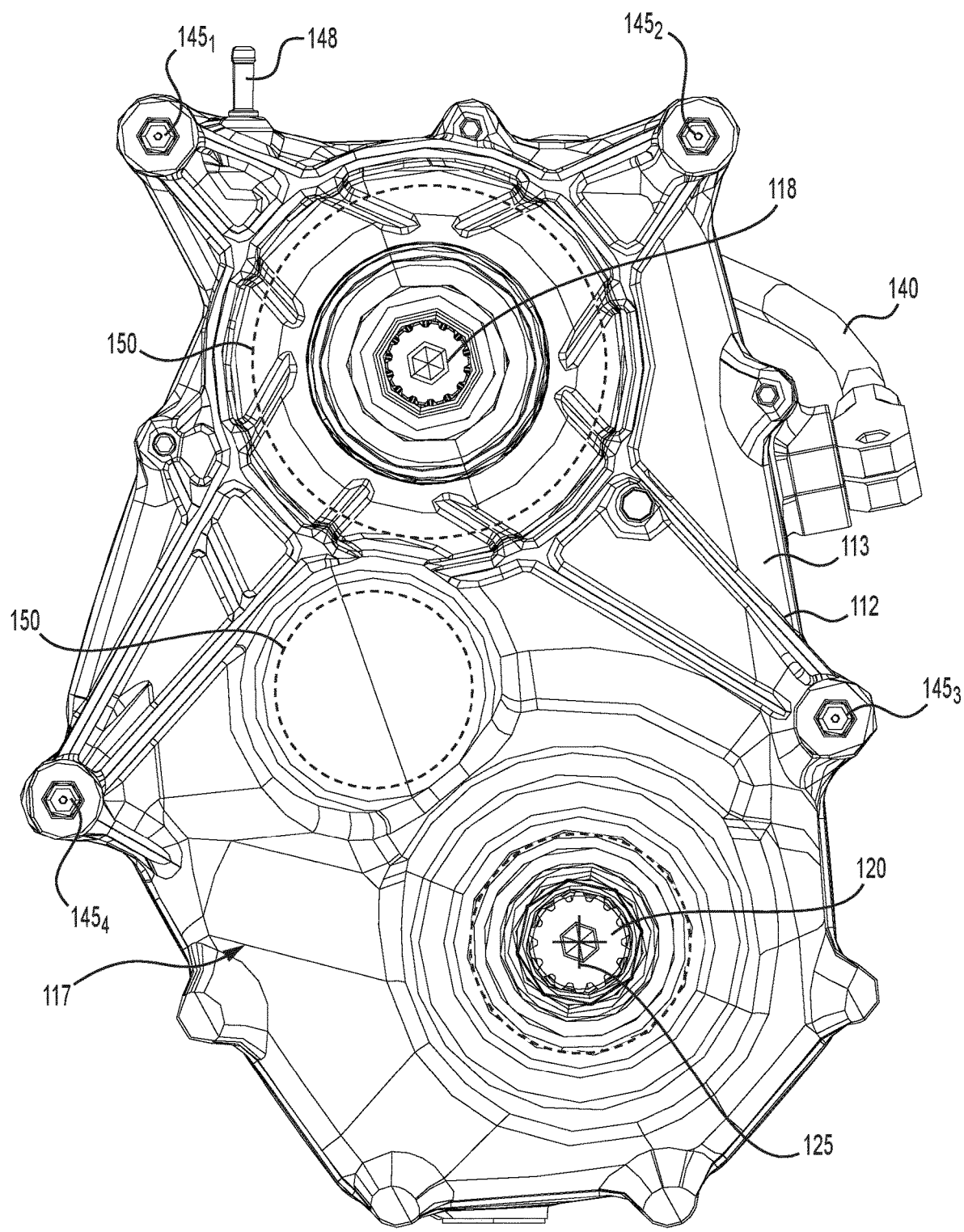
FIG. 7 is a left side elevation view of the first sub-transmission of FIG. 5.
Figure 8:
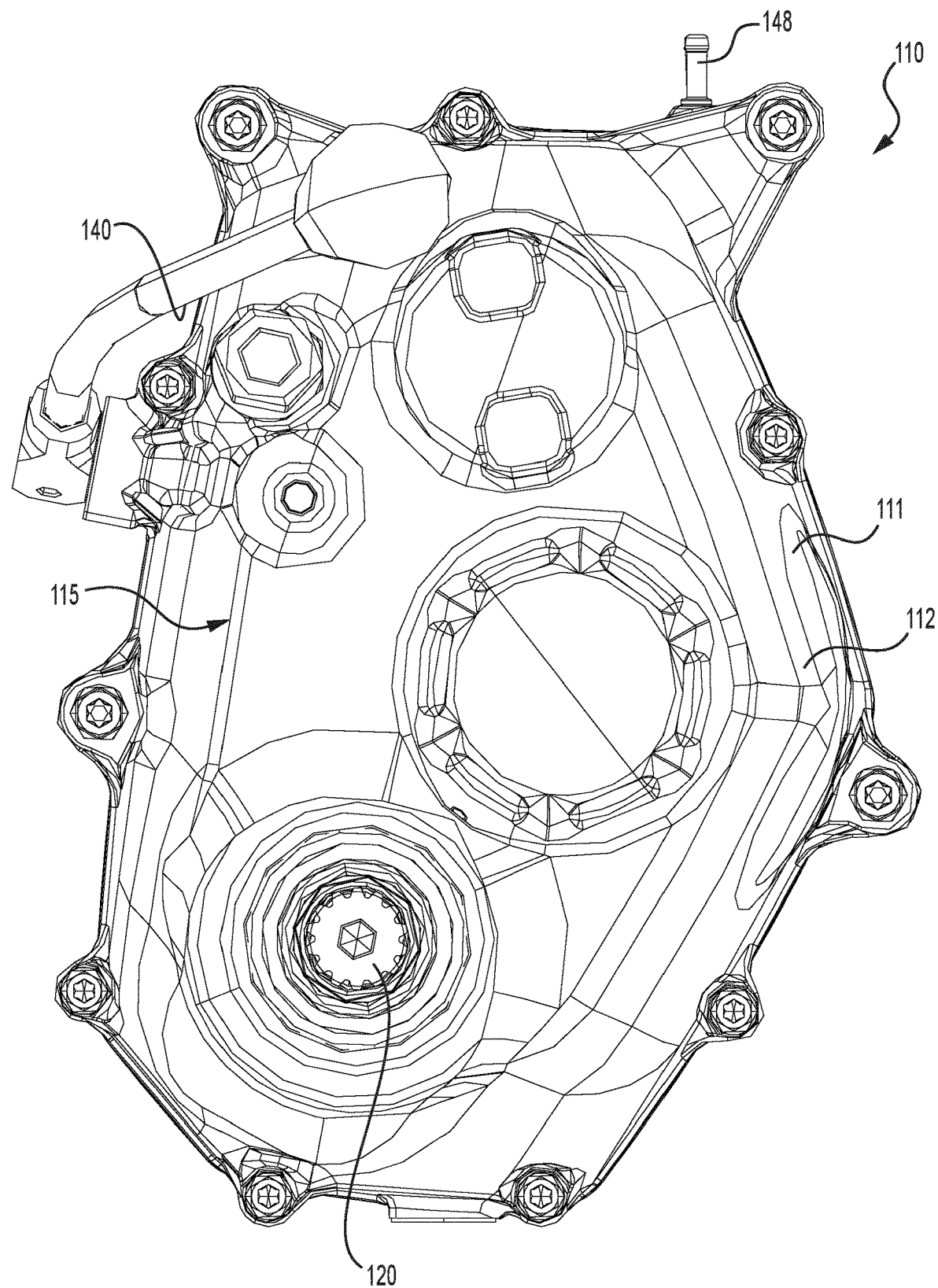
FIG. 8 is a right side elevation view of the first sub-transmission of FIG. 5.
Figure 9:
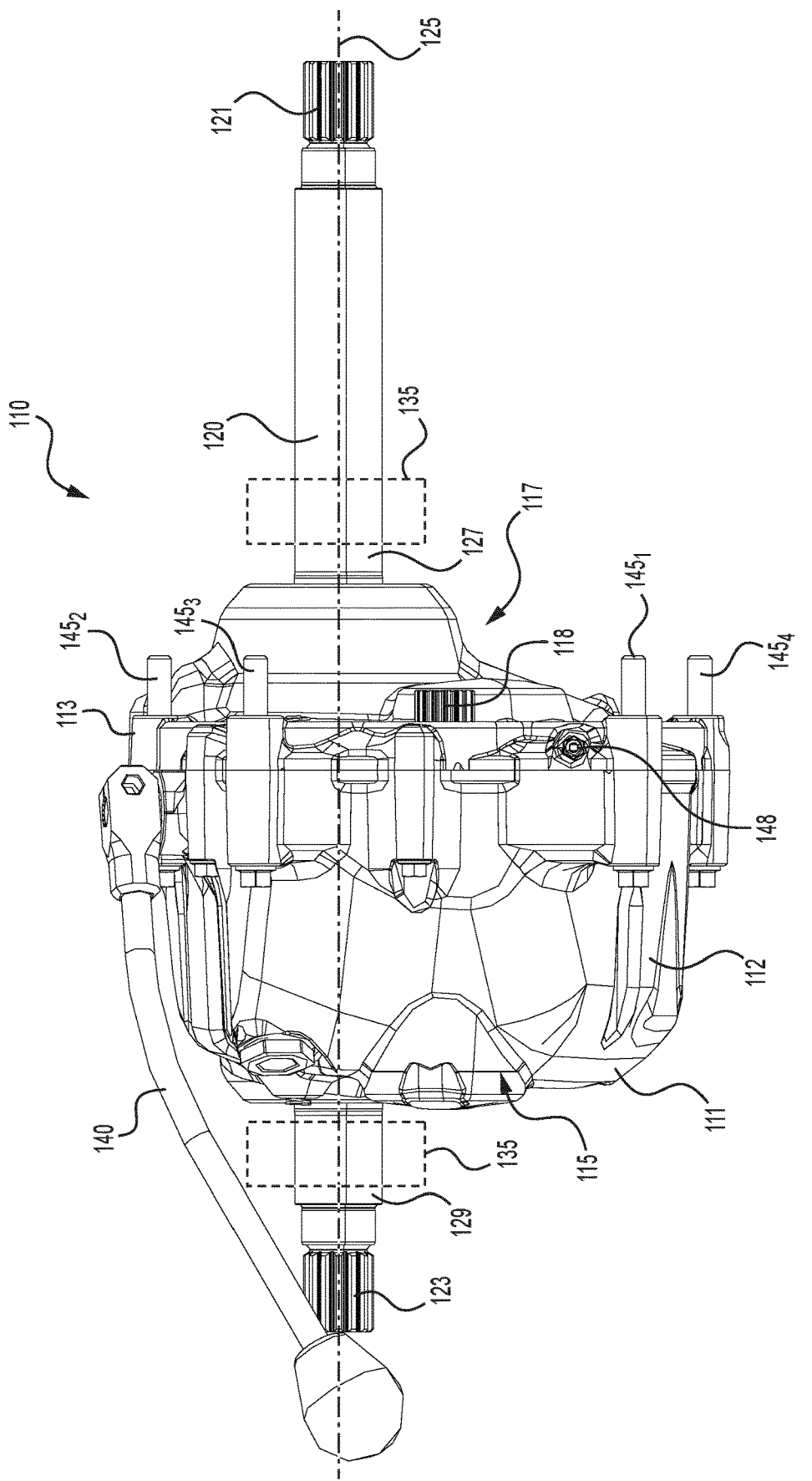
FIG. 9 is a top plan view of the first sub-transmission of FIG. 5.

As shown in FIGS. 7 and 9, the snowmobile sub-transmission 110 has an input shaft 118 extending outwardly from the sub-transmission housing 112 on a left side 117 of the snowmobile sub-transmission 110. The input shaft 118 is configured to be received by the output coupling 54 so that the CVT 40 and the snowmobile sub-transmission 110 are in driving engagement. Notably, the input shaft 118 and the output coupling 54 are splined and thus are drivingly connected. Thus, in use, the input shaft 118 rotates about the driven pulley axis 67.

Figure 6:
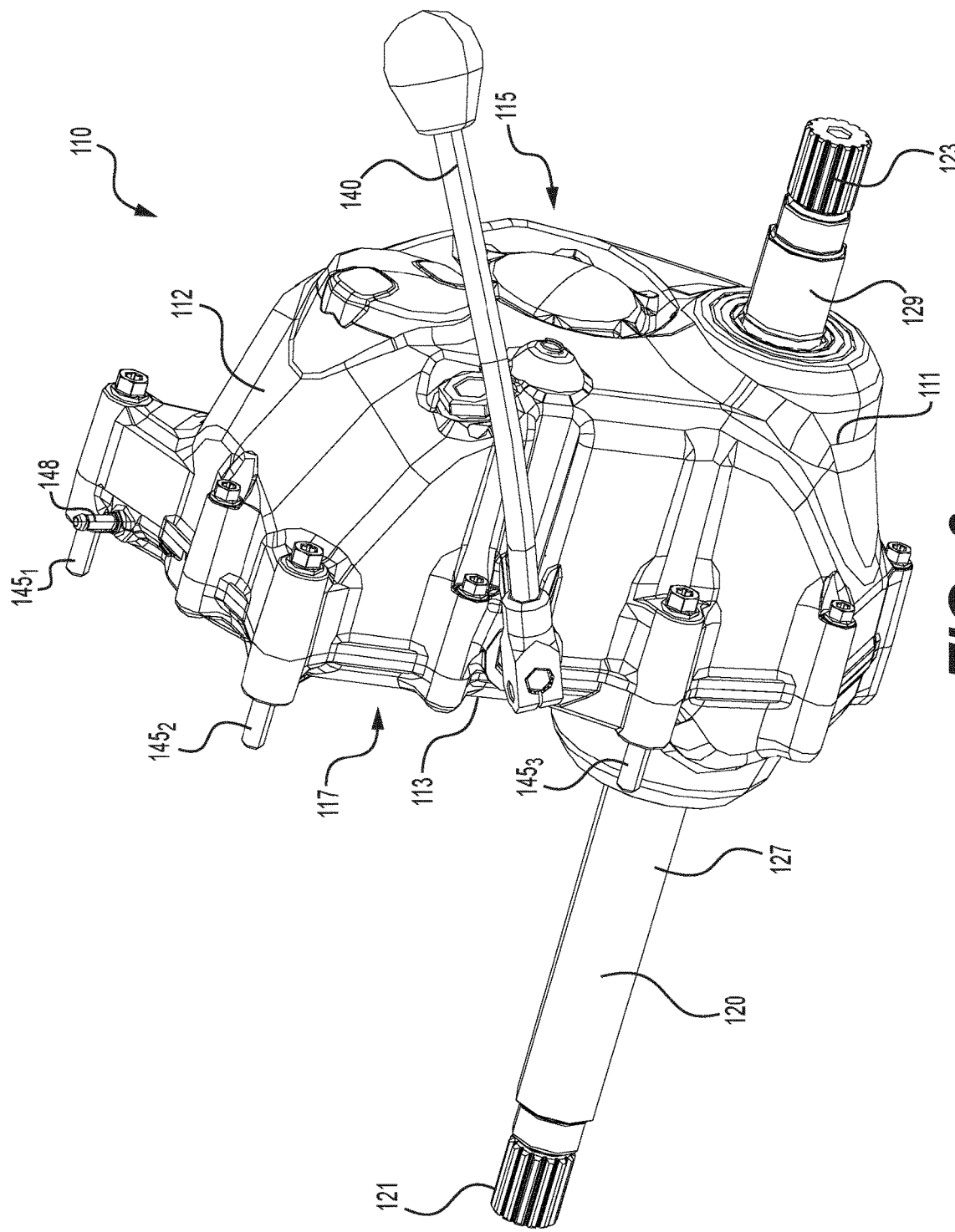
FIG. 6 is a perspective view, taken from a rear, right side, of the first sub-transmission of FIG. 5.

The gears 150 operatively connect the input shaft 118 to an output shaft 120 of the snowmobile sub-transmission 110. The output shaft 120 is rotatable about an output shaft axis 125 which extends along a direction generally parallel to the driven pulley axis 67 such that, when the power pack 100 is installed on the snowmobile, the output shaft axis 125 extends generally laterally. The output shaft 120 is configured to be operatively connected to the drive track of the snowmobile. As can be seen, the output shaft 120 has two driving portions 121, 123 for driving respective drive sprockets of the snowmobile which in turn engage the drive track thereof to propel the snowmobile. As shown in FIG. 6, the output shaft 120 extends laterally outwardly from both lateral sides of the sub-transmission housing 112.

As shown in FIGS. 7 and 9, in order to be connected to the CVT 40, the snowmobile sub-transmission 110 has a plurality of mount connectors $145_1$-$145_4$ which are configured to be engaged with the sub-transmission mounts $64_1$-$64_4$ of the CVT housing 48. Notably, in this embodiment, each of the mount connectors $145_1$-$145_4$ is a fastener which extends through both portions 111, 113 of the sub-transmission housing 112 to threadedly engage a corresponding one of the sub-transmission mounts $64_1$-$64_4$.

With particular reference to FIG. 9, the snowmobile sub-transmission 110 defines two shaft mounting portions 127, 129 through which, in addition to the vehicle mounts 60 of the engine 10, the power pack 100 can be mounted to the snowmobile. In particular, the shaft mounting portions 127, 129 are portions of the output shaft 120 which are configured to be supported by the frame of the snowmobile via bearings 135 (schematically illustrated in FIG. 9). For instance, in use, the shaft mounting portions 127, 129 of the snowmobile sub-transmission 110 will be supported by a tunnel of the snowmobile via the bearings 135.

The snowmobile sub-transmission 110 also has a shifter 140, including a shifter lever, for selectively engaging the input shaft 118 with one of the gears 150. More specifically, in use, the shifter 140 is operable by a user of the snowmobile to engage a gear of the sub-transmission 110 so as to modify the driving operation of the output shaft 120. Notably, the shifter 140 allows the user to operate the snowmobile sub-transmission 110 in one of a plurality of "gears", which, in this embodiment, includes a high gear, a low gear, a neutral gear and a reverse gear. Notably, particular ones of the gears 150 are associated with the high, low and reverse gears such that, when engaged via the shifter 140, the snowmobile drives in high gear, in low gear and in reverse respectively.

It is contemplated that the snowmobile sub-transmission 110 could be operable in a different number of gears in other embodiments.

Figure 10:
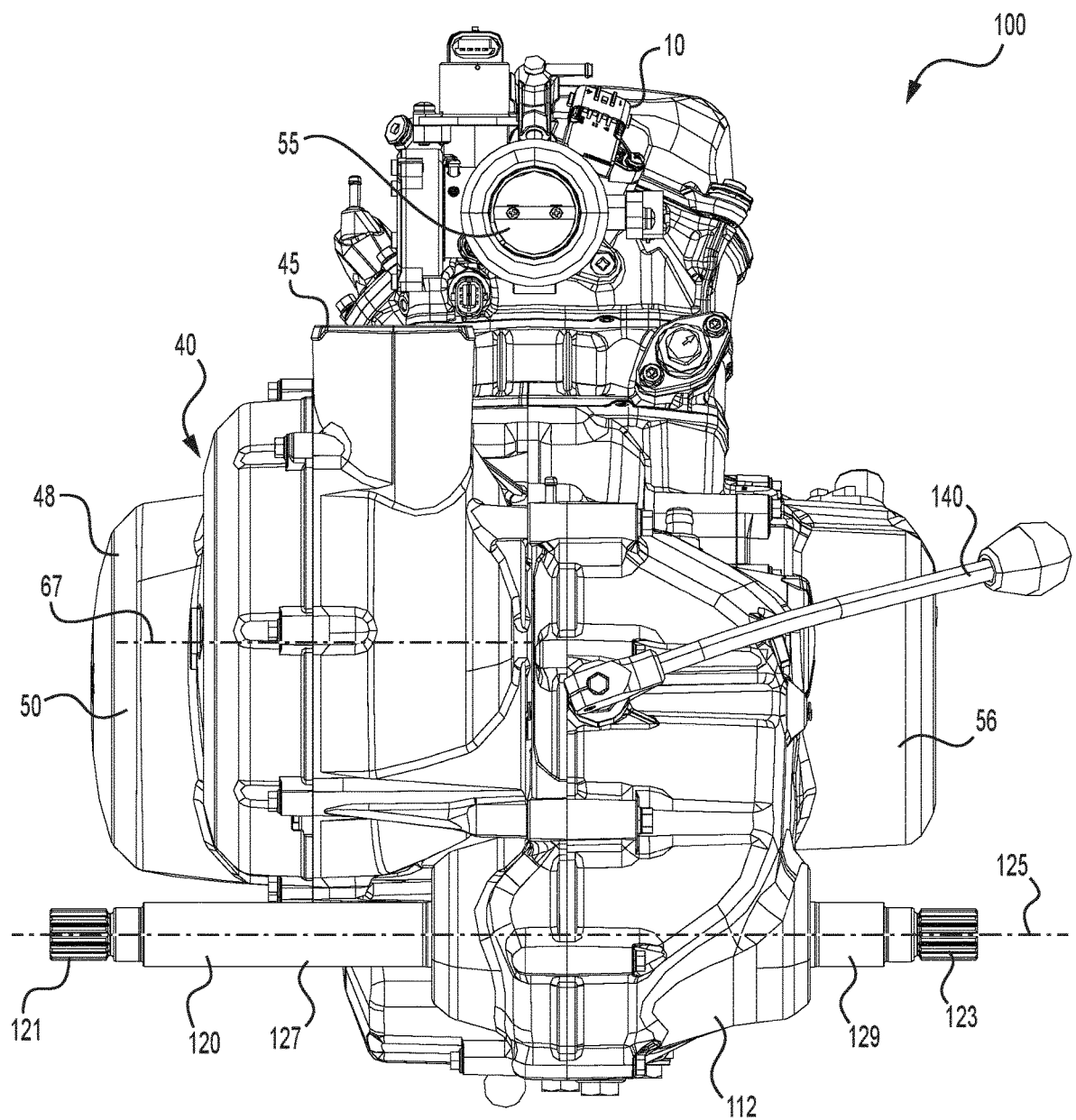
FIG. 10 is a rear elevation view of the power pack of FIG. 5 in an assembled configuration.
Figure 11:
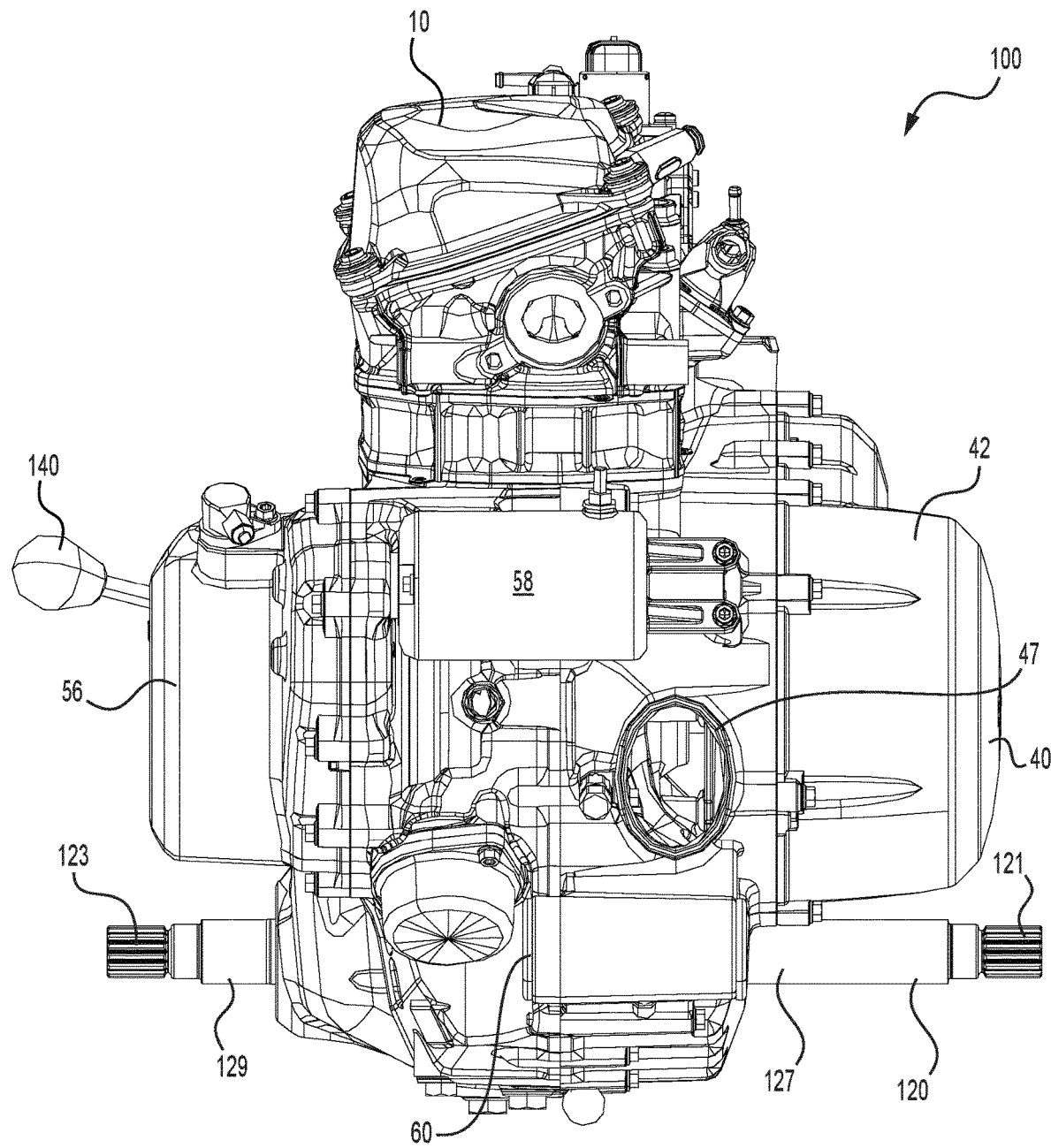
FIG. 11 is a front elevation view of the power pack of FIG. 10.
Figure 12:
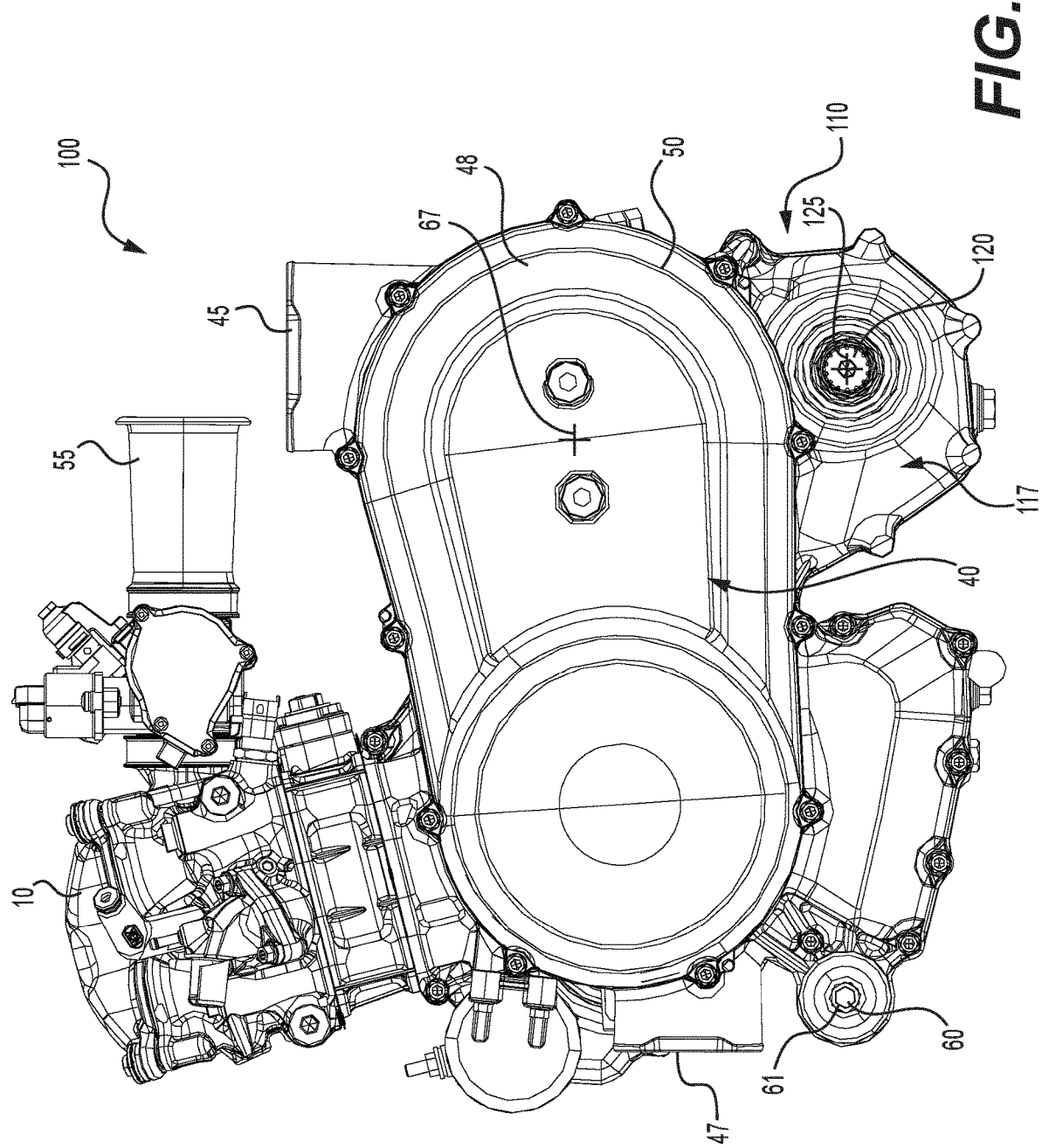
FIG. 12 is a left side elevation view of the power pack of FIG. 10.
Figure 13:
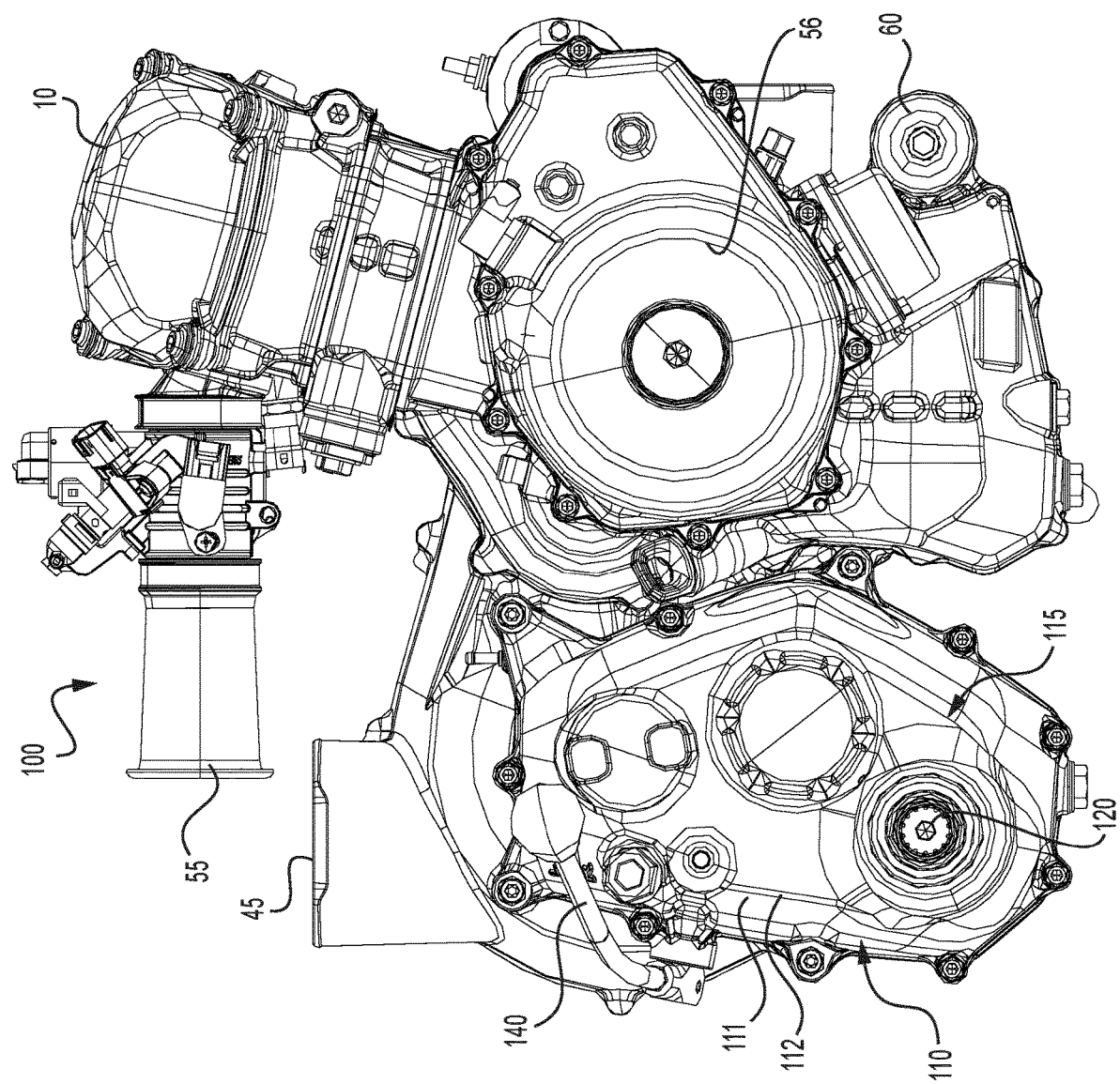
FIG. 13 is a right side elevation view of the power pack of FIG. 10.

The power pack 100 including the snowmobile sub-transmission 110 is shown assembled in FIGS. 10 to 13. As can be seen, the power pack 100 is configured such that part of the crankcase 12 of the engine 10 and the snowmobile sub-transmission 110 are disposed on the right side of the CVT 40. Notably, as shown in FIG. 10, part of the snowmobile sub-transmission 110 extends laterally away from the CVT 40 (i.e., toward the right) past the engine 10. For instance, in this embodiment, part of the sub-transmission housing 112 and the output shaft 120 extend laterally away from the CVT 40 past the engine 10. Moreover, with reference to FIGS. 10 and 12, the output shaft 120 of the snowmobile sub-transmission 110 is positioned relatively low. For instance, the output shaft axis 125 of the output shaft 120 is vertically lower than the driven pulley axis 67.

Also, as can be seen, all the mounting points defined by the sub-transmission mounts $64_1$-$64_4$ of the CVT housing 48 are used to mount the snowmobile sub-transmission 110 to the CVT housing 48. That is, every one of the sub-transmission mounts $64_1$-$64_4$ of the CVT housing 48 receives a corresponding one of the mount connectors $145_1$-$145_4$.

The snowmobile sub-transmission 110 is a modular unit of the power pack 100 which is attached to the CVT 40 but that is otherwise spatially independent therefrom. Notably, the interior space of the snowmobile sub-transmission 110, as defined by the sub-transmission housing 112, is sealed from the CVT housing 48. As such, air flow within the CVT housing 48 is independent of the snowmobile sub-transmission 110. In other words, air flow entering into the CVT housing 48 (via the air inlet 45) does not enter into the interior space of the snowmobile sub-transmission 110.

It is to be understood that this particular configuration of the power pack 100 is not limited for use with a snowmobile, but could instead be used on other vehicles that are driven by the two laterally-extending driving portions 121, 123.

Figure 32:
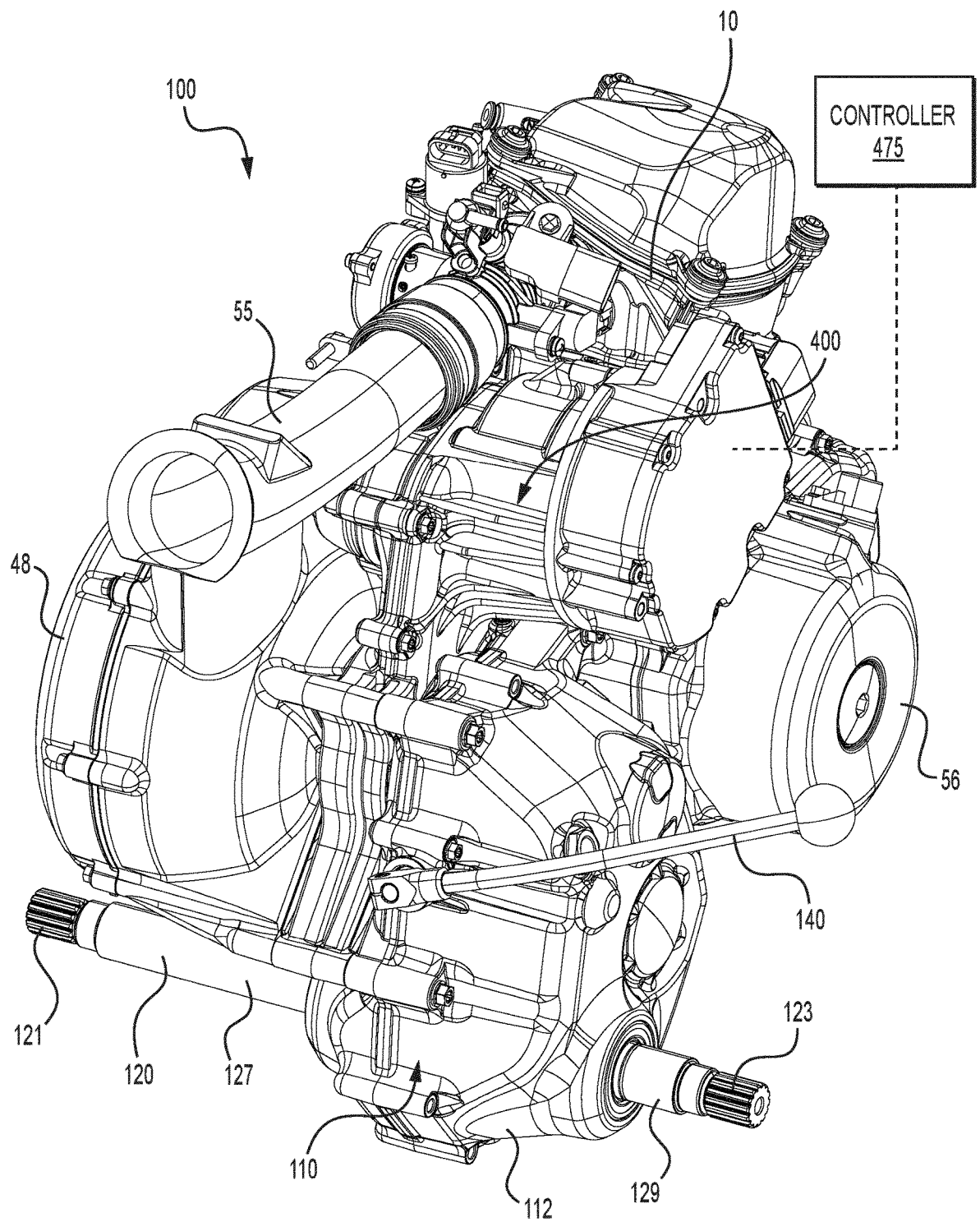
FIG. 32 is a perspective view, taken from a rear, right side, of part of the power pack in accordance with another embodiment of the present technology in which the power pack includes the engine, the CVT, the first sub-transmission and an electric motor module.
Figure 33:
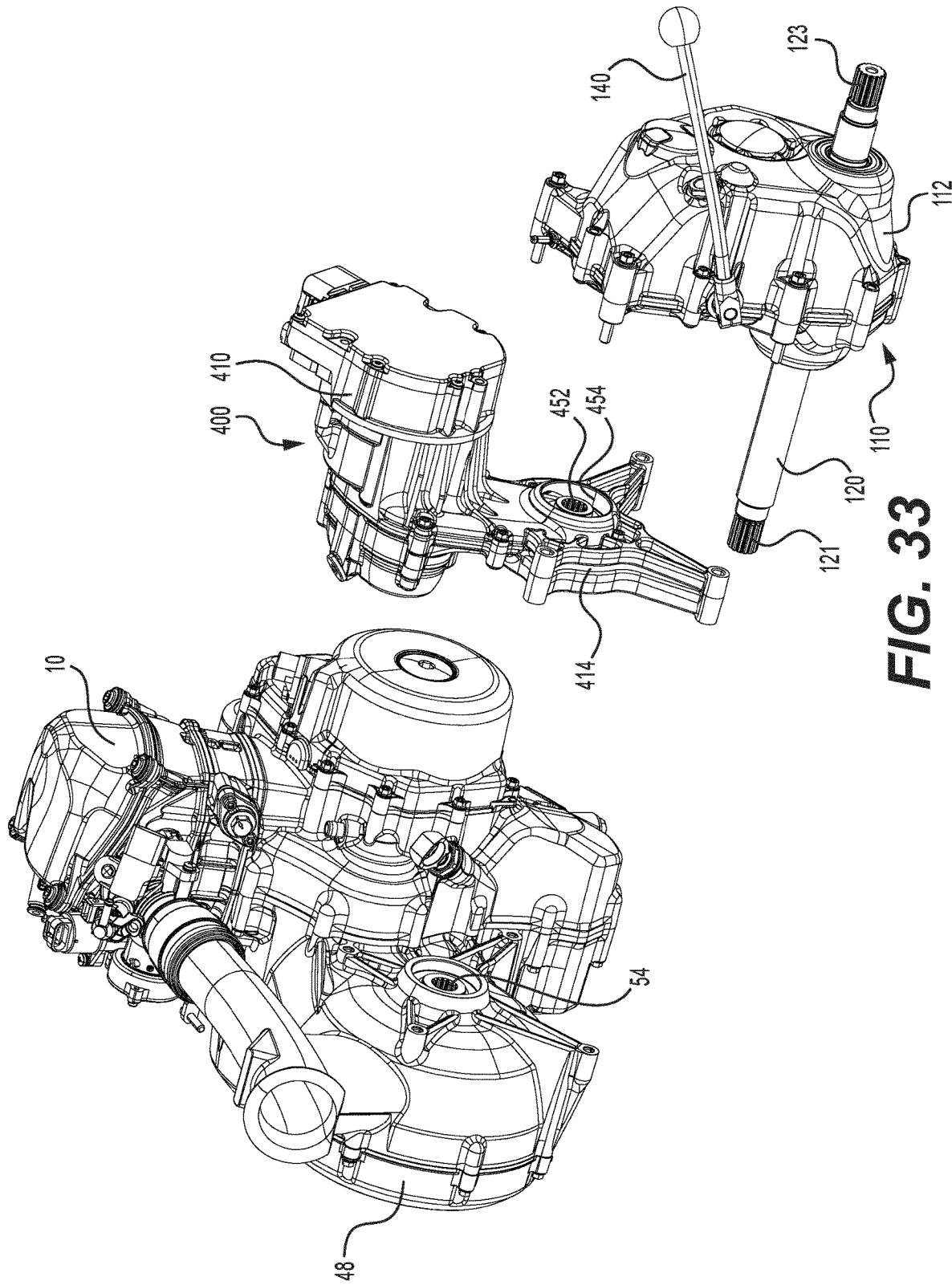
FIG. 33 is a partially exploded perspective view of the power pack of FIG. 32.

With reference to FIGS. 32 and 33, in some embodiments, the power pack 100 also includes an electric motor module 400 that is operatively connected between the CVT 40 and the snowmobile sub-transmission 110. The electric motor module 400 includes an electric motor 410 and a drive assembly 412 (FIGS. 34, 35) operatively connected to the electric motor 410.

Figure 34:
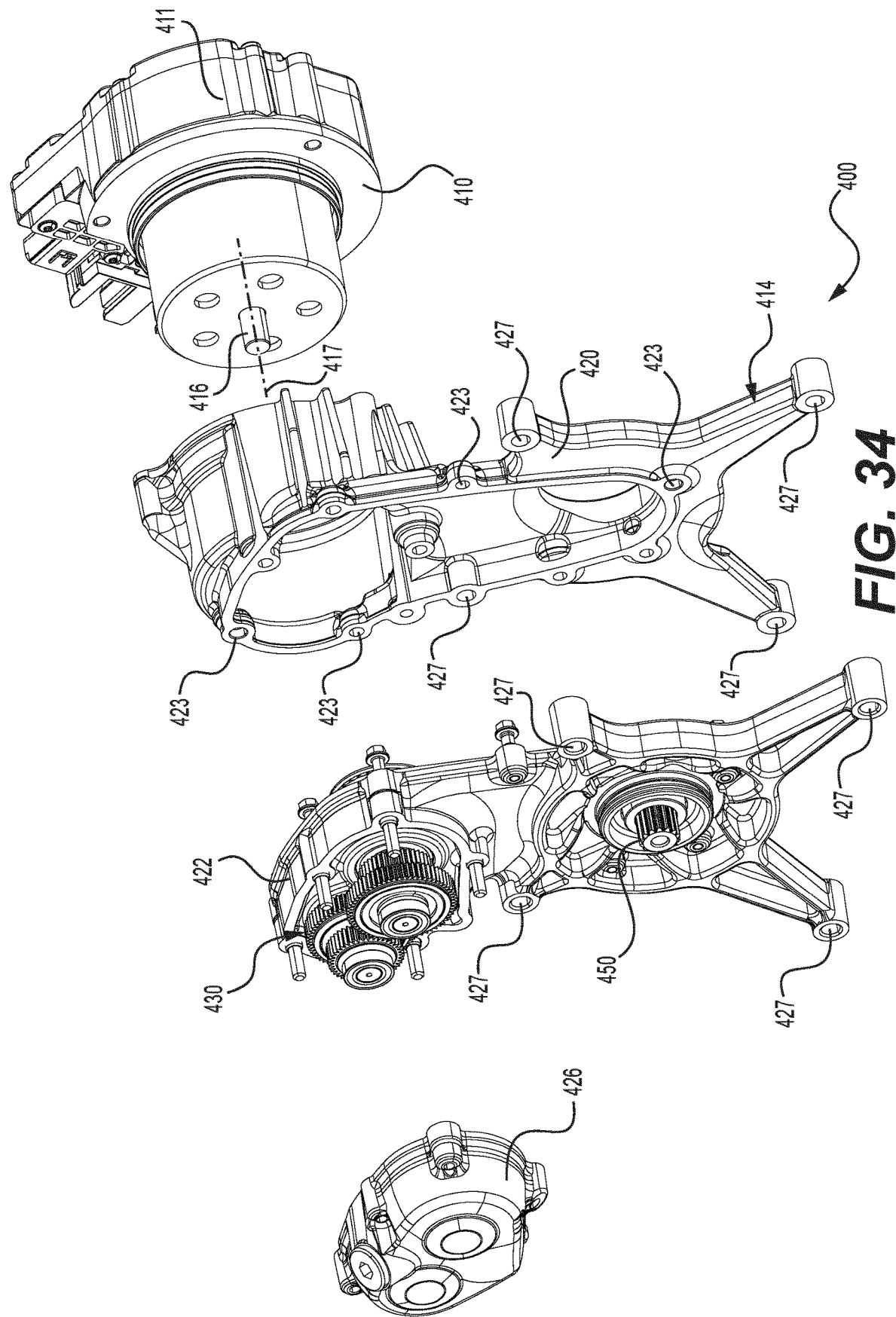
FIG. 34 is a partially exploded perspective view, taken from a rear, left side, of the electric motor module of FIG. 32.
Figure 35:
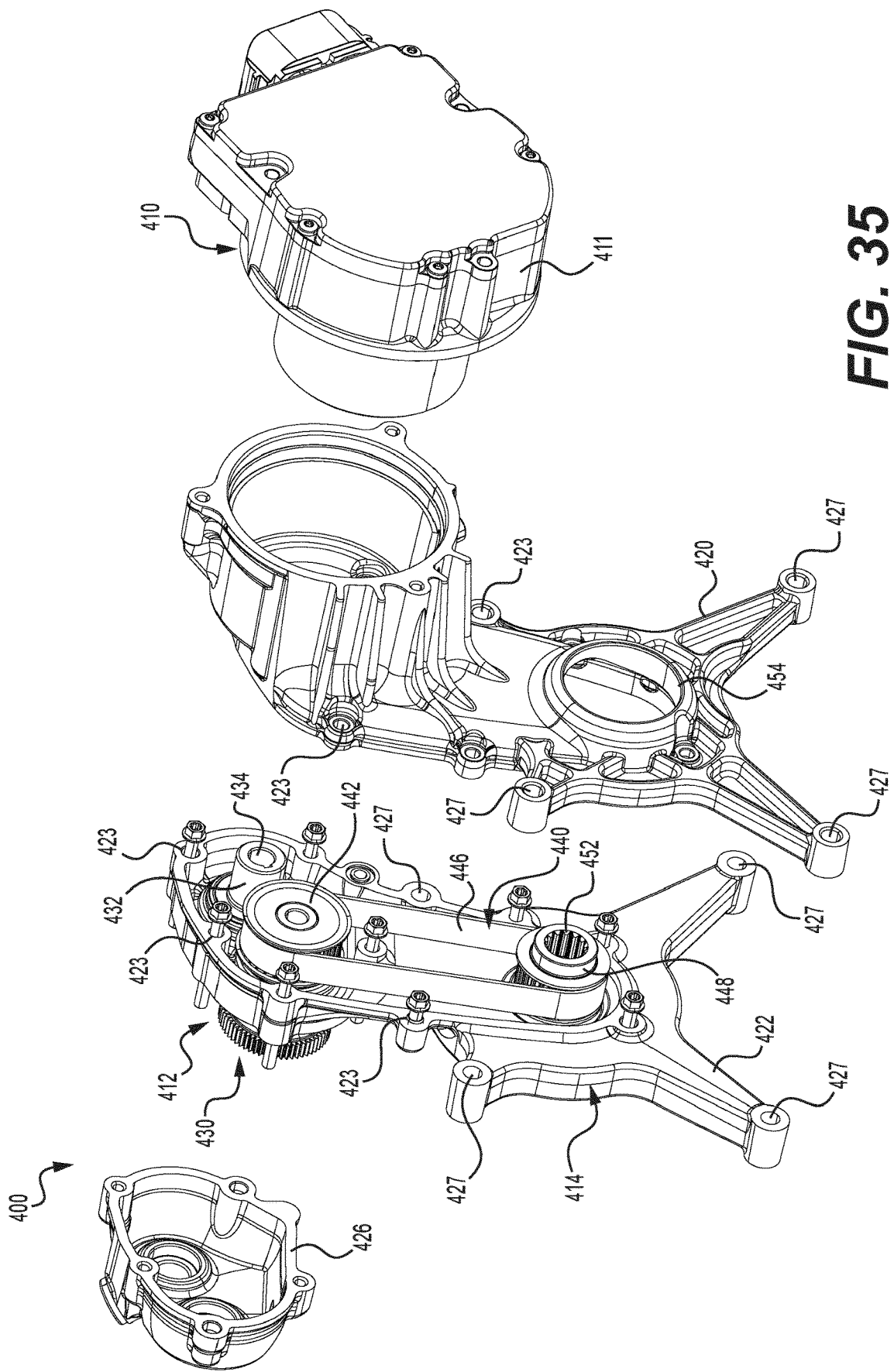
FIG. 35 is a partially exploded perspective view, taken from a rear, right side, of the electric motor module of FIG. 32.

With reference to FIGS. 34 and 35, the drive assembly 412 is enclosed by a housing 414 that includes a right portion 420, a middle portion 422 and a left portion 426. The right and middle portions 420, 422 of the housing 414 extend vertically lower than the left portion 426 and are connected to one another via fasteners received in respective openings 423 of each of the right and middle portions 420, 422. Moreover, the right portion 420 of the housing 414 is connected to a motor housing 411 enclosing the motor 410. The housing 414 is mounted to the CVT housing 48 on the right side thereof. Notably, each of the right and middle portions 420, 422 of the housing 414 has a plurality of mounts 427 which are used for mounting the housing 414 of the electric motor module 400 to the CVT housing 48. Notably, the mounts 427 of the right portion 420 are aligned with the mounts 427 of the middle portion 422 to define a plurality of mounting points of the housing 414. The mounting points of the housing 414 are aligned with the mounting points defined by the mounts $64_1$-$64_4$ of the CVT housing 48 so as to mount the electric motor module 400 to the CVT housing 48. As such, the electric motor module 400 defines the same pattern of mounting points as the CVT housing 48, thereby facilitating the subsequent mounting of the sub-transmission 110.

As shown in FIG. 34, the electric motor 410 has a motor shaft 416 that rotates about a motor shaft axis 417. The motor shaft axis 417 extends generally laterally (i.e., generally parallel to the driven pulley axis 67). The motor shaft 416 is operatively connected to the drive assembly 412 so that torque can be transferred from the electric motor 410 to the drive assembly 412 and vice-versa as will be explained in detail below.

As shown in FIGS. 34 to 37, the drive assembly 412 includes a gearing assembly 430 and a belted transmission 440 that are operatively connected to one another. As best shown in FIG. 35, the gearing assembly 430 includes a primary shaft 432 that rotates about a primary shaft axis 419 coaxial with the motor shaft axis 417. The primary shaft 432 operatively connects the motor shaft 416 to the drive assembly 412. In particular, the primary shaft 432 defines a bore 434 that receives the motor shaft 416 therein and is drivingly engaged therewith via a key and shaft arrangement. The gearing assembly 430 also includes secondary shaft 436 operatively connected to the primary shaft 432. The secondary shaft 436 rotates about a secondary shaft axis 437 that extends parallel to the primary shaft axis 419. As can be seen, two bearings 468, 470 are mounted to the primary shaft 432 and two bearings 472, 474 are mounted to the secondary shaft 436. Notably, the primary and secondary shafts 432, 436 are rotatably supported by the housing 414 via the bearings 468, 470, 472, 474. The gearing assembly 430 also includes a plurality of gears 460, 462, 464, 466 configured to transmit torque between the primary and secondary shafts 432, 436. The manner in which the gearing assembly 430 operates will be described in greater detail further below.

The secondary shaft 436 operatively connects the belted transmission 440 to the gearing assembly 430. The belted transmission 440 includes an upper sprocket 442, a lower sprocket 444 and a belt 446 operatively connecting the upper and lower sprockets 442, 444. The upper sprocket 442 and the lower sprocket 444 are mounted, respectively, to the secondary shaft 436 and to a drive connection shaft 448 for rotation therewith. The drive connection shaft 448 is rotatable about a connection shaft axis 449 that extends parallel to the primary and secondary shaft axes 419, 437. The drive connection shaft 448 is disposed laterally between the CVT housing 48 of the CVT 40 and the sub-transmission 110.

The drive connection shaft 448 is operatively connected between the driven pulley 44 of the CVT 40 and the gearing assembly 430. More specifically, the drive connection shaft 448 is operatively connected to the driven pulley 44 by the centrifugal clutch 65, while being operatively connected to the gearing assembly 430 by the belted transmission 440. As such, as will be explained below, torque can be transmitted from the driven pulley 44 to the gearing assembly 430 by the drive connection shaft 448. The drive connection shaft 448 is also operatively connected to the sub-transmission 110 so that torque can be transmitted from the drive connection shaft 448 to the output shaft 120 of the sub-transmission 110. In other words, the input shaft 118 of the sub-transmission 110 is operatively connected between the drive connection shaft 448 and the output shaft 120 of the sub-transmission 110.

Figure 36:
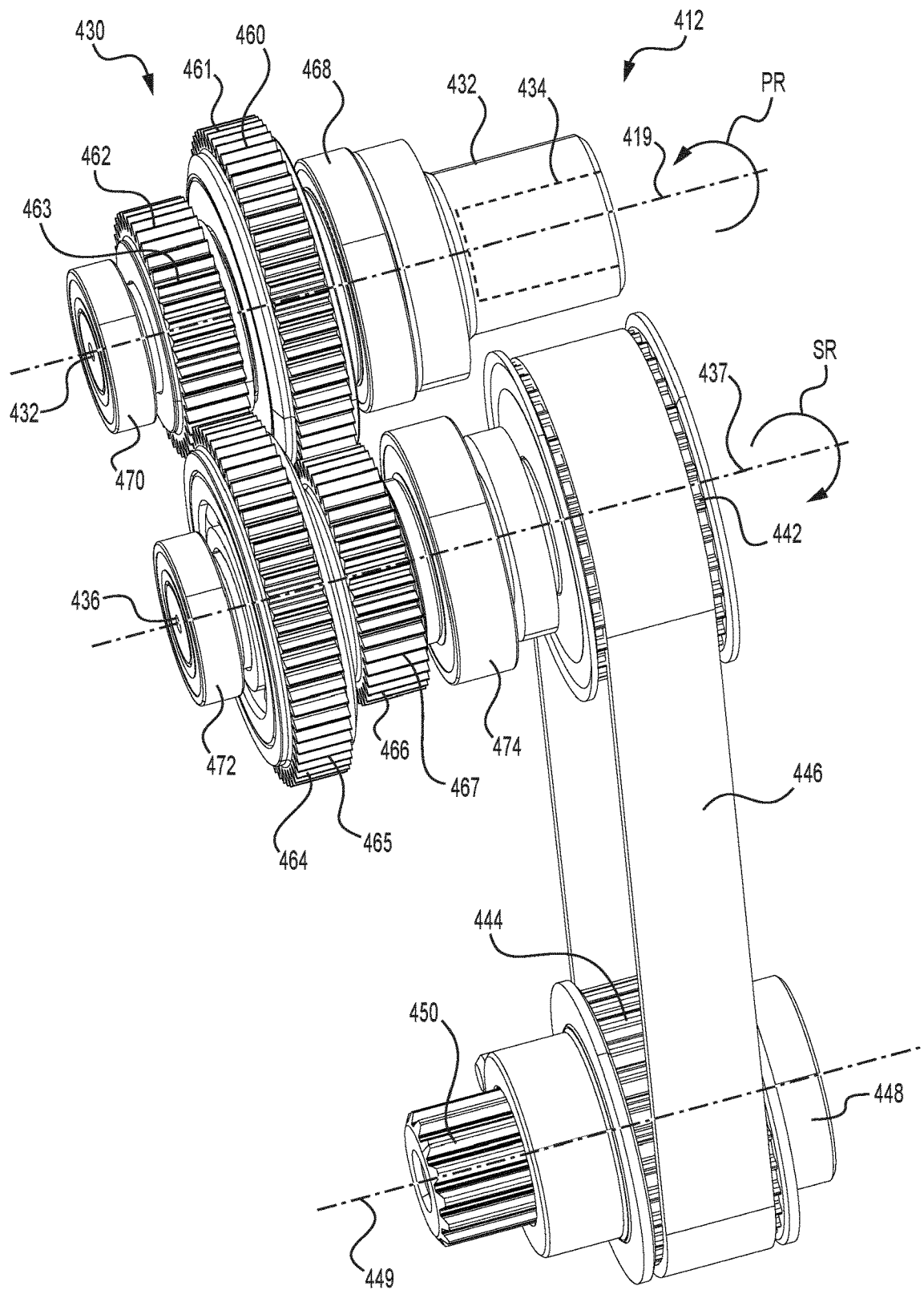
FIG. 36 is a perspective view, taken from a rear, left side, of a drive assembly of the electric motor module of FIG. 32.

As shown in FIGS. 35 and 36, the drive connection shaft 448 defines an outer splined connector 450 at a left end thereof and an inner splined connector 452 at a right end thereof. Notably, the outer splined connector 450 is inserted into the splined output coupling 54 on the right portion 52 of the CVT housing 48 for driving engagement therewith. At the opposite end, the inner splined connector 452 receives the input shaft 118 of the sub-transmission 110. In particular, as shown in FIG. 33, the inner splined connector 452 is exposed on the right side of the electric motor module 400 via an opening 454 of the right portion 420 of the housing 414 so that the splined end 121 of the input shaft 118 can be received in the inner splined connector 452.

As will be understood from the above, both the outer splined connector 450 and the input shaft 118 have matching connecting features since both can be received by the output coupling 54. Thus, in cases where the electric motor module 400 is not included as part of the power pack 100, the sub-transmission 110 can be connected to the output coupling 54 irrespective of the absence of the electric motor module 400.

Figure 37:
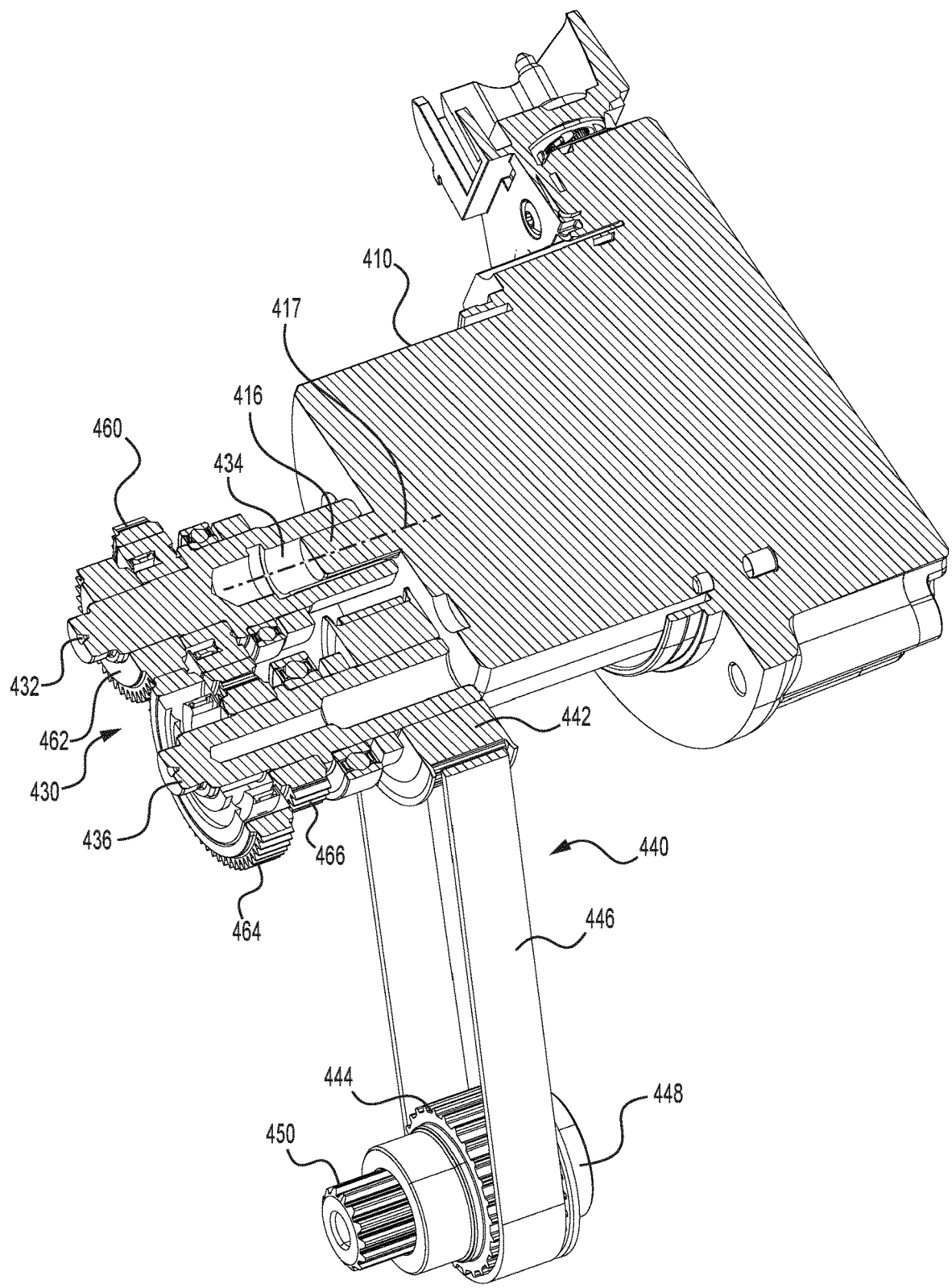
FIG. 37 is a perspective view of the drive assembly of FIG. 36 showing a cross-section taken across a gearing assembly thereof.

The gearing assembly 430 will now be described in greater detail with reference to FIGS. 36 and 37. As can be seen, the gears 460, 462, 464, 466 are positioned so as to be enclosed by the housing 414, namely between the middle portion 422 and the left portion 426 of the housing 414. The gears 460, 462, 464, 466 include two primary gears 460, 462 adjacent to one another and mounted to the primary shaft 432 and two secondary gears 464, 466 adjacent to one another and mounted to the secondary shaft 436. The primary gear 460 and the secondary gear 466 are disposed to the right of the primary gear 462 and the secondary gear 464 respectively and therefore the gears can be referred to as right and left primary gears 460, 462 and right and left secondary gears 466, 464. A diameter of the right primary gear 460 is greater than a diameter of the right secondary gear 466, while a diameter of the left secondary gear 464 is greater than a diameter of the left primary gear 462

In this embodiment, the primary gears 460, 462 are meshed together with the secondary gears 464, 466 for selective driving engagement therebetween. Notably, the right primary gear 460 is meshed together with the right secondary gear 466 for selective driving engagement therebetween (i.e., teeth 461 of the right primary gear 460 are meshed with teeth 467 of the right secondary gear 466), while the left primary gear 462 is meshed together with the left secondary gear 464 for selective driving engagement therebetween (i.e., teeth 463 of the left primary gear 462 are meshed with teeth 465 of the left secondary gear 464). As such, the right primary gear 460 counter-rotates relative to the right secondary gear 466, and the left primary gear 462 counter-rotates relative to the left secondary gear 464.

It is contemplated that, in other embodiments, the primary gears 460, 462 could be operatively connected to the secondary gears 464, 466 via intermediary idler gears.

The two primary gears 460, 462 are disposed between the two bearings 468, 470 that are mounted on the primary shaft 432. The bearing 468 is rotatably supported by the middle portion 422 of the housing 414 while the bearing 470 is rotatably supported by the left portion 426 of the housing 414. Similarly, the two secondary gears 464, 466 are disposed between the two bearings 472, 474 that are mounted on the secondary shaft 436. The bearing 474 is rotatably supported by the middle portion 422 of the housing 414 while the bearing 472 is rotatably supported by the left portion 426 of the housing 414.

As will be explained below, the configuration of the gears 460, 462, 464, 466 allows torque to be transmitted between the primary and secondary shafts 432, 436 in either direction, namely from the primary shaft 432 to the secondary shaft 436 and vice-versa. To that end, the right primary gear 460 and the left secondary gear 464 are freewheel clutch gears that are driven by the primary and secondary shafts 432, 436 in a single rotation direction about their respective axes 419, 437. In particular, the right primary gear 460 is driven in a rotation direction PR about the primary shaft axis 419 (which corresponds to the direction of forward rotation of the primary shaft 432) while the left secondary gear 464 is driven in a rotation direction SR about the secondary shaft axis 437 (which corresponds to the direction of forward rotation of the secondary shaft 436). The rotation directions PR, SR may thus be referred as driving rotation directions PR, SR. As freewheel clutch gears, the right primary gear 460 and the left secondary gear 464 can be "overrun", whereby respective teeth 461, 465 of the right primary gear 460 and the left secondary gear 464 rotate at a different speed than the corresponding one of the primary shaft 432 and secondary shaft 436 to which the gear is mounted. This will be explained in greater detail further below. The right primary gear 460 and the left secondary gear 464 can also be overrun if the primary and secondary shafts 432, 436 were to rotate in directions opposite to the rotation directions PR, SR.

As for the other gears, the left primary gear 462 and the right secondary gear 466 are spur gears that are fixedly mounted to the primary shaft 432 and the secondary shaft 436 respectively for rotation therewith such that the left primary gear 462 and the right secondary gear 466 can be driven by the primary and secondary shafts 432, 436 in both rotation directions about their respective axes 419, 437.

Figure 38:
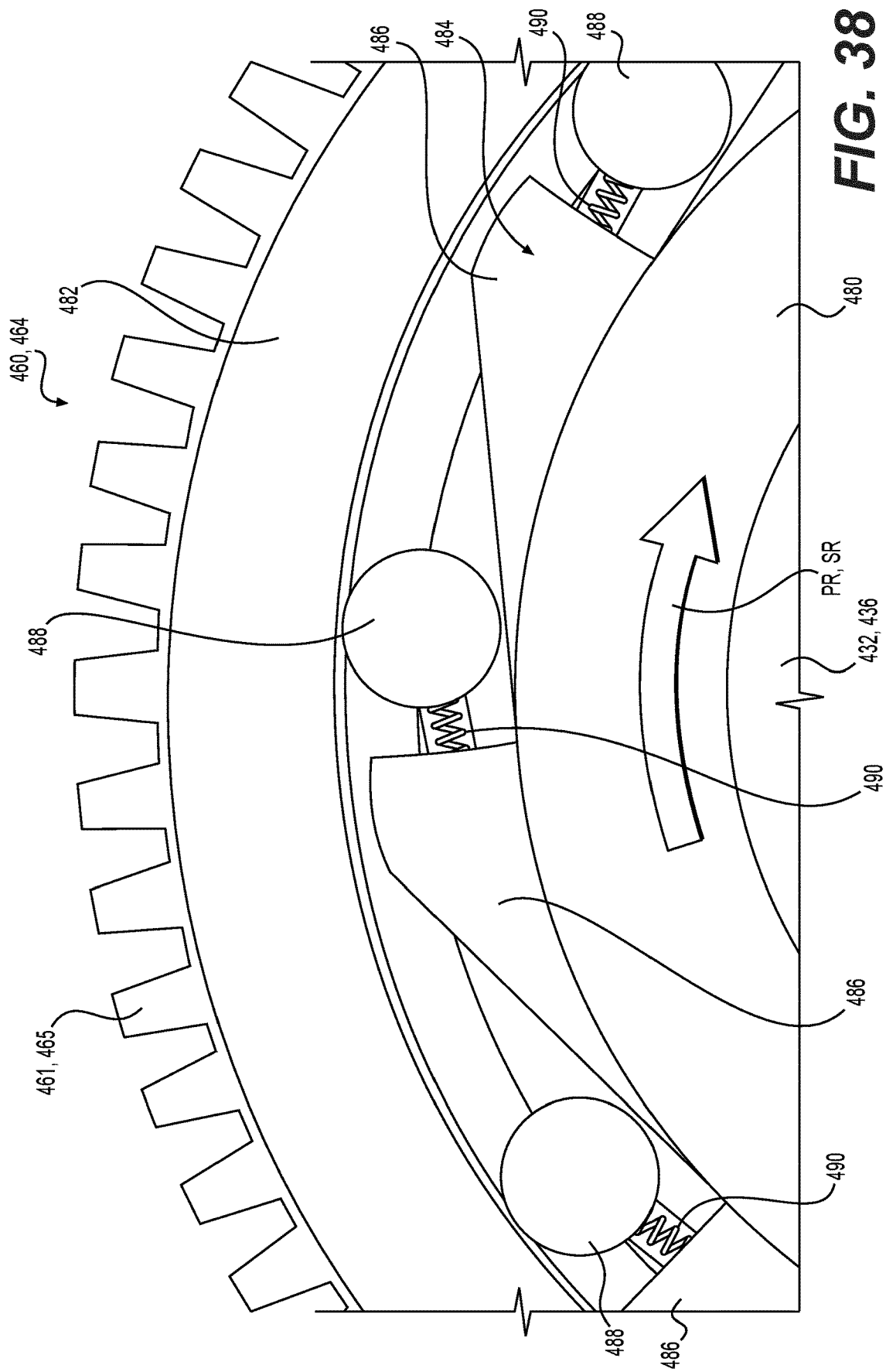
FIG. 38 is a cross-sectional view of part of a freewheel clutch gear of the gearing assembly of FIG. 37.

In this embodiment, the freewheel clutch gears 460, 464 have identical configurations to allow their functionality, however they are disposed on their respective primary and secondary shaft 432, 436 so as to rotationally lock in opposite directions of rotation for accommodating the counter-rotation of the primary and secondary shafts 432, 436. Notably, with reference to FIG. 38, each of the freewheel clutch gears 460, 464 is a trapped roller clutch having an inner race 480, an outer race 482 disposed radially outwardly of the inner race 480, and a clutch engager 484 disposed between the inner and outer races 480, 482. The inner race 480 is fixedly mounted to a corresponding one of the primary shaft 432 and the secondary shaft 436 for rotation therewith. For instance, the inner race 480 is fixed via a shaft key to the corresponding one of the primary shaft 432 and the secondary shaft 436. The outer race 482 includes the teeth of the gear 460, 464 (i.e., teeth 461 or 465).

The clutch engager 484 is configured to selectively rotationally lock the outer race 482 with the inner race 480 so that the inner and outer races 480, 482 rotate together at the same speed. However, if the inner race 480 rotates faster than the outer race 482 in the direction PR or SR, the clutch engager 484 disengages the outer race 482 from the inner race 480 so that the inner and outer races 480, 482 are in freewheel motion with respect to one another and the gear 460 or 464 is said to be overrun. In order to provide this functionality, in this embodiment, the clutch engager 484 includes a plurality of ramps 486 connected to the inner race 480 and distributed circumferentially thereabout, and a plurality of rollers 488 connected to the ramps 486. In particular, each roller 488 is operatively connected to a corresponding ramp 486 by a spring 490. In use, when the outer race 482 of the respective freewheel clutch gear 460, 464 is driven in the corresponding driving rotation direction PR, SR relative to the inner race 480, the rollers 488 move outwardly along the ramps 486 and become locked between the ramps 486 and the outer race 482, thereby coupling rotation of the outer race 482 with the inner race 480. However, when the freewheel clutch gear is overrun, the rollers 488 compress the springs 490 and are in rolling contact with the outer race 482 to allow freewheel motion of the outer race 482 relative to the inner race 480.

It is contemplated that the freewheel clutch gears 460, 464 could be configured differently in other embodiments. For instance, the freewheel clutch gears 460, 464 could be of a type other than a trapped roller clutch (e.g., a sprag clutch).

The gearing assembly 430 is thus operable such that, in a first scenario, when a rotational speed of the primary shaft 432 is greater than a rotational speed of the secondary shaft 436, the primary shaft 432 drives the secondary shaft 436 via driving engagement between the left primary gear 462 and the left secondary gear 464. In this scenario, the right primary gear 460 is overrun since its driving engagement with the smaller sized right secondary gear 466 causes the outer race 482 of the right primary gear 460 to rotate slower than the secondary shaft 436 and therefore slower than the inner race 480 of the right primary gear 480 (which is rotating at the same speed as the primary shaft 432). The inner and outer races 480, 482 of the right primary gear 460 are thus in freewheel motion relative to one another. In this first scenario, the motor 410 can transmit torque to the gearing assembly 430 which in turn will transmit torque to the belted transmission 440 via the upper sprocket 442 which is operatively connected to the secondary shaft 436. In turn, the belted transmission 440 transmits torque to the drive connection shaft 448 to drive the sub-transmission 110 operatively connected thereto.

In a second scenario, when the rotational speed of the secondary shaft 436 is greater than the rotational speed of the primary shaft 432, the secondary shaft 436 drives the primary shaft 432 via driving engagement between the right secondary gear 466 and the right primary gear 460. In this scenario, the left secondary gear 464 is overrun since its driving engagement with the smaller sized left primary gear 462 causes the outer race 482 of the left secondary gear 464 to rotate slower than the primary shaft 432 and therefore slower than the inner race 480 of the left secondary gear 464 (which is rotating at the same speed as the secondary shaft 436). The inner and outer races 480, 482 of the left secondary gear 464 are thus in freewheel motion relative to one another. In this second scenario, torque can be transmitted to the drive connection shaft 448 via the CVT 40 and the centrifugal clutch 65, causing the belted transmission 440 to transmit torque to the gearing assembly 430. In turn the gearing assembly 430 transmits torque to the motor shaft 416. This can allow the motor 410 to function as a generator to produce and store energy. Alternatively, in some cases, in this second scenario, torque may be transmitted to the gearing assembly 430 when the vehicle's operator releases the throttle but the ground-engaging member(s) of the vehicle (e.g., an endless track in the case of a snowmobile) are still engaging the ground and cause the sub-transmission 110 to transmit torque to the gearing assembly 430, similarly allowing the motor 410 to function as a generator.

Figure 39:
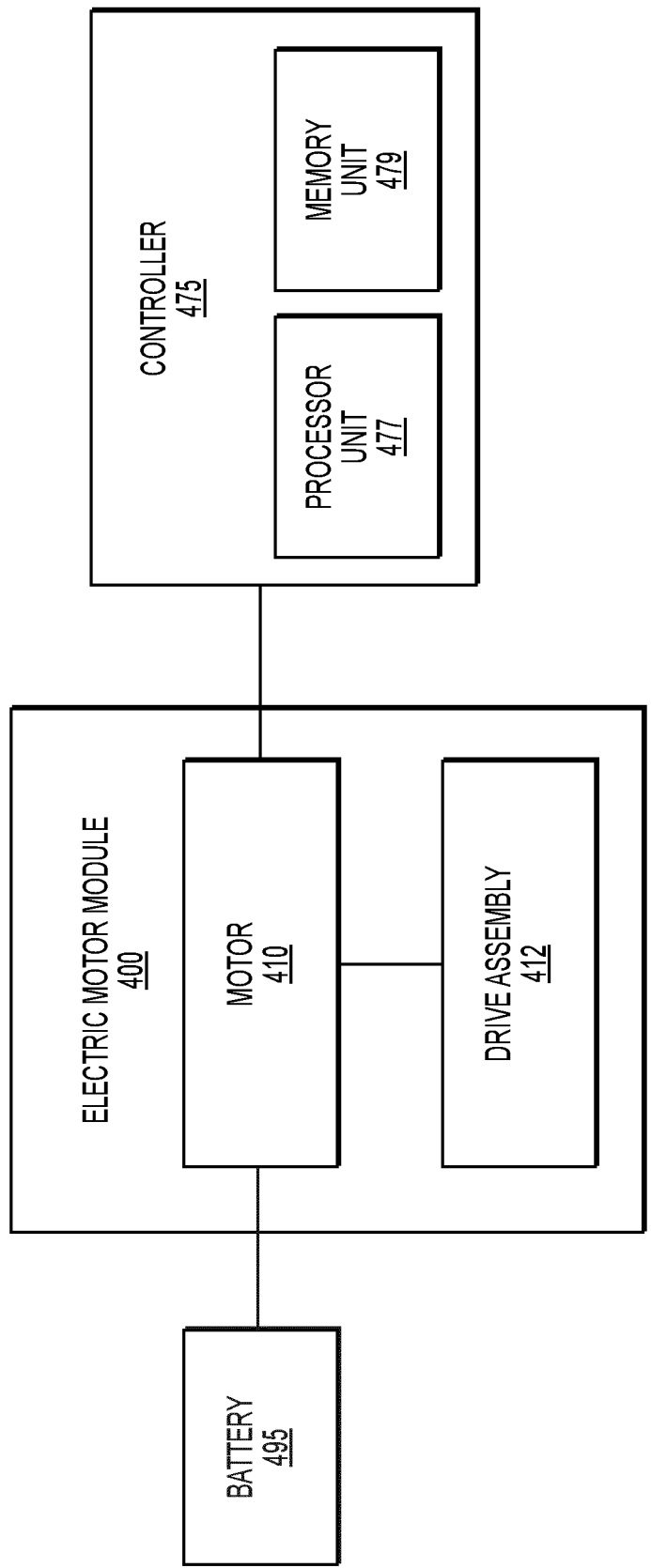
FIG. 39 is a schematic representation of the electric motor module of FIG. 32 and of a corresponding controller.

In order to control operation of the electric motor module 400, as shown schematically in FIGS. 32 and 39, a controller 475 is provided in electronic communication with the motor 410 and is thereby operable to control the electric motor module 400 in various driving modes.

As shown in FIG. 39, the controller 475 has a processor unit 477 for carrying out executable code, and a non-transitory memory unit 479 that stores the executable code in a non-transitory medium (not shown) included in the memory unit 479. The processor unit 477 includes one or more processors for performing processing operations that implement functionality of the controller 475. The processor unit 477 may be a general-purpose processor or may be a specific-purpose processor comprising one or more preprogrammed hardware or firmware elements (e.g., application-specific integrated circuits (ASICs), electrically erasable programmable read-only memories (EEPROMs), etc.) or other related elements. The non-transitory medium of the memory unit 479 may be a semiconductor memory (e.g., read-only memory (ROM) and/or random-access memory (RAM)), a magnetic storage medium, an optical storage medium, and/or any other suitable type of memory. While the controller 475 is represented as being one entity in this implementation, it is understood that the controller 475 could comprise separate entities for controlling components separately.

Amongst the various driving modes of the electronic motor module 400, the controller 475 is operable to control the electric motor module 400 in an engine driving mode in which the output shaft 120 of the sub-transmission 110 is driven solely by torque transmitted thereto by the engine 10 via the CVT 40, the centrifugal clutch 65 and the drive connection shaft 448. Notably, in the engine driving mode, the torque produced by the electric motor 410 is null such that the gearing assembly 430 does not contribute in generating torque being transmitted to the sub-transmission 110. Rather, in the engine driving mode, in this embodiment, the drive connection shaft 448 transmits torque to the belted transmission 440 which in turn transmits torque to the gearing assembly 430. As such, the drive connection shaft 448 transmits torque to the motor shaft 416 via the gearing assembly 430 such that the electric motor 410 operates as a generator to store energy in a battery 495 (FIG. 39).

The controller 475 can also control the electric motor module 400 in an electric motor driving mode in which the output shaft 120 of the sub-transmission 110 is solely driven by torque transmitted thereto by the electric motor 410 via the drive assembly 412, including the gearing assembly 430 and the belted transmission 440, and the drive connection shaft 448. Notably, in the electric motor driving mode, the driven pulley 44 of the CVT 40 is drivingly disengaged from the output shaft 120 of the sub-transmission 110 and from the drive connection shaft 448. In particular, when the electric motor module 400 is operating in the electric motor driving mode, the centrifugal clutch 65 is in its open position as a result of the engine 10 not running or running at a speed inferior to that needed for the centrifugal clutch 65 to be in the closed position. As such, the outer coupling 69 of the centrifugal clutch 65 does not transmit torque to the output coupling 54 which therefore in turn does not drive the drive connection shaft 448.

Lastly, the controller 475 can also control the electric motor module 400 in a hybrid driving mode in which the output shaft 120 of the sub-transmission 110 is driven by torque transmitted thereto by both the motor shaft 416 of the electric motor 410 and the driven pulley 44 of the CVT 40. In other words, in the hybrid driving mode, both the engine 10 and the electric motor 410 transmit torque to the drive connection shaft 448 which in turn drives the input shaft 118 of the sub-transmission 110 resulting in driving of the output shaft 120.

The electric motor module 400 thus provides an additional source of torque with which the sub-transmission 110 can be driven. The various driving modes may be useful in different scenarios. For instance, the engine driving mode may be useful in scenarios in which a significant amount of torque is desired to drive the vehicle, while also contributing to generating energy that may recharge a battery. Conversely, the electric motor driving mode may be useful in scenarios in which a lesser torque is desired to drive the vehicle and/or for fuel conservation purposes. For its part, the hybrid driving mode can be also be useful for fuel efficiency purposes as the power pack 100 generates torque from both torque generating sources, thereby reducing the demand on the engine 10. It is contemplated that the controller 475 could control the electric motor module 400 in additional driving modes.

The operator of the vehicle may choose in which driving mode to operate the electric motor module 400. For instance, a selection switch (not shown) in communication with the controller 475 may be available to the operator on the dashboard of the vehicle to select the desired driving mode according to different parameters that the operator can observe (e.g., riding conditions, terrain, fuel availability, etc.). Alternatively, the controller 475 may have different input data transmitted thereto by various sensors of the vehicle on the basis of which the controller 475 can automatically select one of the driving modes. In other words, the controller 475 could select the driving mode based on different parameters of the vehicle (e.g., speed of the vehicle, fuel availability, battery charge level, etc.).

Power Pack for an On-Road Vehicle

Figure 14:
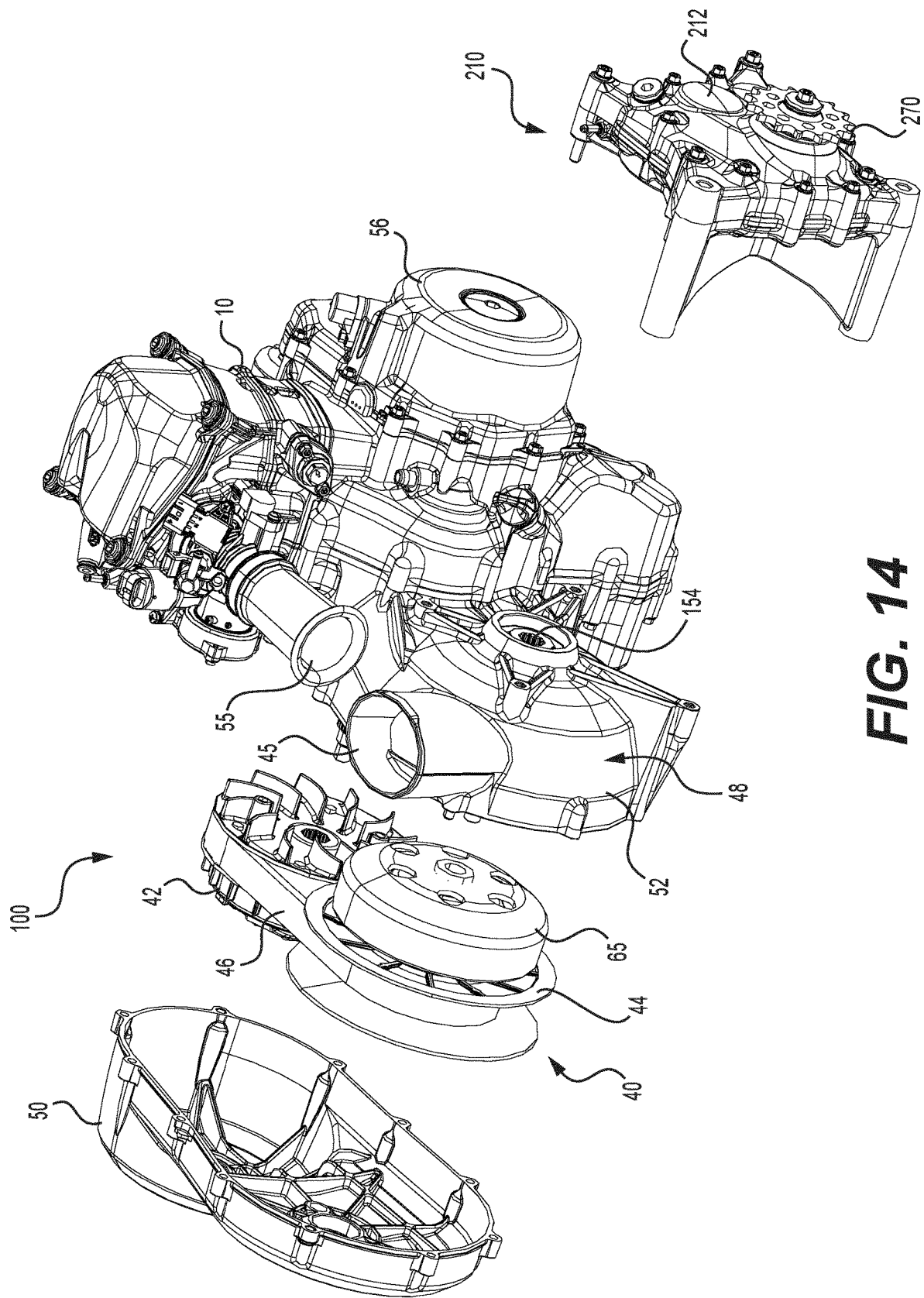
FIG. 14 is a perspective view of the power pack of FIG. 1, including the engine, the CVT and a second sub-transmission selected from the group of different sub-transmissions, in an exploded configuration.

With reference to FIG. 14, in another potential configuration, the power pack 100 is to be provided for an on-road vehicle and therefore the on-road sub-transmission 210 is selected from the sub-transmissions 110, 210, 310 to be a part of the power pack 100. An example of an on-road vehicle for which this configuration of the power pack 100 could be provided can be found for example in U.S. Pat. No. 10,336,387 issued on Jul. 2, 2019, which is incorporated in its entirety by reference herein. The on-road sub-transmission 210 is configured to be operatively connected between the CVT 40 and a ground-engaging member (i.e., a wheel) of the on-road vehicle for driving thereof.

The on-road sub-transmission 210 will now be described with reference to FIGS. 15 to 18. The on-road sub-transmission 210 has a sub-transmission housing 212 which defines an interior space of the on-road sub-transmission 210 and encloses a plurality of gears 250 therein (schematically illustrated in FIG. 17). Notably, the sub-transmission housing 212 has a right portion 211 and a left portion 213 which are fastened to one another to enclose the gears 250 and other components therein. The attachment of the portions 211, 213 of the sub-transmission housing 212 results in the on-road sub-transmission 210 being sealed such that the interior space thereof is inaccessible without disassembly of the sub-transmission housing 212.

A lubrication inlet 248 extends upwardly from a top portion of the sub-transmission housing 212 for lubricating the gearing system of the on-road sub-transmission 210.

Figure 15:
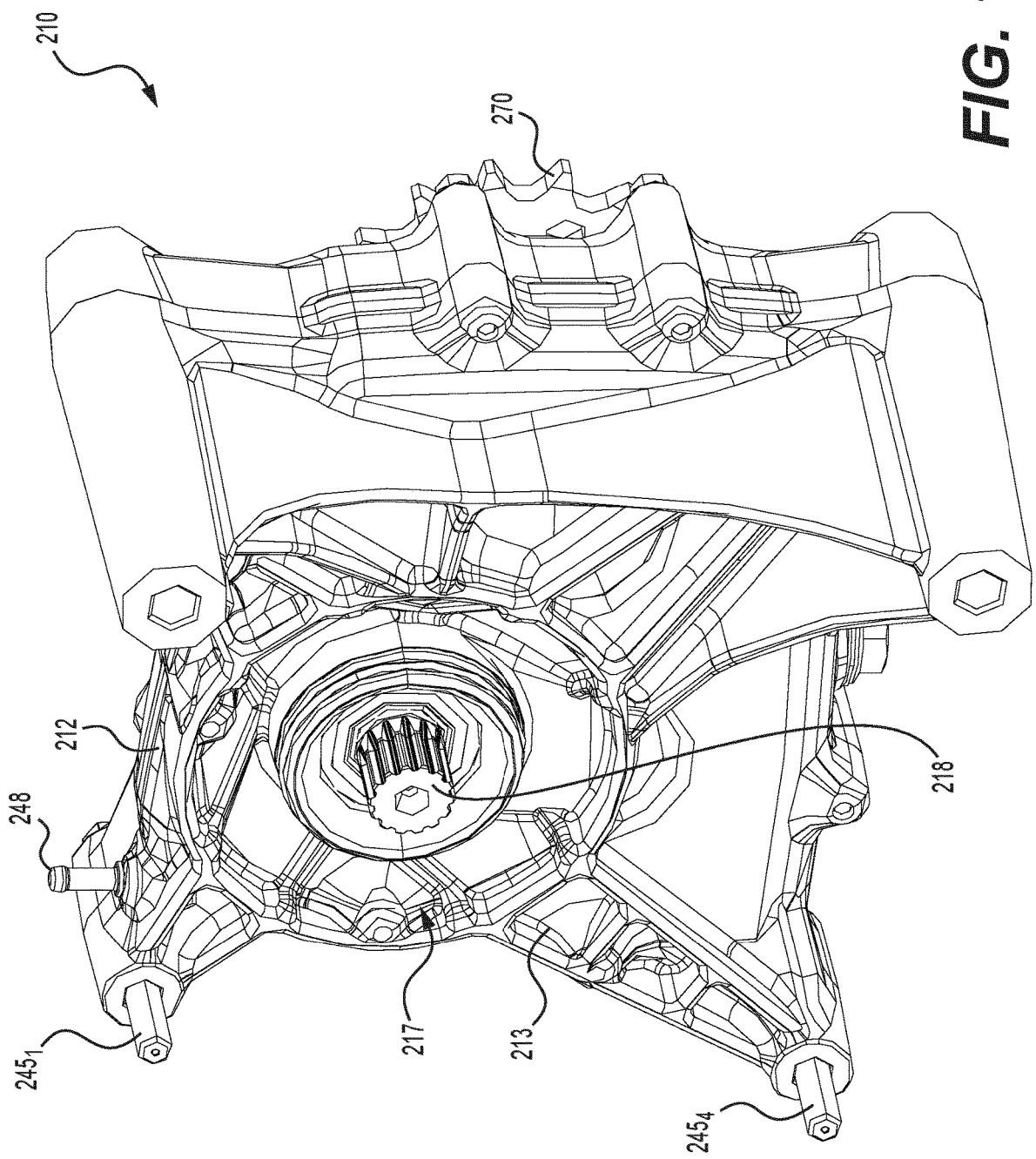
FIG. 15 is a perspective view, taken from a rear, left side, of the second sub-transmission of FIG. 14.
Figure 18:
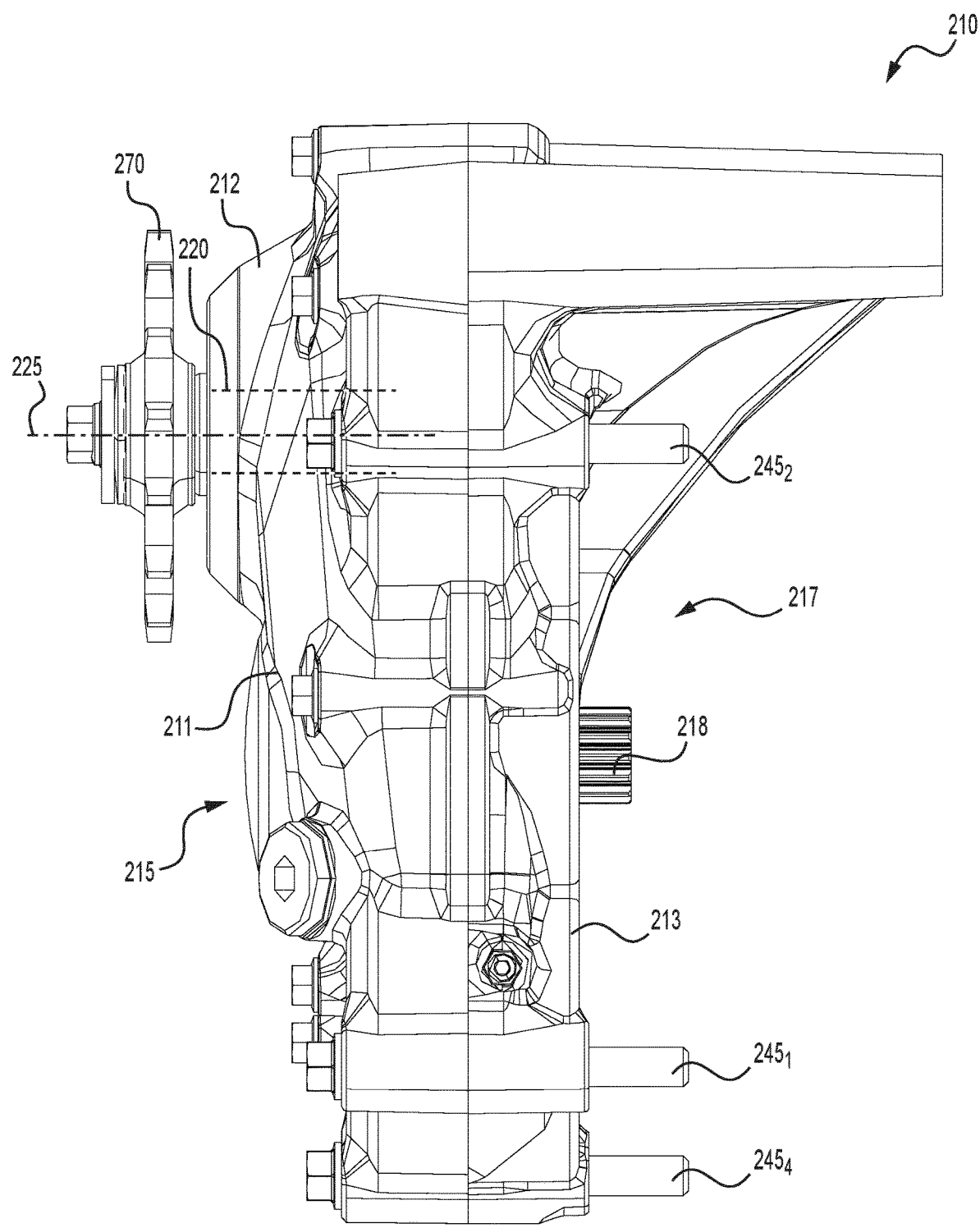
FIG. 18 is a top plan view of the second sub-transmission of FIG. 15.
Figure 19:
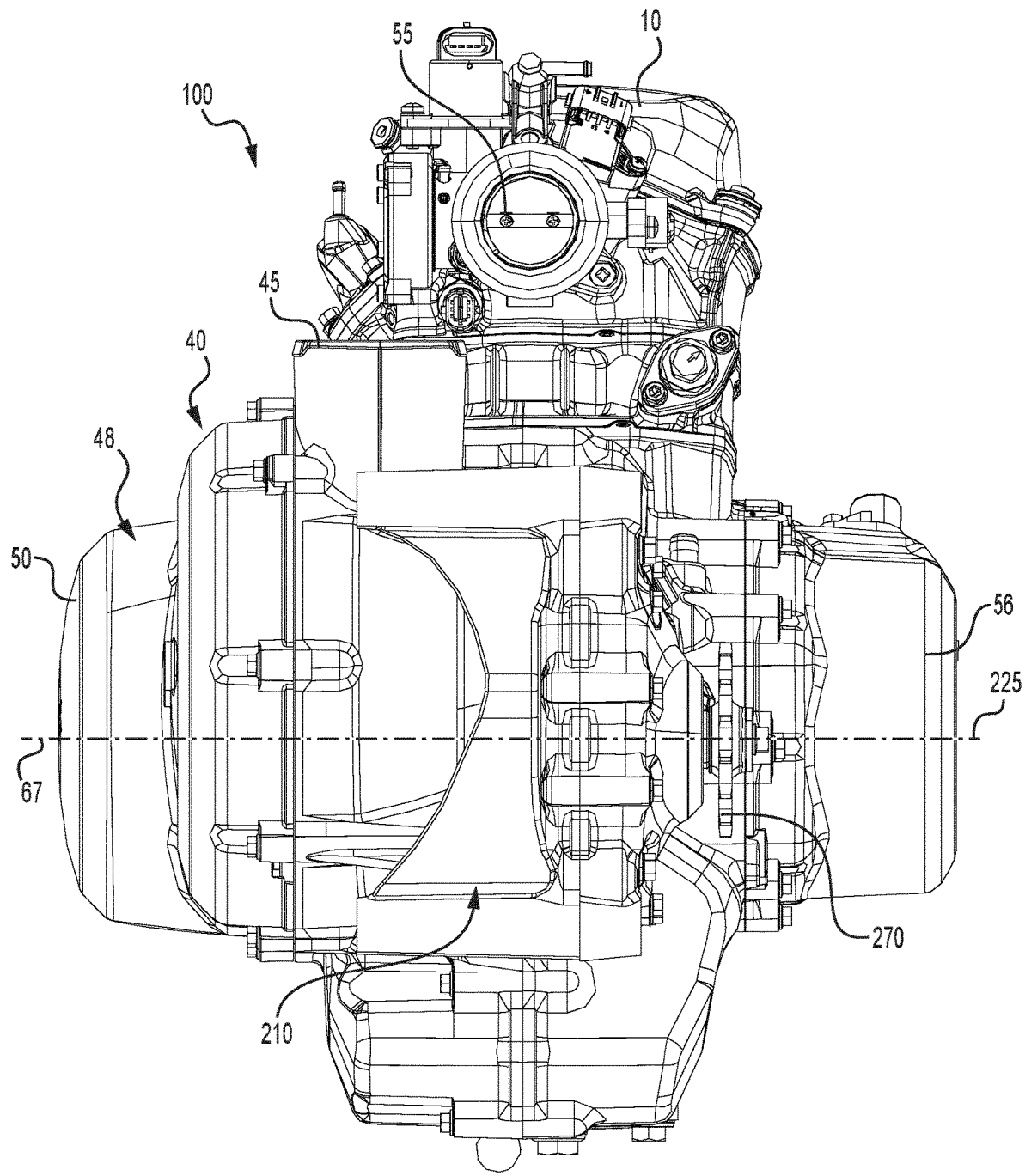
FIG. 19 is a rear elevation view of the power pack of FIG. 14 in an assembled configuration.
Figure 20:
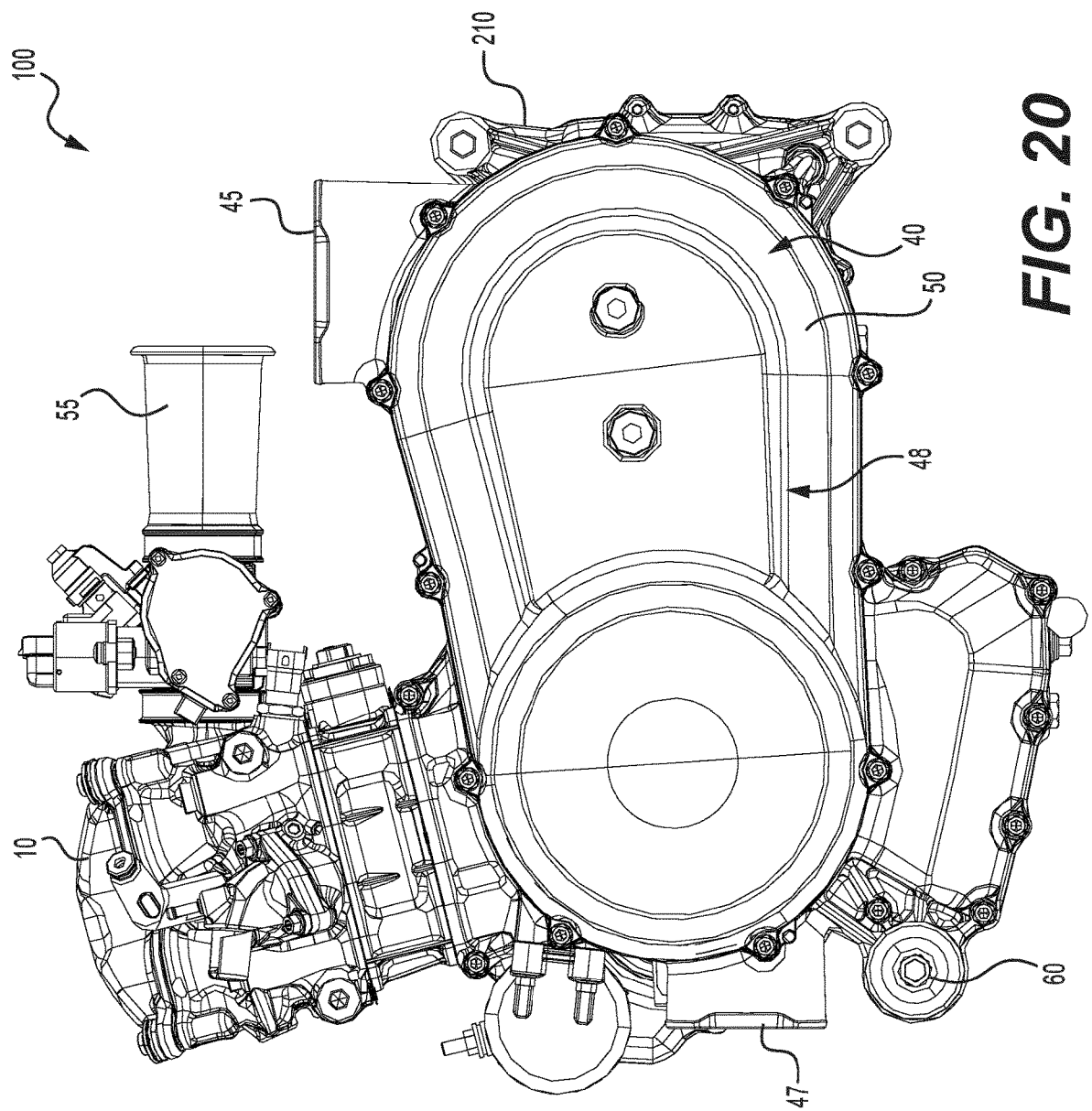
FIG. 20 is a left side elevation view of the power pack of FIG. 19.
Figure 21:
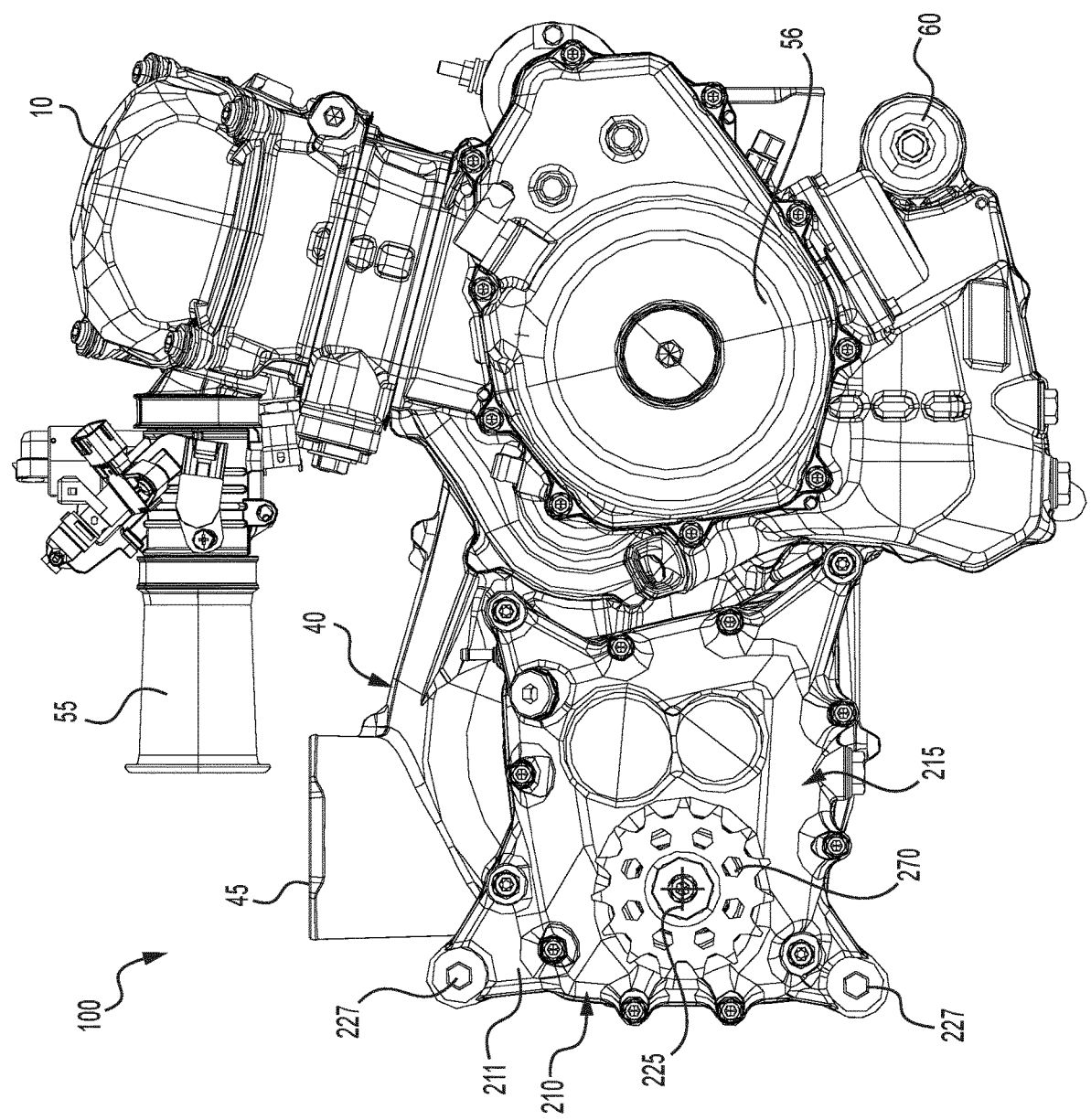
FIG. 21 is a right side elevation view of the power pack of FIG. 19.

As shown in FIGS. 15 and 18, the on-road sub-transmission 210 has an input shaft 218 extending outwardly from the sub-transmission housing 212 on a left side 217 of the on-road sub-transmission 210. The input shaft 218 is configured to be received by the output coupling 54 so that the CVT 40 and the on-road sub-transmission 210 are in driving engagement. Notably, the input shaft 218 and the output coupling 54 are splined and thus are drivingly connected. Thus, in use, the input shaft 218 rotates about the driven pulley axis 67.

Figure 16:
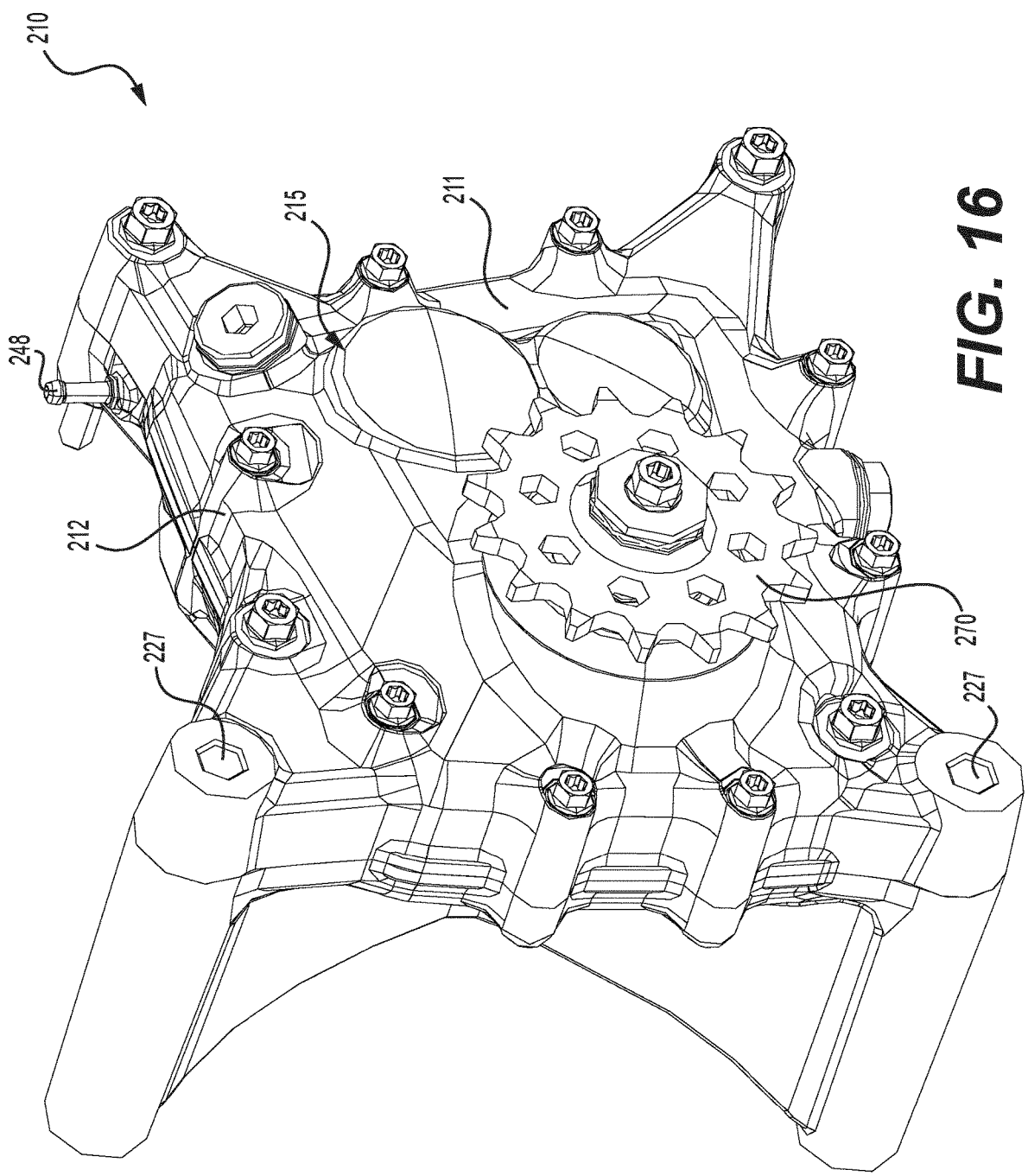
FIG. 16 is a perspective view, taken from a rear, right side, of the second sub-transmission of FIG. 15.

The gears 250 operatively connect the input shaft 218 to an output shaft 220 (schematically represented in FIG. 18) of the on-road sub-transmission 210. The output shaft 220 is rotatable about an output shaft axis 225 which extends along a direction generally parallel to the driven pulley axis 67 such that, when the power pack 100 is installed on the on-road vehicle, the output shaft axis 225 extends generally laterally. A drive sprocket 270 is mounted and secured to the output shaft 220 for rotation therewith. The drive sprocket 270 configured to be operatively connected to a wheel of the on-road vehicle. Notably, in use, a drive chain is attached to the drive sprocket 270 and is operatively connected to the drive wheel of the on-road vehicle. To that end, as shown in FIGS. 16 and 18, the drive sprocket 270 is positioned outside of the sub-transmission housing 212. More specifically, the drive sprocket 270 is positioned rightward of the right portion 211 of the sub-transmission housing 212.

Figure 17:
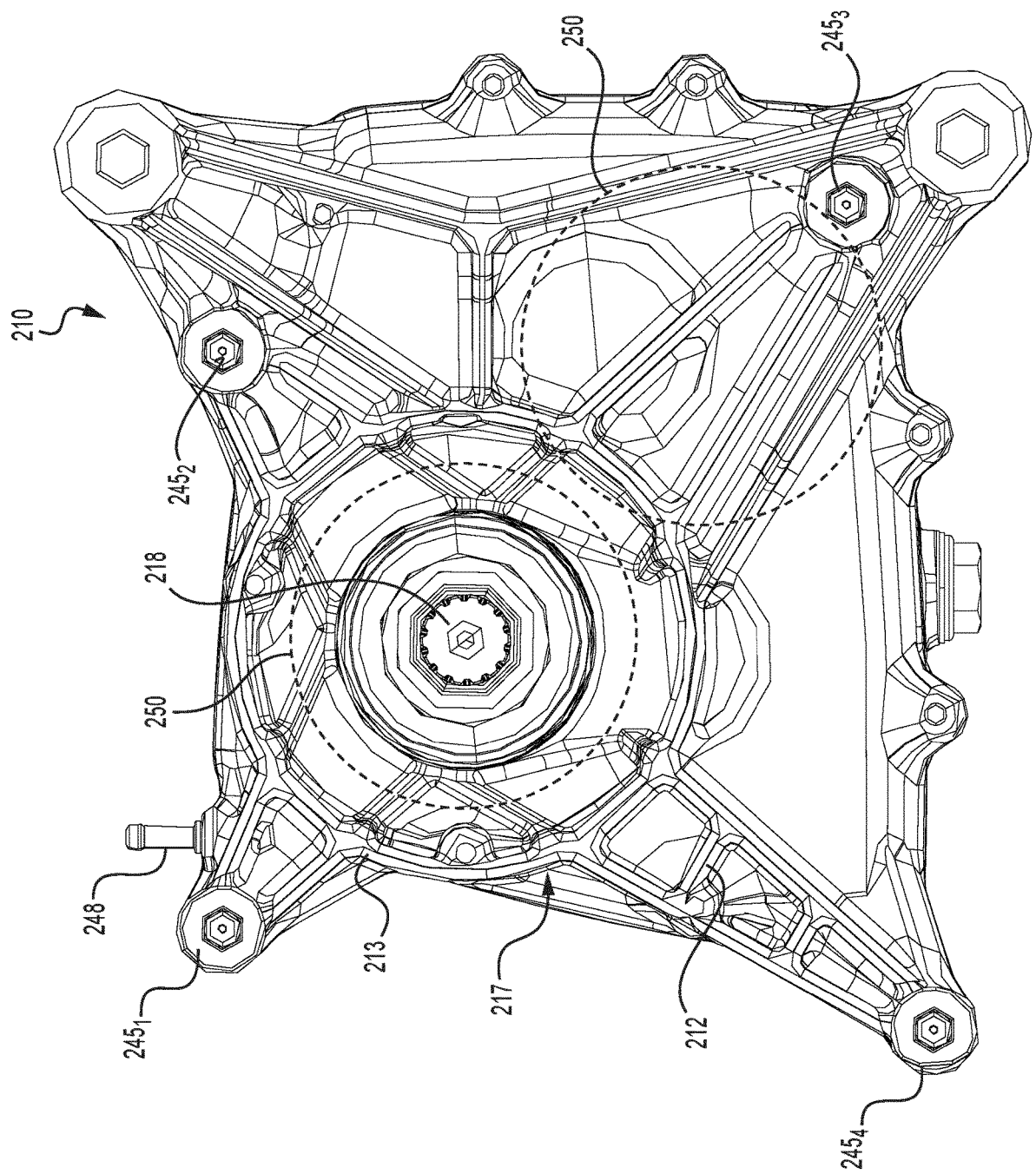
FIG. 17 is a left side elevation view of the second sub-transmission of FIG. 15.

As shown in FIGS. 15, 17 and 18, in order to be connected to the CVT 40, the on-road sub-transmission 210 has a plurality of mount connectors $245_1$-$245_4$ which are configured to be engaged with the sub-transmission mounts $64_1$-$64_4$ of the CVT housing 48. Notably, in this embodiment, each of the mount connectors $245_1$-$245_4$ is a fastener which extends through both portions 211, 213 of the sub-transmission housing 212 to threadedly engage a corresponding one of the sub-transmission mounts $64_1$-$64_4$.

With particular reference to FIG. 16, the sub-transmission housing 212 of the on-road sub-transmission 210 defines two vehicle mounts 227 through which, in addition to the vehicle mounts 60 of the engine 10, the power pack 100 can be mounted to the on-road vehicle. In this embodiment, the vehicle mounts 227 include an upper vehicle mount 227 and a lower vehicle mount 227. Each vehicle mount 227 is configured to receive therein a fastener for attachment to the frame of the on-road vehicle.

As can be seen, in contrast with the snowmobile sub-transmission 110, the on-road sub-transmission 210 does not have a shifter for operating the sub-transmission 210 in different gears. Therefore, the change in speed and torque may be provided solely by the CVT 40 in this embodiment.

Figure 22:
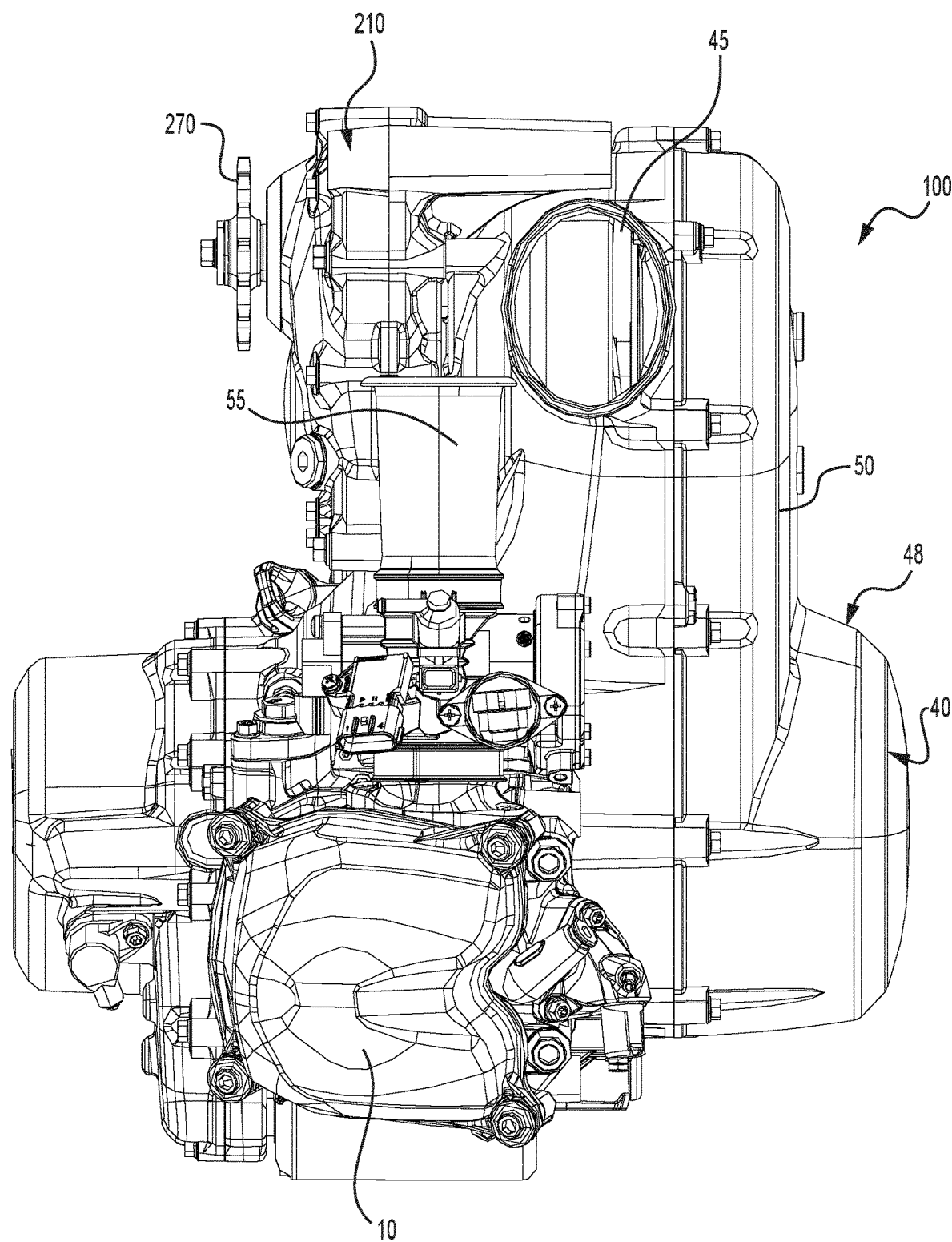
FIG. 22 is a top plan view of the power pack of FIG. 19.

The power pack 100 including the on-road sub-transmission 210 is shown assembled in FIGS. 19 to 22. As can be seen, the power pack 100 is configured such that part of the crankcase 12 of the engine 10 and the on-road sub-transmission 210 are disposed on the right side of the CVT 40. As shown in FIG. 22, the on-road sub-transmission 210 is disposed laterally between the lateral ends of the engine 10. Moreover, with reference to FIG. 19, the output shaft axis 225 of the output shaft 220 is coaxial with the driven pulley axis 67 (i.e., the driven pulley axis 67 and the drive sprocket 270 rotate about the same axis).

Also, as can be seen, all the mounting points defined by the sub-transmission mounts $64_1$-$64_4$ of the CVT housing 48 are used to mount the on-road sub-transmission 210 to the CVT housing 48. That is, every one of the sub-transmission mounts $64_1$-$64_4$ of the CVT housing 48 receives a corresponding one of the mount connectors $245_1$-$245_4$.

Similarly to that described above with respect to the snowmobile sub-transmission 110, the on-road sub-transmission 210 is a modular unit of the power pack 100 which is attached to the CVT 40 but that is otherwise spatially independent therefrom Notably, the interior space of the on-road sub-transmission 210, as defined by the sub-transmission housing 212, is sealed from the CVT housing 48. As such, air flow within the CVT housing 48 is independent of the on-road sub-transmission 210. In other words, air flow entering into the CVT housing 48 (via the air inlet 45) does not enter into the interior space of the on-road sub-transmission 210.

It is to be understood that this particular configuration of the power pack 100 is not limited for use with an on-road vehicle, but could instead be used on other vehicles that are driven by the drive sprocket 270.

Figure 40:
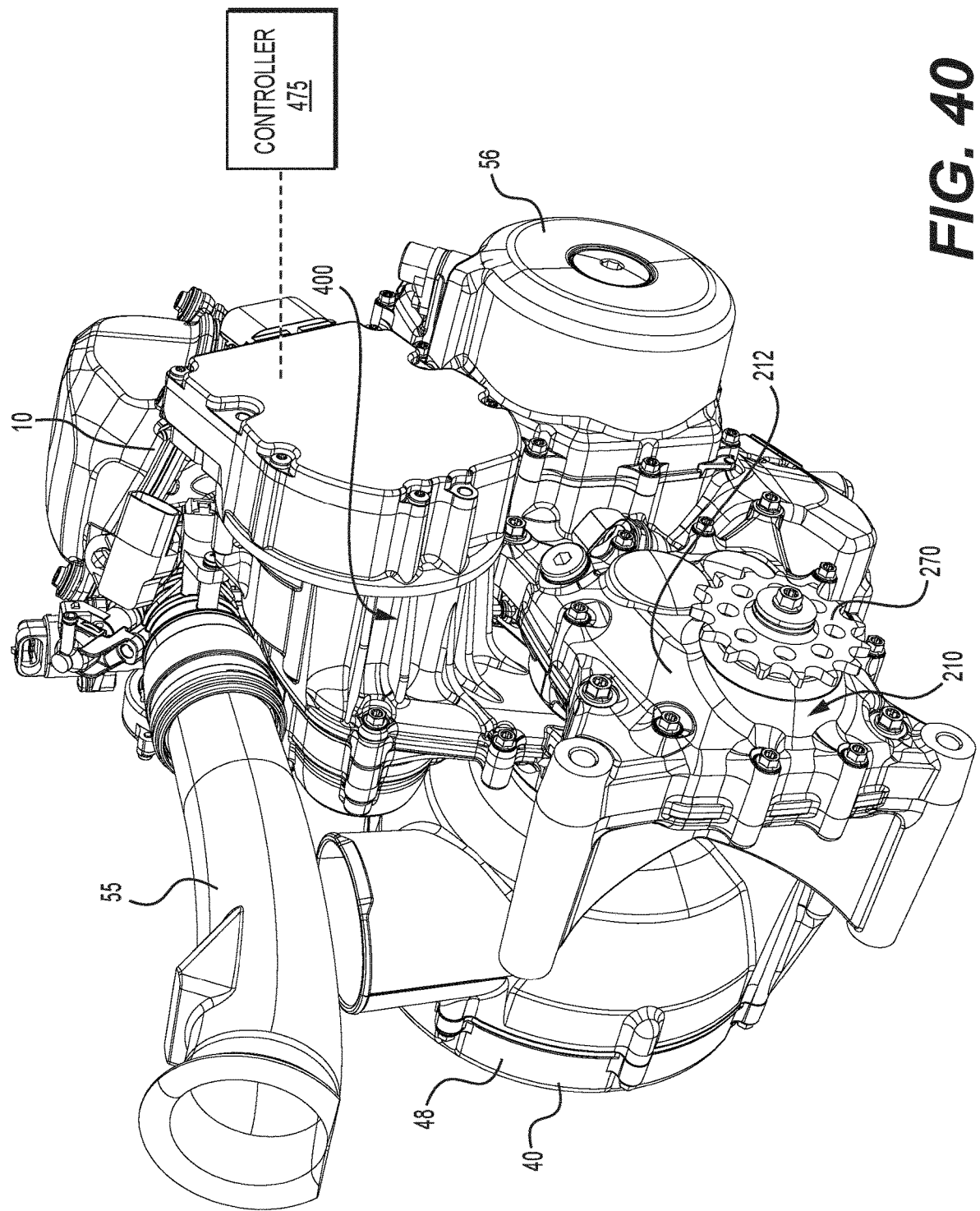
FIG. 40 is a perspective view, taken from a rear, right side, of part of the power pack in accordance with another embodiment in which the power pack includes the engine, the CVT, the electric motor module and the second sub-transmission.

Furthermore, as shown in FIG. 40, as described above with respect to the snowmobile sub-transmission 110, the on-road sub-transmission 210 can alternatively be operatively connected to the output coupling 54 via the electric motor module 400 rather than being directly connected to the output coupling 54. The power pack 100 including the on-road sub-transmission 210 may thus benefit from the different driving modes provided by the electric motor module 400 as described above.

Power Pack for an all-Terrain Vehicle (ATV)

Figure 23:
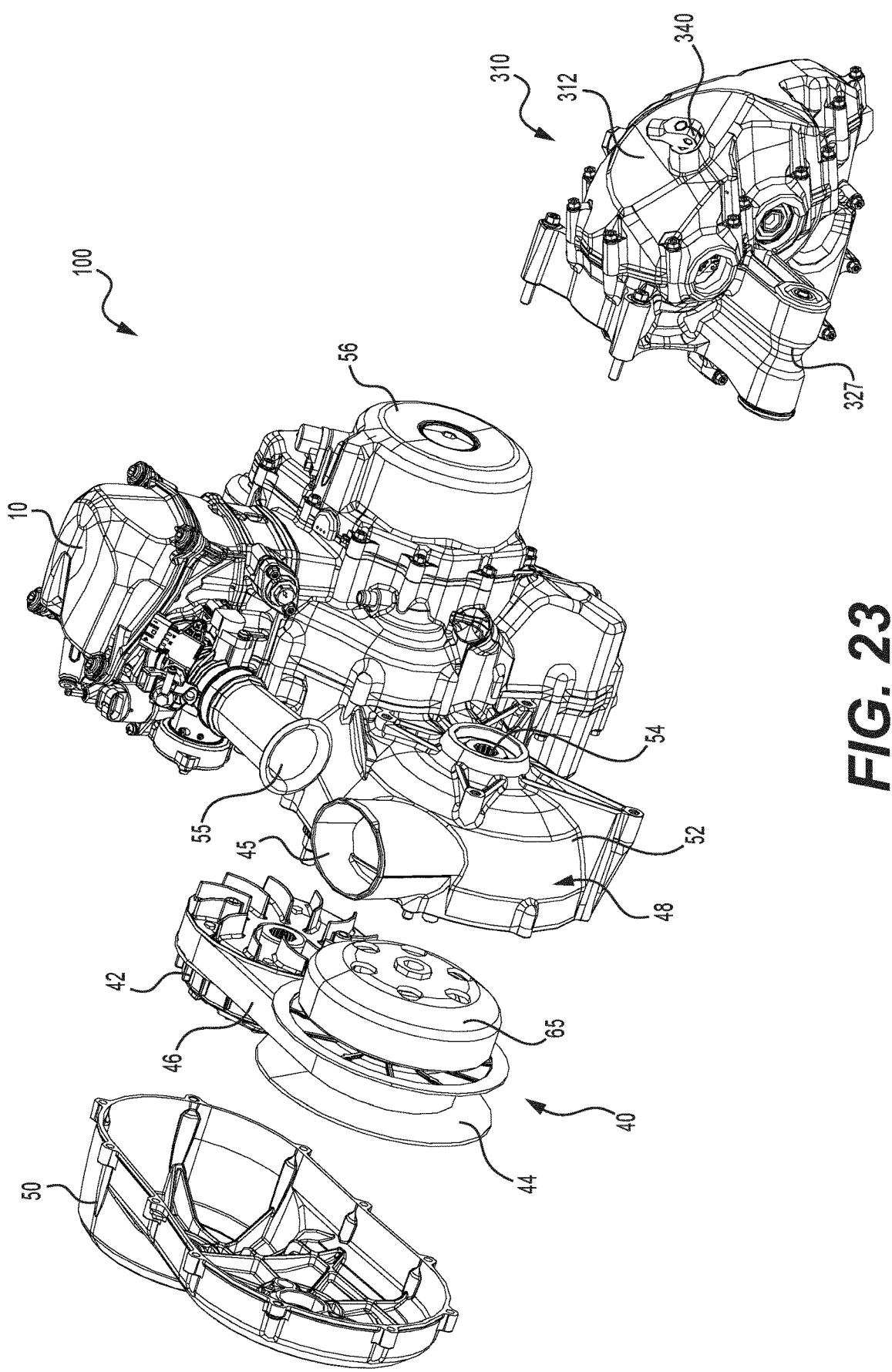
FIG. 23 is a perspective view of the power pack of FIG. 1, including the engine, the CVT and a third sub-transmission selected from the group of different sub-transmissions, in an exploded configuration.

With reference to FIG. 23, in another configuration, the power pack 100 is to be provided for an ATV and therefore the ATV sub-transmission 310 is selected from the sub-transmissions 110, 210, 310 to be a part of the power pack 100. An example of an ATV for which this configuration of the power pack 100 could be provided can be found for example in U.S. Pat. No. 9,283,823 issued on Mar. 15, 2016, which is incorporated in its entirety by reference herein. The ATV sub-transmission 310 is configured to be operatively connected between the CVT 40 and two independent ground-engaging members (i.e., two separately driven wheels) of the ATV for driving thereof.

Figure 24:
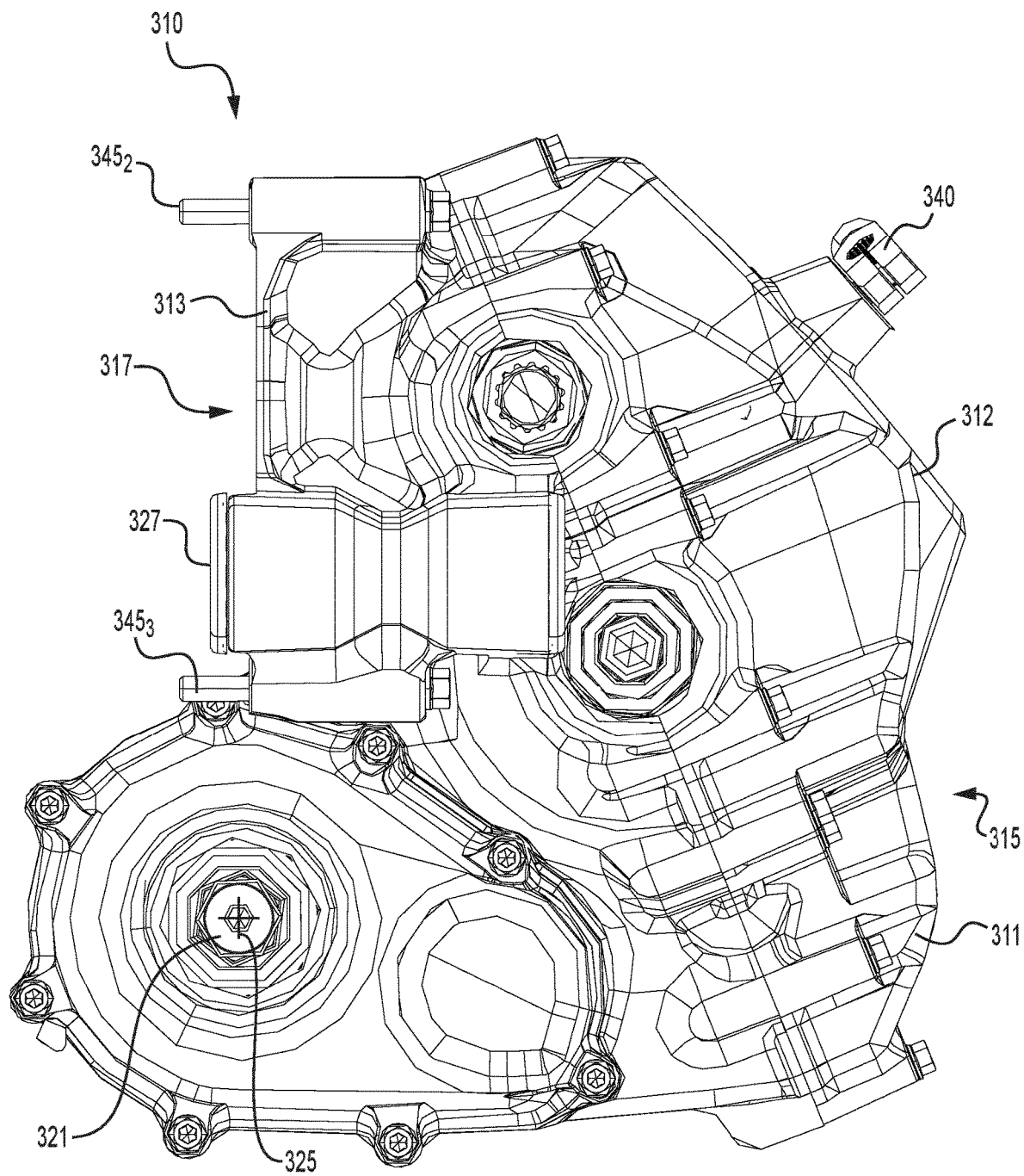
FIG. 24 is a rear elevation view of the third sub-transmission of FIG. 23.
Figure 25:
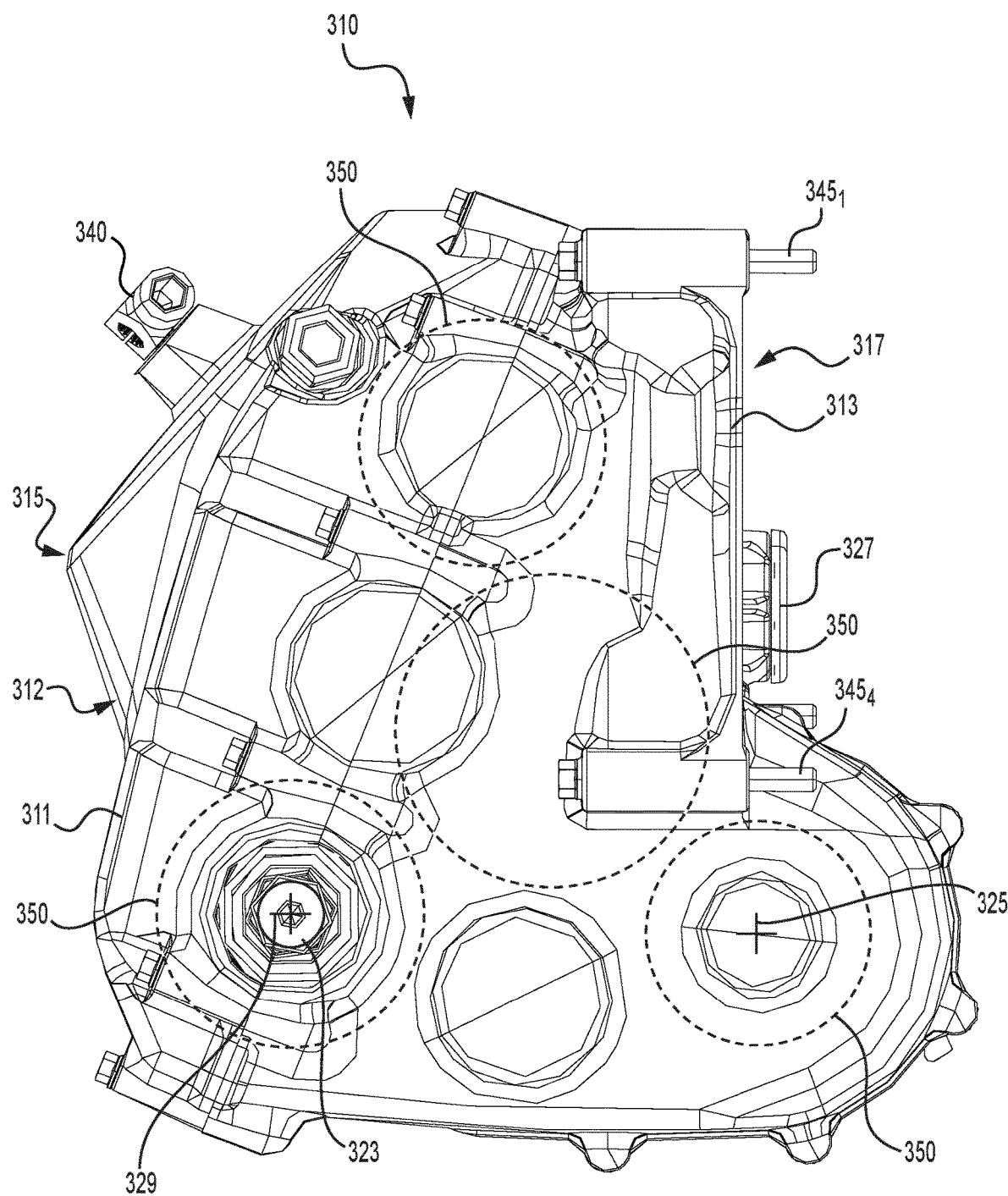
FIG. 25 is a front elevation view of the third sub-transmission of FIG. 24.

The ATV sub-transmission 310 will now be described with reference to FIGS. 24 to 26. The ATV sub-transmission 310 has a sub-transmission housing 312 which defines an interior space of the ATV sub-transmission 310 and encloses a plurality of gears 350 therein (schematically illustrated in FIG. 25). Notably, the sub-transmission housing 312 has a right portion 311 and a left portion 313 which are fastened to one another to enclose the gears 350 and other components therein. The attachment of the portions 311, 313 of the sub-transmission housing 312 results in the ATV sub-transmission 310 being sealed such that the interior space thereof is inaccessible without disassembly of the sub-transmission housing 312.

Figure 26:
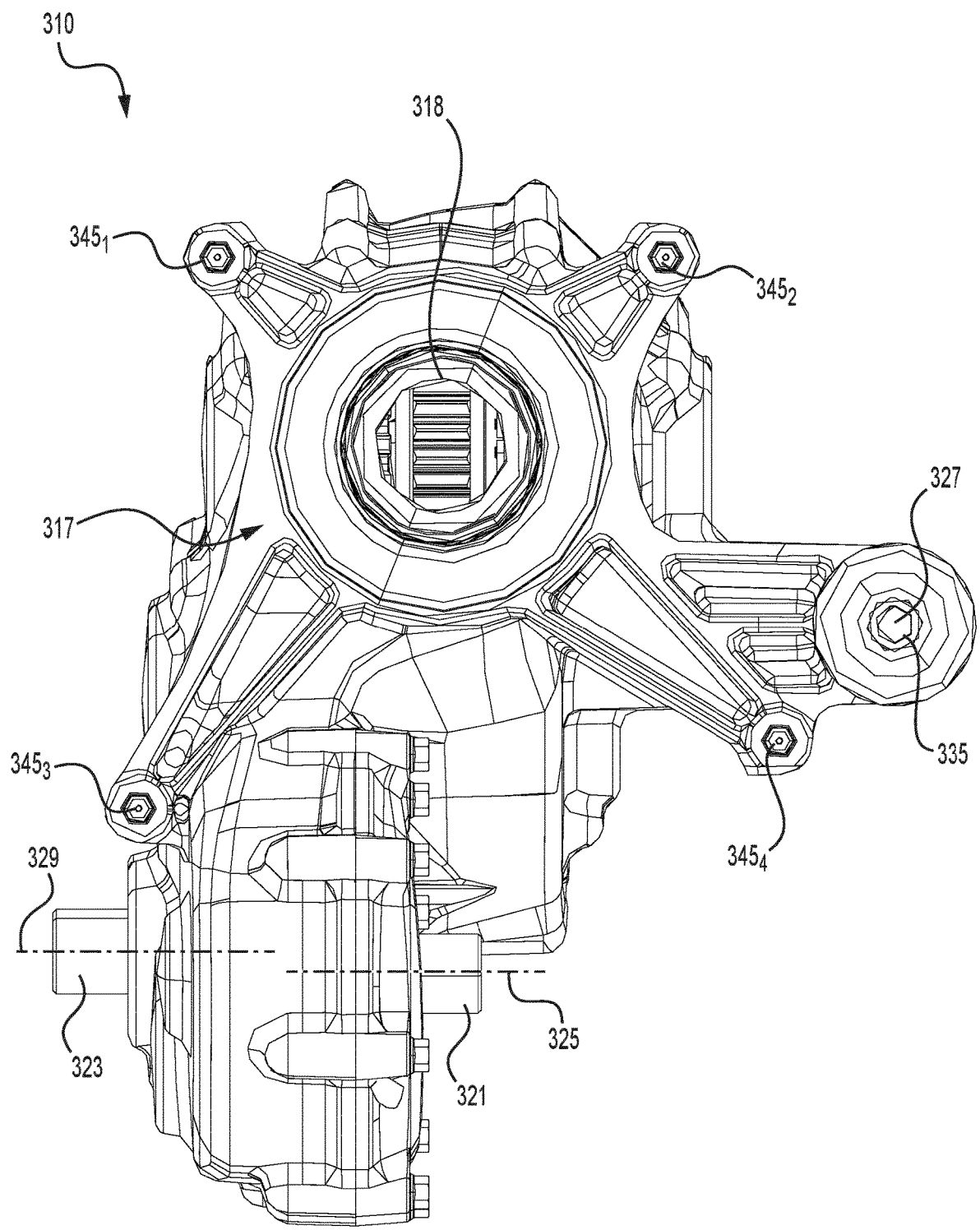
FIG. 26 is a left side elevation view of the third sub-transmission of FIG. 24.
Figure 27:
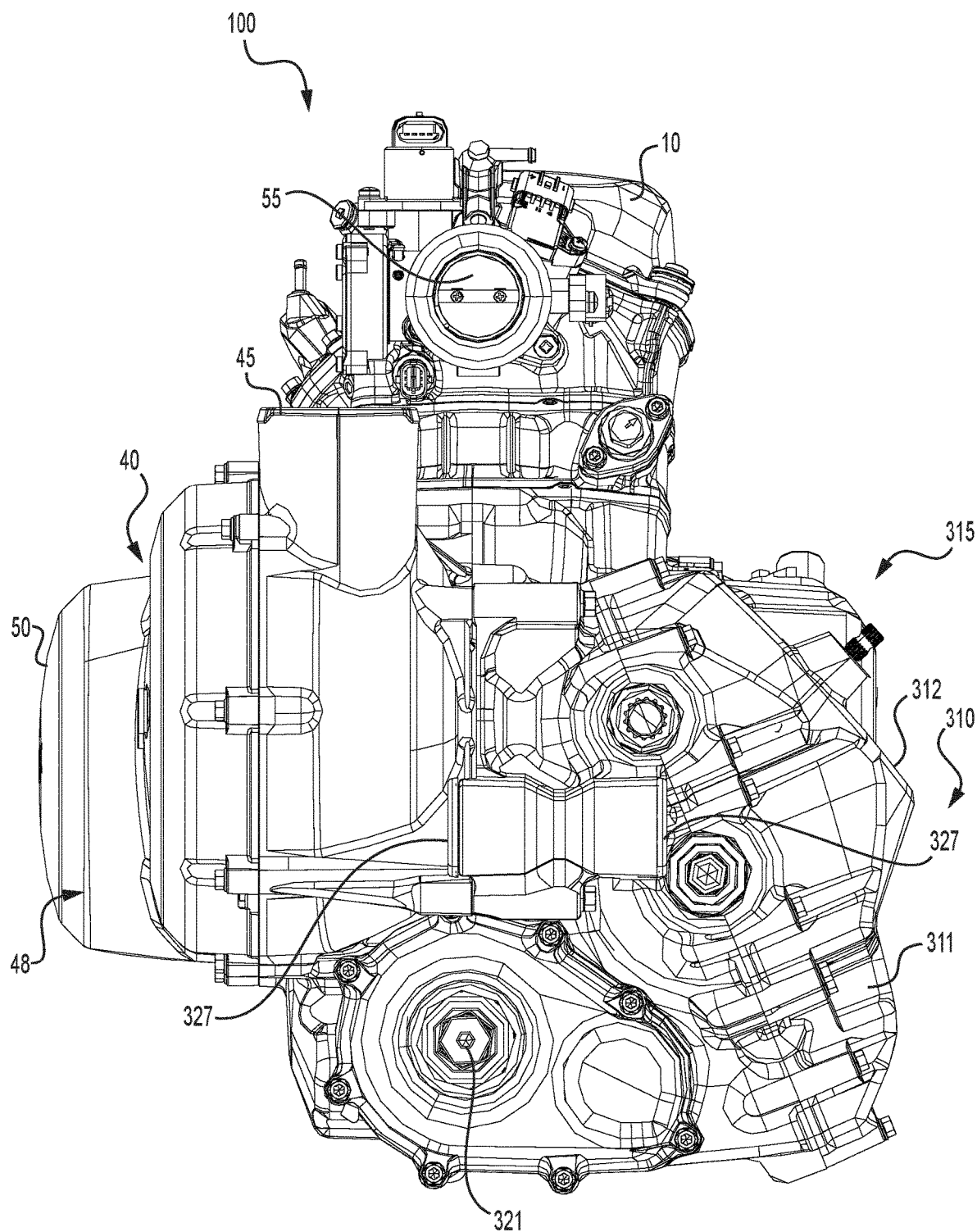
FIG. 27 is a rear elevation view of the power pack of FIG. 23 in an assembled configuration.
Figure 28:
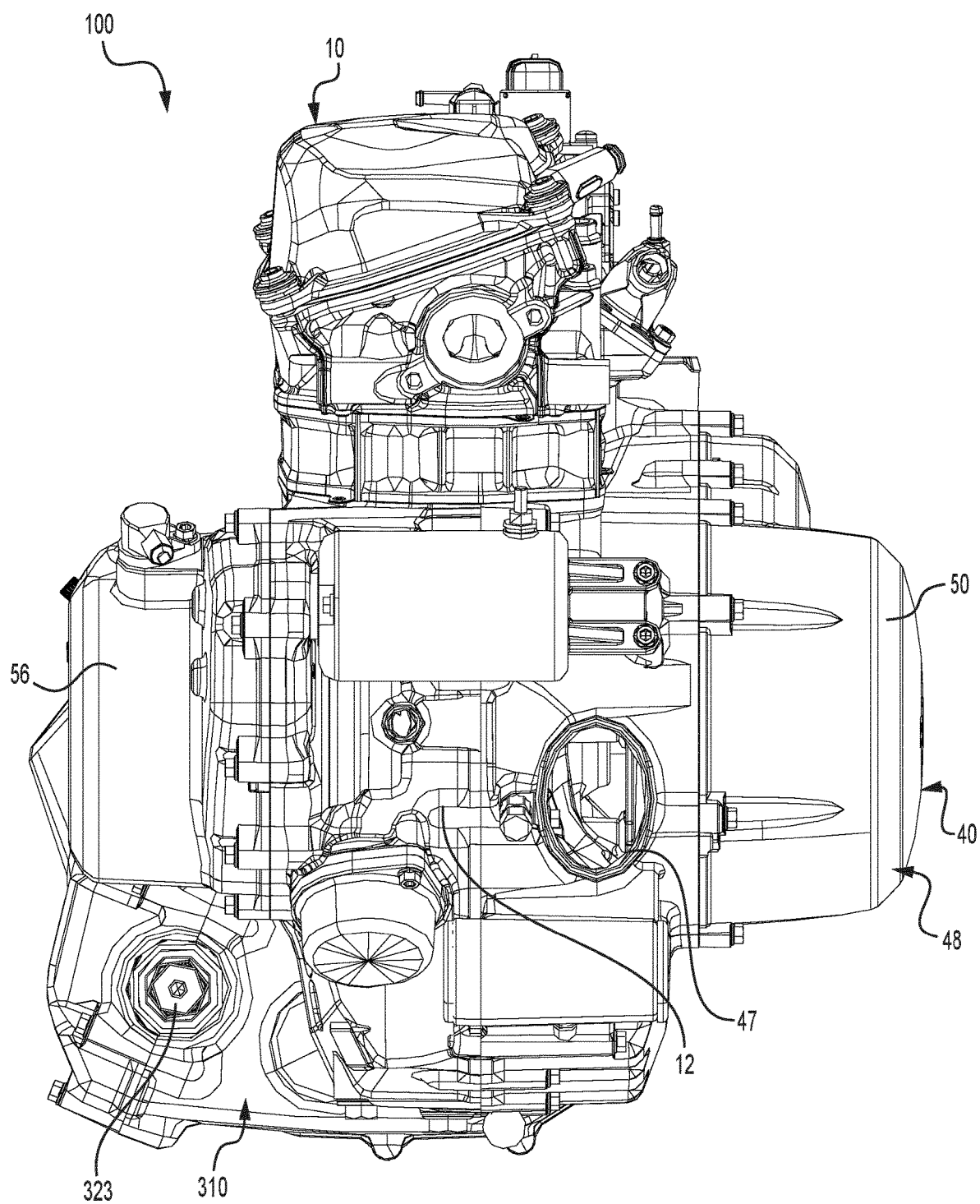
FIG. 28 is a front elevation view of the power pack of FIG. 27.
Figure 29:
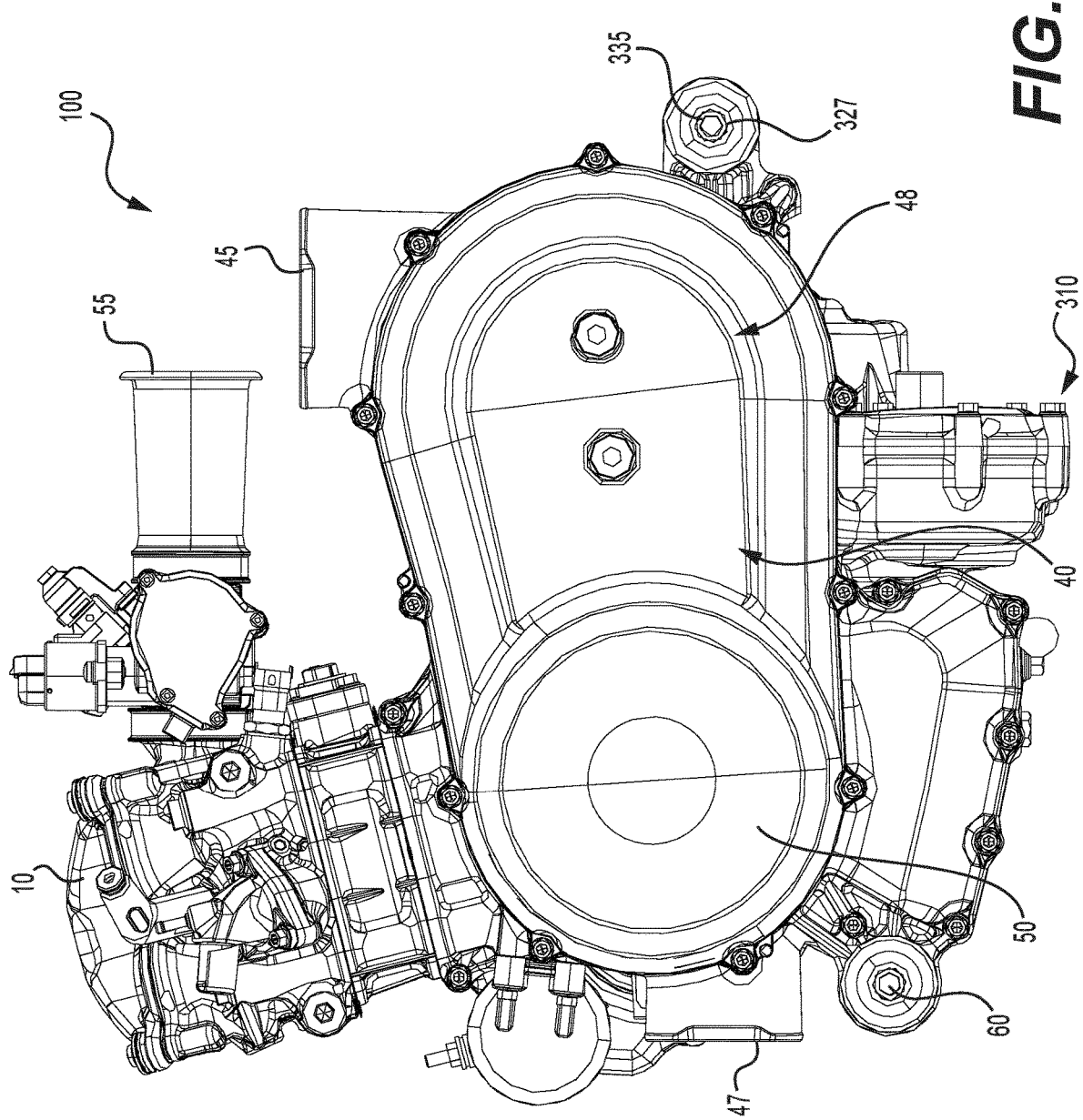
FIG. 29 is a left side elevation view of the power pack of FIG. 27.
Figure 30:
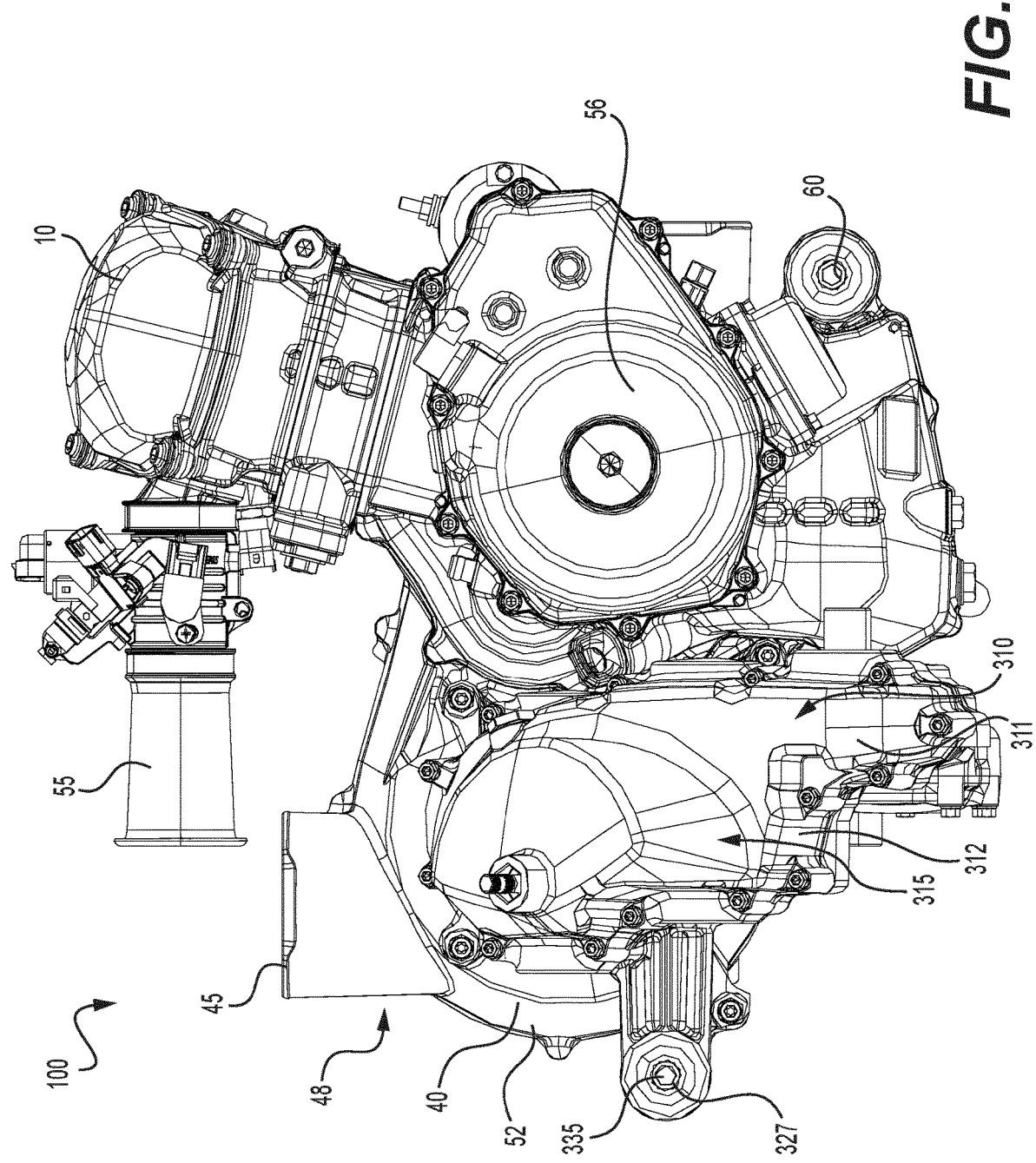
FIG. 30 is a right side elevation view of the power pack of FIG. 27.

With reference to FIG. 26, the ATV sub-transmission 310 has an input shaft 318 extending outwardly from the sub-transmission housing 312 on a left side 317 of the ATV sub-transmission 310. The input shaft 318 is configured to be received by the output coupling 54 so that the CVT 40 and the ATV sub-transmission 310 are in driving engagement. Notably, the input shaft 318 and the output coupling 54 are splined and thus are drivingly connected. Thus, in use, the input shaft 318 rotates about the driven pulley axis 67.

The gears 350 operatively connect the input shaft 318 to two output shafts 321, 323 of the ATV sub-transmission 310 which may be referred to as a "rear output shaft" 321 and a "front output shaft" 323. The rear and front output shafts 321, 323 are rotatable about respective axes 325, 329, each extending along a direction generally transverse to the driven pulley axis 67 such that, when the power pack 100 is installed on the ATV, the output shaft axes 325, 329 extend generally longitudinally. As can be seen in FIG. 26, the output shaft axis 325 of the rear output shaft 321 is vertically higher than the output shaft axis 329 of the front output shaft 323. Moreover, as shown in FIG. 25, the rear and front output shafts 321, 323 are laterally spaced apart from one another such that, in use, the rear output shaft 321 is closer to the CVT 40 than the front output shaft 323. As such, the output shaft axes 325, 329 are laterally offset from one another. The rear and front output shafts 321, 323 are configured to be operatively connected to the rear wheels and the front wheels of the ATV respectively. Notably, in use, a respective drive shaft is attached to each of the rear and front output shafts 321, 323 and is operatively connected to the rear wheels and the front wheels of the ATV via a rear differential and a front differential.

As shown in FIG. 26, in order to be connected to the CVT 40, the ATV sub-transmission 310 has a plurality of mount connectors $345_1$-$345_4$ which are configured to be engaged with the sub-transmission mounts $64_1$-$64_4$ of the CVT housing 48. Notably, in this embodiment, each of the mount connectors $345_1$-$345_4$ is a fastener which is inserted into a respective opening in the sub-transmission housing 312 to threadedly engage a corresponding one of the sub-transmission mounts $64_1$-$64_4$.

With particular reference to FIGS. 24, 27, 29 and 30, the sub-transmission housing 312 of the ATV sub-transmission 310 defines a vehicle mount 327 through which, in addition to the vehicle mounts 60 of the engine 10, the power pack 100 can be mounted to the ATV. In this embodiment, the vehicle mount 327 comprises an opening for insertion therein of a corresponding protruding mounting member of the frame of the ATV.

The ATV sub-transmission 310 also has a shifter 340, including a shifter lever, for selectively engaging the input shaft 318 with one of the gears 350. More specifically, in use, the shifter 340 is operable by a user of the ATV to engage a gear of the ATV sub-transmission 310 so as to modify the driving operation of the output shafts 321, 323. Notably, the shifter 340 allows the user to operate the ATV sub-transmission 310 in one of a plurality of "gears", which, in this embodiment, includes a high gear, a low gear, a neutral gear and a reverse gear. Notably, particular ones of the gears 350 are associated with the high, low and reverse gears such that, when engaged via the shifter 340, the ATV drives in high gear, in low gear and in reverse respectively.

It is contemplated that the ATV sub-transmission 310 could be operable in a different number of gears in other embodiments.

Figure 31:
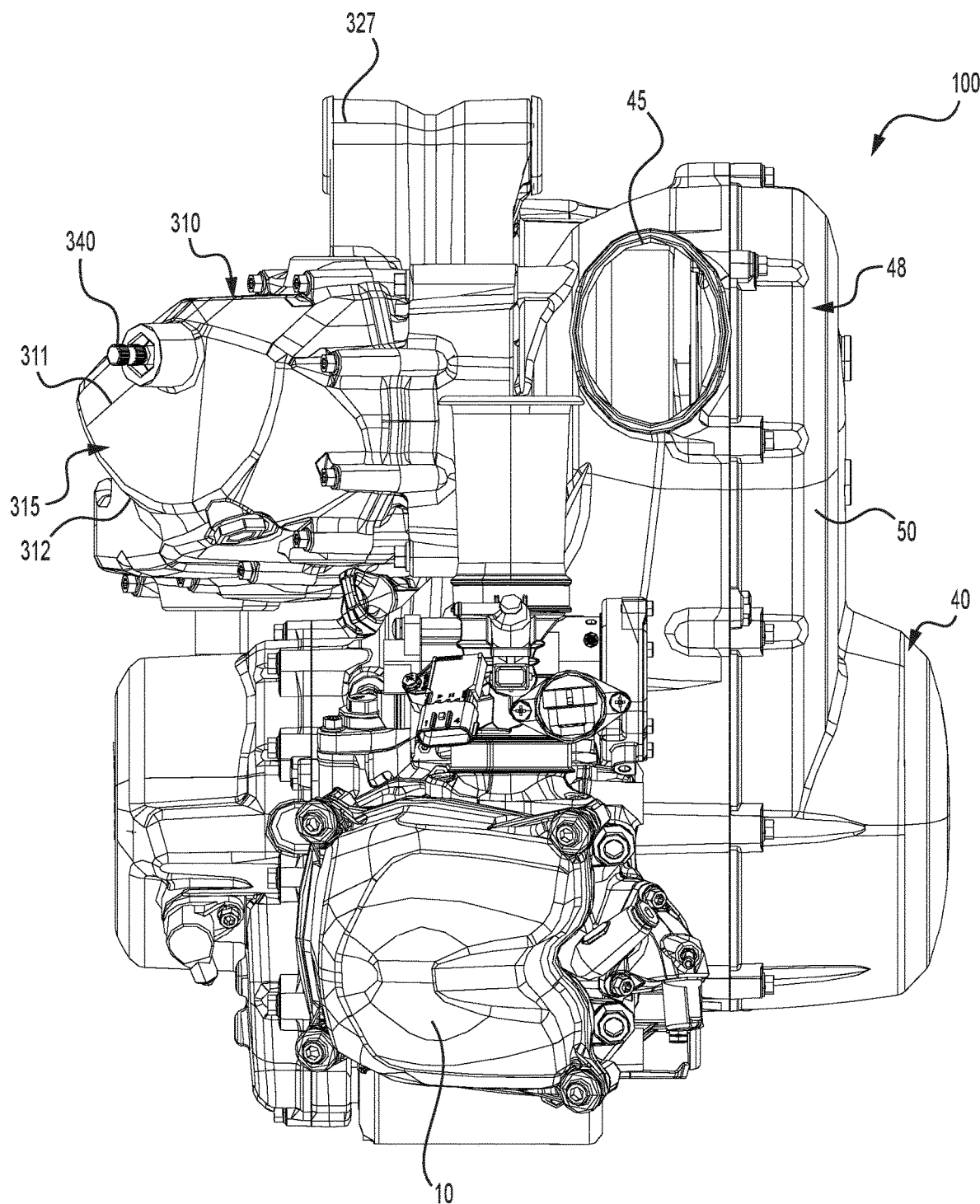
FIG. 31 is a top plan view of the power pack of FIG. 27.

The power pack 100 including the ATV sub-transmission 310 is shown assembled in FIGS. 27 to 31. As can be seen, the power pack 100 is configured such that part of the crankcase 12 of the engine 10 and the ATV sub-transmission 310 are disposed on the right side of the CVT 40. Notably, as shown in FIG. 31, part of the ATV sub-transmission 310 extends laterally away from the CVT 40 (i.e., toward the right) past the engine 10. For instance, in this embodiment, part of the sub-transmission housing 312 extends laterally away from the CVT 40 past the engine 10.

Also, as can be seen, all the mounting points defined by the sub-transmission mounts $64_1$-$64_4$ of the CVT housing 48 are used to mount the ATV sub-transmission 310 to the CVT housing 48. That is, every one of the sub-transmission mounts $64_1$-$64_4$ of the CVT housing 48 receives a corresponding one of the mount connectors $345_1$-$345_4$.

Similarly to that described above with respect to the sub-transmissions 110, 210, the ATV sub-transmission 310 is a modular unit of the power pack 100 which is attached to the CVT 40 but that is otherwise spatially independent therefrom. Notably, the interior space of the ATV sub-transmission 310, as defined by the sub-transmission housing 312, is sealed from the CVT housing 48. As such, air flow within the CVT housing 48 is independent of the ATV sub-transmission 310. In other words, air flow entering into the CVT housing 48 (via the air inlet 45) does not enter into the interior space of the ATV sub-transmission 310.

It is to be understood that this particular configuration of the power pack 100 is not limited for use with an ATV, but could instead be used on other vehicles that are driven by the two longitudinally-extending output shafts 321, 323.

Figure 41:
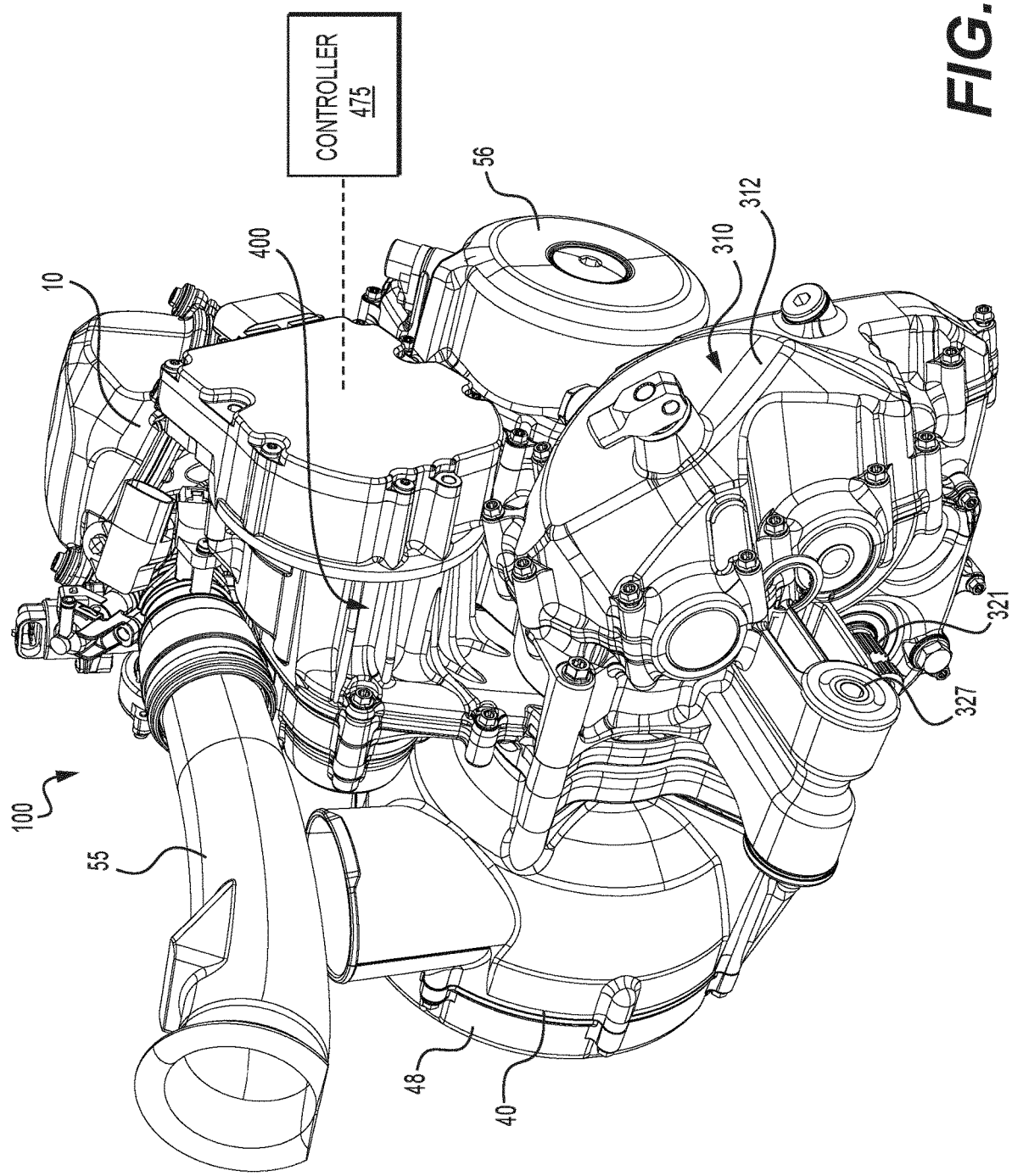
FIG. 41 is a perspective view, taken from a rear, right side, of part of the power pack in accordance with another embodiment in which the power pack includes the engine, the CVT, the electric motor module and the third sub-transmission.

Furthermore, as shown in FIG. 41, as described above with respect to the snowmobile sub-transmission 110, the ATV sub-transmission 310 can alternatively be operatively connected to the output coupling 54 via the electric motor module 400 rather than being directly connected to the output coupling 54. The power pack 100 including the ATV sub-transmission 310 may thus benefit from the different driving modes provided by the electric motor module 400 as described above.

In the different possible configurations of the power pack 100, irrespective of which of the sub-transmissions 110, 210, 310 is attached to the CVT housing 48 (or the electric motor module 400), the configurations of the CVT 40 and the engine 10 remain unchanged. For example, the air inlet 45 and the air inlet 47 of the CVT housing 48 remain in the same position irrespective of the sub-transmission 110, 210, 310 being used. In other words, the same CVT 40 and the same engine 10 can be used to mount any selected one of the sub-transmissions 110, 210, 310.

Thus a method for assembling the power pack 100 is simplified namely in part by its use of a common CVT and a common engine for any of the sub-transmissions 110, 210, 310. In particular, in order to assemble the power pack 100, the engine 10 and the CVT 40 are provided and operatively connected to one another. Then, it is determined for which of the snowmobile, the on-road vehicle and the ATV the power pack 100 is to be provided. Based on that determination, one of the sub-transmissions 110, 210, 310 is selected for mounting to the CVT 40 as described above. As each of the sub-transmissions 110, 210, 310 has the same configuration of mount connectors $145_1$-$145_4$, $245_1$-$245_4$, $345_1$-$345_4$, and that of the CVT housing 48 has the matching configuration of mounting points, the selected one of the sub-transmission 110, 210, 310 can then be easily mounted to the CVT housing 48.

The power pack 100 can be provided in any of its potential configurations with relative ease as the engine 10 and the CVT 40 are similar in all configurations. Notably, the sub-transmission 110, 210, 310 which is used in the power pack 100 accommodates the drive requirements of a corresponding one of a snowmobile, an on-road vehicle and an ATV. This may facilitate manufacturing of all these different vehicles as fewer parts are needed to produce different vehicles and thus decrease associated costs.

Modifications and improvements to the above-described embodiments of the present technology may become apparent to those skilled in the art. The foregoing description is intended to be exemplary rather than limiting. The scope of the present technology is therefore intended to be limited solely by the scope of the appended claims.

What is claimed is:

1. A power pack for a vehicle selected from a group of different vehicles, comprising:
   an internal combustion engine comprising:
     a crankcase;
     a crankshaft disposed in the crankcase; and
     a cylinder body connected to the crankcase;
   a continuously variable transmission (CVT) operatively connected to the engine, the CVT comprising:
     a drive pulley operatively connected to the crankshaft of the engine, the drive pulley being rotatable about a drive pulley axis;
     a driven pulley rotatable about a driven pulley axis;
     a belt connecting the drive pulley to the driven pulley; and
     a housing at least partly enclosing the drive pulley, the driven pulley and the belt; and
   a sub-transmission selected from a group of different sub-transmissions depending on the selected vehicle of the group of different vehicles, the selected sub-transmission being mounted to the housing of the CVT, the housing of the CVT being configured to mount any sub-transmission of the group of different sub-transmissions,
   the group of different sub-transmissions comprising:
     a first sub-transmission comprising:
       an input shaft configured to be operatively connected to the driven pulley of the CVT;
       a plurality of gears; and
       an output shaft operatively connected to the input shaft via the plurality of gears, the output shaft being rotatable about an output shaft axis extending laterally, each of a first end portion and a second end portion of the output shaft being configured to be operatively connected to a respective ground-engaging member of the selected vehicle;
     a second sub-transmission comprising:
       an input shaft configured to be operatively connected to the driven pulley of the CVT;
       a plurality of gears; and
       an output sprocket operatively connected to the input shaft via the plurality of gears, the output sprocket being configured to be operatively connected to a ground-engaging member of the selected vehicle for driving thereof;

and
a third sub-transmission comprising:
  an input shaft configured to be operatively connected to the driven pulley of the CVT;
  a plurality of gears; and
  first and second output members operatively connected to one another and driven by the input shaft via the plurality of gears, the first and second output members being disposed on opposite sides of the third sub-transmission, the first and second output members being rotatable about respective axes extending generally longitudinally.

2. The power pack of claim 1, wherein:
the housing of the CVT defines a plurality of mounting points for mounting the selected sub-transmission to the housing; and
at least some of the mounting points defined by the housing are used to mount any one of the different sub-transmissions.

3. The power pack of claim 1, wherein all mounting points defined by the housing of the CVT are used to mount any one of the different sub-transmissions.

4. The power pack of claim 1, wherein, when the power pack is installed on the selected vehicle, the driven pulley axis extends generally laterally.

5. The power pack of claim 1, wherein:
at least part of the crankcase of the engine and the selected sub-transmission are disposed on a same side of the CVT.

6. The power pack of claim 5, wherein at least part of the selected sub-transmission extends laterally away from the CVT past the engine.

7. The power pack of claim 1, wherein:
the first and second output members of the third sub-transmission are first and second output shafts; and
when the selected sub-transmission is the third sub-transmission, the respective axes about which the first and second output shafts rotate extend along a direction generally transverse to the driven pulley axis.

8. The power pack of claim 1, wherein:
when the selected sub-transmission is the first sub-transmission, the output shaft axis of the first sub-transmission extends along a direction generally parallel to the driven pulley axis.

9. The power pack of claim 1, wherein at least one sub-transmission of the group of different sub-transmissions comprises:
a sub-transmission housing,
the plurality of gears of the at least one sub-transmission being enclosed within the sub-transmission housing; and
a shifter for selectively engaging the input shaft of the at least one sub-transmission with one of the plurality of gears thereof.

10. The power pack of claim 1, wherein:
the first sub-transmission further comprises a sub-transmission housing;
the plurality of gears of the first sub-transmission is enclosed within the sub-transmission housing;
the input shaft of the first sub-transmission is in driving engagement with the plurality of gears of the first sub-transmission; and
the output shaft of the first sub-transmission extends laterally outwardly from a first lateral side and a second lateral side of the sub-transmission housing.

11. The power pack of claim 1, wherein:
the engine defines a plurality of engine mounts for mounting the engine to a frame of the selected vehicle; and
for at least some vehicles of the group of different vehicles, only some of the engine mounts are used to mount the engine to the frame.

12. The power pack of claim 11, wherein the selected sub-transmission defines an additional vehicle mount to mount the power pack to the frame of the selected vehicle.

13. The power pack of claim 1, wherein:
at least one sub-transmission of the group of different sub-transmissions comprises a sub-transmission housing,
the sub-transmission housing defines an interior space of the at least one sub-transmission; and
the sub-transmission housing is sealed such that the interior space of the at least one sub-transmission is inaccessible without disassembly thereof.

14. The power pack of claim 1, wherein:
at least one sub-transmission of the group of different sub-transmissions comprises a sub-transmission housing;
the sub-transmission housing defines an interior space of the at least one sub-transmission; and
when the selected sub-transmission is one of the at least one sub-transmission, the sub-transmission housing of the at least one sub-transmission is sealed from the housing of the CVT.

15. The power pack of claim 1, wherein:
at least one sub-transmission of the group of different sub-transmissions comprises a reverse gear; and
when the selected sub-transmission is the at least one sub-transmission comprising the reverse gear, the power pack is operable to drive the vehicle in reverse via engagement of the reverse gear.

16. The power pack of claim 1, wherein:
the housing of the CVT defines an air inlet and an air outlet; and
the air inlet and the air outlet are always in a same position irrespective of the selected sub-transmission.

17. A method for assembling a power pack for a vehicle selected from a group of different vehicles comprising:
providing an engine and a continuously variable transmission (CVT), the CVT being operatively connected to the engine;
determining the selected vehicle for which the power pack is to be provided;
determining a drive requirement of the selected vehicle, the drive requirement including one of:
  an output shaft rotatable about an output shaft axis extending laterally, each of a first end portion and a second end portion of the output shaft being configured to be operatively connected to a respective ground-engaging member of the selected vehicle;
  an output sprocket configured to be operatively connected to a ground-engaging member of the selected vehicle; and
  first and second output members operatively connected to one another, the first and second output members being rotatable about respective axes extending generally longitudinally;
selecting a sub-transmission from a group of different sub-transmissions based on the drive requirement of the selected vehicle for which the power pack is to be provided; and mounting the selected sub-transmission to a housing of the CVT, the housing of the CVT being configured to mount any sub-transmission of the group of different sub-transmissions.

18. The method of claim 17, wherein, for any one of the different sub-transmissions being the selected sub-transmission, mounting the selected sub-transmission comprises:
fastening the selected sub-transmission to all mounting points of a plurality of mounting points defined by a housing of the CVT for mounting the selected sub-transmission.

19. The method of claim 17, wherein, for at least one of the different sub-transmissions being the selected sub-transmission, mounting the selected sub-transmission comprises:
positioning the selected sub-transmission such that an output shaft axis thereof extends along a direction generally transverse to a driven pulley axis of the CVT.

20. The method of claim 17, wherein, for at least one of the different sub-transmissions being the selected sub-transmission, mounting the selected sub-transmission comprises:
positioning the selected sub-transmission such that an output shaft axis thereof extends along a direction generally parallel to a driven pulley axis of the CVT.

* * * * *